US008666788B1

(12) United States Patent
Syed

(10) Patent No.: US 8,666,788 B1
(45) Date of Patent: Mar. 4, 2014

(54) SYSTEMS AND METHODS FOR FACILITATING AN INSURANCE MARKETPLACE FOR NEGOTIATIONS AMONG BROKERS AND INSURANCE CARRIERS

(71) Applicant: Kabir Syed, Greenwich, CT (US)

(72) Inventor: Kabir Syed, Greenwich, CT (US)

( * ) Notice: Subject to any disclaimer, the term of this patent is extended or adjusted under 35 U.S.C. 154(b) by 0 days.

(21) Appl. No.: 13/799,558

(22) Filed: Mar. 13, 2013

Related U.S. Application Data

(60) Provisional application No. 61/762,440, filed on Feb. 8, 2013.

(51) Int. Cl.
*G06Q 40/00* (2012.01)

(52) U.S. Cl.
USPC .................................................. 705/4; 705/35

(58) Field of Classification Search
USPC ........................................................ 705/4, 35
See application file for complete search history.

(56) References Cited

U.S. PATENT DOCUMENTS 5,523,942 A 6/1996 Tyler et al.
5,655,085 A 8/1997 Ryan et al.
6,594,635 B1 7/2003 Erlanger
6,647,374 B2 11/2003 Kansal
6,871,181 B2 * 3/2005 Kansal .............................. 705/4
7,103,556 B2 9/2006 Del Rey et al.
7,343,309 B2 3/2008 Ogawa et al.
7,383,239 B2 * 6/2008 Bonissone et al. .............. 706/46
7,567,914 B2 7/2009 Bonissone et al.
7,742,966 B2 6/2010 Erlanger
7,801,748 B2 9/2010 Bonissone et al.
7,813,945 B2 10/2010 Bonissone et al.
7,877,279 B1 1/2011 Sturgis et al.
7,958,034 B2 6/2011 Ehrhart
8,024,203 B2 9/2011 Kendall et al.
8,027,909 B2 9/2011 Erlanger
8,335,701 B1 12/2012 Syed et al.
2003/0200125 A1 10/2003 Erlanger
2005/0144114 A1 * 6/2005 Ruggieri et al. ................ 705/37
2006/0053037 A1 3/2006 Kendall et al.
2010/0010836 A1 1/2010 Rosen et al.
2010/0205116 A1 8/2010 Erlanger
2011/0047098 A1 2/2011 Erlanger
2012/0072246 A1 3/2012 Erlanger
2012/0296693 A1 11/2012 McGill et al.
2012/0296694 A1 11/2012 McGill et al.
2012/0296695 A1 11/2012 McGill et al.
2013/0060600 A1 3/2013 Schoolman

* cited by examiner

*Primary Examiner* — Lalita M Hamilton
(74) *Attorney, Agent, or Firm* — Amster, Rothstein & Ebenstein LLP

(57) ABSTRACT

Methods are disclosed for providing leads for insurance market participants. A method may include a broker providing for consideration, their clients' insurance risk to be considered by multiple insurance capital providers. The broker can be provided with potential carrier matches based on analysis of broker and carrier insurance preferences, and previous transactions. Similarly, methods may include carriers disclosing their risk appetites, in the form of insurance products and services for consideration. The carrier may also be provided with potential broker and/or client matches based on analysis of the broker and carrier insurance preferences and previous transactions. Systems and apparatuses are also disclosed to implement the disclosed methods.

28 Claims, 95 Drawing Sheets

| BROKER DATA 70 |
|---|
| Organization Name 70a |
| Location 70b |
| Employees/Contacts 70c |
| Products 70d |
| Carrier Relationship 70e |
| Commission and Fees 70f |
| Clients 70g |
| Broker org., hierarchy, & departments 70h |
| Correspondent Broker relationships 70i |
| Current & past interaction history & surveys 70j |
| Risk selection weighting 70k |
| Placement information 70l |

| BROKER-CLIENT DATA 80 |
|---|
| Client Name 80a |
| Demographic Profile 80b |
| Corporate structure & affiliated entities 80c |
| Client contact 80d |
| Risk profile 80e |
| Exposure details 80f |
| Risk history 80g |
| Interaction & negotiation history 80h |
| Program design 80j |
| Carrier details 80k |
| Losses, Claims, Settlements 80l |
| Policy terms, conditions, exclusions 80m |
| Risk selection weighting 80n |
| Financial rating 80o |
| Social media information 80p |

FIG. 2A

| CARRIER DATA 75 |
| --- |
| Organization Name 75a |
| Location 75b |
| Employees/Contacts 75c |
| Profile 75d |
| Products 75e |
| Broker relationship 75f |
| Commission & Fees 75g |
| Appetite - Current, Future, & Historical 75h |
| Underwriter name, contact, etc. 75i |
| Underwriter metrics 75j |
| Carrier organization, hierarchy, & depts. 75k |
| Ratings - Financial, Broker, Client 75l |
| Clients 75m |
| Metrics - Density, Success, Lost Business, Declined, Pipeline 75n |
| Carrier Reputation - claims, engineering, risk control 75o |
| Interaction history 75p |

| Product | Share of Wallet Premium with you | Market Competitiveness # of carriers competing for product | Market Size ($M) |
|---|---|---|---|
| Property | 8% | 8 | 42 |
| Casualty | 15% | 5 | 68 |
| Marine | 27% | 4 | 10 |
| Aviation | 11% | 3 | 18 |
| Workers Comp. | 27% | 6 | 49 |

1720

Carrier Home

| Region | Current $ Premium | Current % Premium Share | Estimated $ Exanded | Estimated $ New | Total Estimated Market | # of Clients | # of Prospects |
|---|---|---|---|---|---|---|---|
| + Region1 | $1.20 | 4% | $2.50 | $4.20 | $7.90 | 156 | 1,456 |
| - Region2 | $1.50 | 9% | $2.10 | $6.20 | $9.80 | 185 | 2,558 |
| Sub-Region1 | | 12% | | | | | |
| Sub-Region2 | | 8% | | | | | |
| Sub-Region3 | | 7% | | | | | |
| + Region3 | $3.70 | 12% | $3.20 | $5.60 | $12.50 | 124 | 1,105 |
| + Region4 | $2.40 | 18% | $5.00 | $7.30 | $14.70 | 265 | 945 |
| + Region5 | $1.30 | 3% | $3.00 | $6.00 | $10.30 | 58 | 755 |
| Total | $10.10 | | $15.80 | $29.30 | $55.20 | 788 | 6,819 |

3430

Carrier Home

3700

| Industry | Current $ Premium | Current % Premium Share | Estimated $ Exanded | Estimated $ New | Total Estimated Market | # of Clients | # of Prospects |
|---|---|---|---|---|---|---|---|
| + Industry1 | $1.50 | | $3.20 | $4.00 | $8.70 | 76 | 345 |
| + Industry2 | $1.75 | | $2.75 | $6.60 | $11.10 | 85 | 468 |
| + Industry3 | $1.55 | | $1.80 | $4.20 | $7.55 | 24 | 356 |
| + Industry4 | $1.30 | | $4.20 | $4.50 | $10.00 | 95 | 264 |
| + Industry5 | $1.40 | | $1.90 | $5.40 | $8.70 | 135 | 1,254 |
| Total | $10.10 | | $15.80 | $29.30 | $55.20 | 451 | 2,952 |

3730

Carrier Home

3800

Total $ Estimated Opportunity: $45.1M

| Sales Band | Current $ Premium | Current % Premium Share | Estimated $ Exanded | Estimated $ New | Total Estimated Market | # of Clients | # of Prospects |
|---|---|---|---|---|---|---|---|
| $10B+ | $1.50 | 17% | $3.20 | $4.00 | $8.70 | 76 | 345 |
| $1B to $10B | $1.75 | 16% | $2.75 | $6.60 | $11.10 | 85 | 468 |
| $750M to $1B | $1.55 | 21% | $1.80 | $4.20 | $7.55 | 24 | 356 |
| $500M to $750M | $0.43 | 4% | $4.20 | $4.50 | $10.00 | 95 | 264 |
| $250M to $500M | $1.40 | 16% | $1.90 | $5.40 | $8.70 | 135 | 1,254 |
| $150M to $250M | $20.31 | 3% | $1.95 | $4.60 | $9.15 | 36 | 265 |
| Total | $10.10 | | $15.80 | $29.30 | $55.20 | 451 | 2,952 |

3830

Carrier Home

| Region | Current $ Premium | Current % Premium Share | Estimated $ Expanded | Estimated $ New | Total Estimated Market | # of Clients | # of Prospects |
|---|---|---|---|---|---|---|---|
| + Property | $1.20 | | $2.50 | $4.20 | $- | 156 | 1,456 |
| + Casualty | $1.50 | | $2.10 | $6.20 | $- | 185 | 2,558 |
| + Financial Services | $3.70 | | $3.20 | $5.60 | $- | 124 | 1,105 |
| + Surety | $2.40 | | $5.00 | $7.30 | $- | 265 | 945 |
| + Workers Comp | | | | | $- | | |
| Total | $10.10 | | $15.80 | $29.30 | $- | 730 | 6,064 |

3930

Carrier Home

Figure 42:
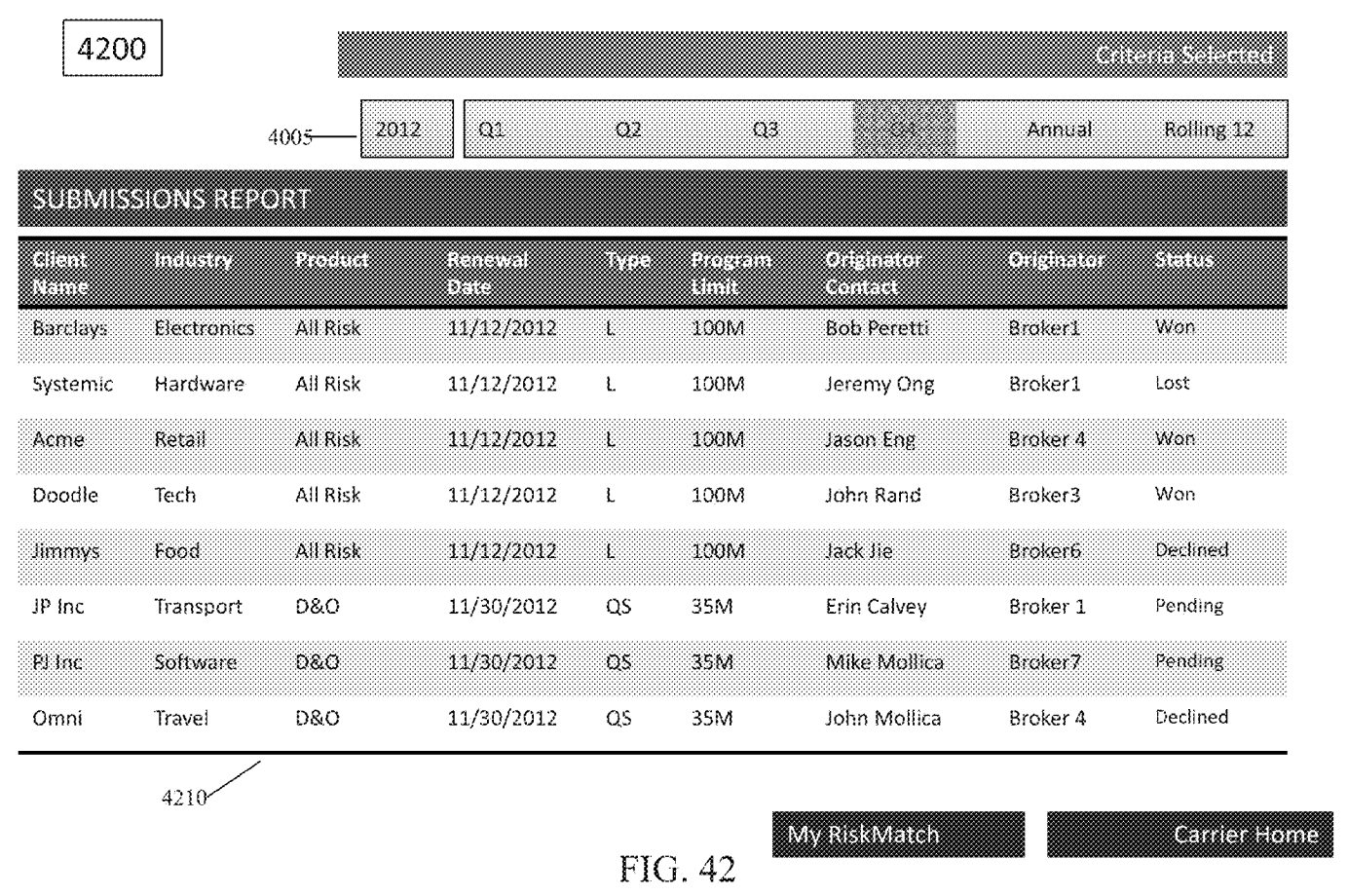

4200

Criteria Selected

4005 — 2012 | Q1 | Q2 | Q3 | [illegible] | Annual | Rolling 12

SUBMISSIONS REPORT

| Client Name | Industry | Product | Renewal Date | Type | Program Limit | Originator Contact | Originator | Status |
|---|---|---|---|---|---|---|---|---|
| Barclays | Electronics | All Risk | 11/12/2012 | L | 100M | Bob Peretti | Broker1 | Won |
| Systemic | Hardware | All Risk | 11/12/2012 | L | 100M | Jeremy Ong | Broker1 | Lost |
| Acme | Retail | All Risk | 11/12/2012 | L | 100M | Jason Eng | Broker 4 | Won |
| Doodle | Tech | All Risk | 11/12/2012 | L | 100M | John Rand | Broker3 | Won |
| Jimmys | Food | All Risk | 11/12/2012 | L | 100M | Jack Jie | Broker6 | Declined |
| JP Inc | Transport | D&O | 11/30/2012 | QS | 35M | Erin Calvey | Broker 1 | Pending |
| PJ Inc | Software | D&O | 11/30/2012 | QS | 35M | Mike Mollica | Broker7 | Pending |
| Omni | Travel | D&O | 11/30/2012 | QS | 35M | John Mollica | Broker 4 | Declined |

4210

My RiskMatch

Carrier Home

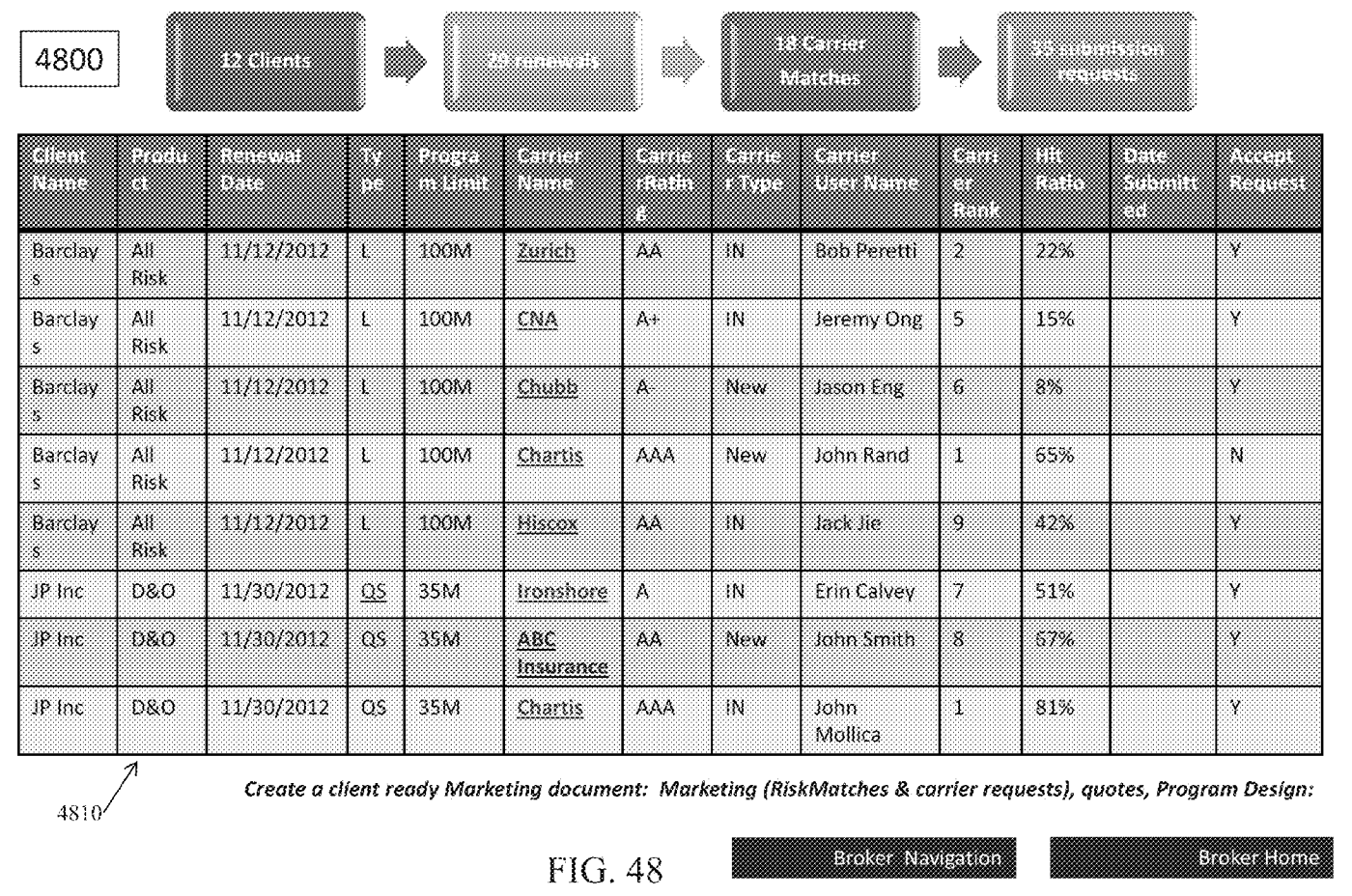

12 Clients → 20 renewals → 18 Carrier Matches → 55 submission requests

| Client Name | Product | Renewal Date | Type | Program Limit | Carrier Name | Carrier Rating | Carrier Type | Carrier User Name | Carrier Rank | Hit Ratio | Date Submitted | Accept Request |
|---|---|---|---|---|---|---|---|---|---|---|---|---|
| Barclays | All Risk | 11/12/2012 | L | 100M | Zurich | AA | IN | Bob Peretti | 2 | 22% | | Y |
| Barclays | All Risk | 11/12/2012 | L | 100M | CNA | A+ | IN | Jeremy Ong | 5 | 15% | | Y |
| Barclays | All Risk | 11/12/2012 | L | 100M | Chubb | A- | New | Jason Eng | 6 | 8% | | Y |
| Barclays | All Risk | 11/12/2012 | L | 100M | Chartis | AAA | New | John Rand | 1 | 65% | | N |
| Barclays | All Risk | 11/12/2012 | L | 100M | Hiscox | AA | IN | Jack Jie | 9 | 42% | | Y |
| JP Inc | D&O | 11/30/2012 | QS | 35M | Ironshore | A | IN | Erin Calvey | 7 | 51% | | Y |
| JP Inc | D&O | 11/30/2012 | QS | 35M | ABC Insurance | AA | New | John Smith | 8 | 67% | | Y |
| JP Inc | D&O | 11/30/2012 | QS | 35M | Chartis | AAA | IN | John Mollica | 1 | 81% | | Y |

4810

*Create a client ready Marketing document: Marketing (RiskMatches & carrier requests), quotes, Program Design:*

Broker Navigation | Broker Home

FIG. 48

| ABC Insurance Company: John Smith's Appetite | |
|---|---|
| **Product** | Property-All Risk |
| **Industry** | Retail, Technology, Media, Chemicals, Manufacturing<br>Other |
| **TIV** | 50M to 275M |
| **Other Size** | Sales: 10M to 400M |
| **Limit** | 75M |
| **Location of risk/property** | All except New York |
| **CAT** | Max 5% (Wind, EQ, Cal Eq., Flood) |
| **Deductible** | 25K, 50K, 75K, 100K |
| **Layers** | All except Primary |

4910

Carrier Submissions

5015 — Search a carrier: Zurich Insurance Company

5005 — 2012 | Q1 | Q2 | Q3 | Q4 | Annual | Rolling 12

| Carrier | # of clients | # of Submission requests | Hit Ratio | Rank based on density | Total Premiums | Property | Casualty | Liability | Marine | All Other lines |
|---|---|---|---|---|---|---|---|---|---|---|
| Allianz | 65 | 245 | 15% | 4 | 42M | 21 | | | 15 | 6 |
| AWAC | 10 | 109 | 25% | 6 | 15M | 9 | | | | 6 |
| Chartis | 265 | 435 | 62% | 1 | 170M | 45 | 45 | 14 | 27 | 39 |
| Chubb | 32 | 124 | 41% | 5 | 35M | 21 | | 14 | | |
| CNA | 91 | 183 | 39% | 3 | 42M | | 27 | 15 | | |
| Ironshore | 61 | 63 | 45% | 7 | 5M | | | 5 | | |
| Hiscox | 23 | 47 | 61% | 8 | 2M | 2 | | | | |
| Safety National | 8 | 17 | 85% | 9 | <1M | | | | | |
| Zurich | 189 | 461 | 69% | 2 | 65M | 21 | 21 | 12 | | 9 |
| Total | 744 | 1684 | - | 32 | 376 | 119 | 95 | 60 | 42 | 60 |

Broker Navigation

Broker Home

Figure 51:
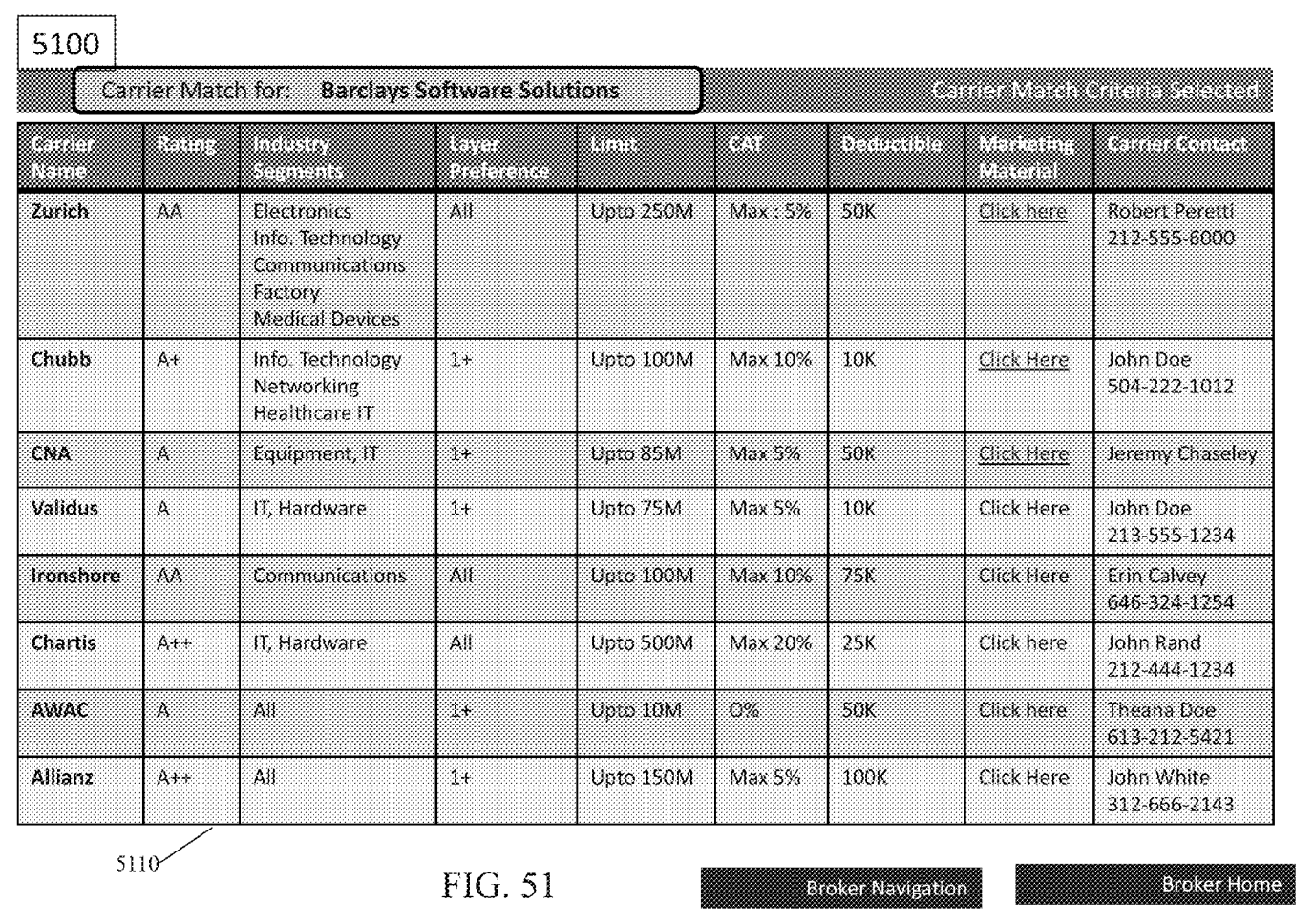

5100

Carrier Match for: Barclays Software Solutions

Carrier Match Criteria Selected

| Carrier Name | Rating | Industry Segments | Layer Preference | Limit | CAT | Deductible | Marketing Material | Carrier Contact |
|---|---|---|---|---|---|---|---|---|
| **Zurich** | AA | Electronics<br>Info. Technology<br>Communications<br>Factory<br>Medical Devices | All | Upto 250M | Max : 5% | 50K | Click here | Robert Peretti<br>212-555-6000 |
| **Chubb** | A+ | Info. Technology<br>Networking<br>Healthcare IT | 1+ | Upto 100M | Max 10% | 10K | Click Here | John Doe<br>504-222-1012 |
| **CNA** | A | Equipment, IT | 1+ | Upto 85M | Max 5% | 50K | Click Here | Jeremy Chaseley |
| **Validus** | A | IT, Hardware | 1+ | Upto 75M | Max 5% | 10K | Click Here | John Doe<br>213-555-1234 |
| **Ironshore** | AA | Communications | All | Upto 100M | Max 10% | 75K | Click Here | Erin Calvey<br>646-324-1254 |
| **Chartis** | A++ | IT, Hardware | All | Upto 500M | Max 20% | 25K | Click here | John Rand<br>212-444-1234 |
| **AWAC** | A | All | 1+ | Upto 10M | 0% | 50K | Click here | Theana Doe<br>613-212-5421 |
| **Allianz** | A++ | All | 1+ | Upto 150M | Max 5% | 100K | Click Here | John White<br>312-666-2143 |

Broker Navigation

Broker Home

5200

Criteria Selected

P I G S

Drill-down into results of criteria search

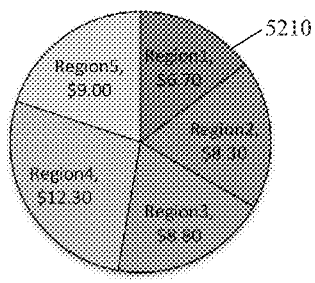

Total $ Estimated Opportunity: $45.1M

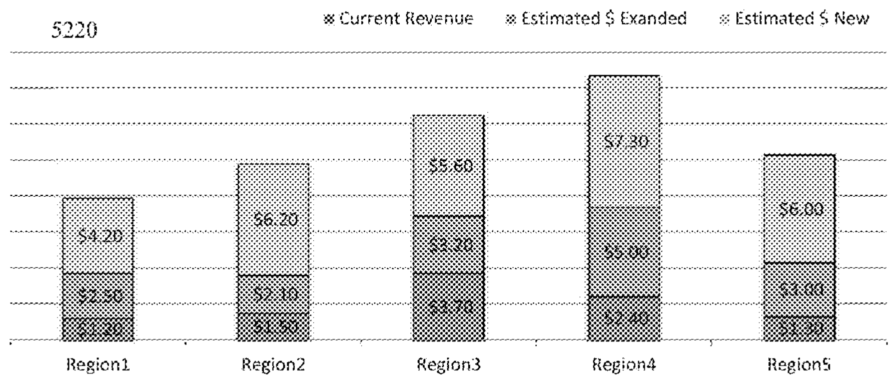

| Region | Current $ Revenue | Current % Revenue Share | Estimated $ Exanded | Estimated $ New | Total Estimated Market | # of Clients | # of Prospects |
|---|---|---|---|---|---|---|---|
| + Region1 | $1.20 | 4% | $2.50 | $4.20 | $7.90 | 156 | 1,456 |
| - Region2 | $1.50 | 9% | $2.10 | $6.20 | $9.80 | 185 | 2,558 |
| Sub-Region1 | | 12% | | | | | |
| Sub-Region2 | | 8% | | | | | |
| Sub-Region3 | | 7% | | | | | |
| + Region3 | $3.70 | 12% | $3.20 | $5.60 | $12.50 | 124 | 1,105 |
| + Region4 | $2.40 | 18% | $5.00 | $7.30 | $14.70 | 265 | 945 |
| + Region5 | $1.30 | 3% | $3.00 | $6.00 | $10.30 | 58 | 755 |
| Total | $10.10 | | $15.80 | $29.30 | $55.20 | 788 | 6,819 |

Broker Home

| Region | Current $ Revenue | Current % Revenue Share | Estimated $ Exanded | Estimated $ New | Total Estimated Market | # of Clients | # of Prospects |
|---|---|---|---|---|---|---|---|
| + Region1 | $1.20 | | $2.50 | $4.20 | $7.90 | 156 | 1,456 |
| + Region2 | $1.50 | | $2.10 | $6.20 | $9.80 | 185 | 2,558 |
| + Region3 | $3.70 | | $3.20 | $5.60 | $12.50 | 124 | 1,105 |
| + Region4 | $2.40 | | $5.00 | $7.30 | $14.70 | 265 | 945 |
| + Region5 | $1.30 | | $3.00 | $6.00 | $10.30 | 58 | 755 |
| Total | $10.10 | | $15.80 | $29.30 | $55.20 | | |

Broker Home

5230

5600

Criteria Selected

| Industry | Current $ Revenue | Current % Revenue Share | Estimated $ Expanded | Estimated $ New | Total Estimated Market | # of Clients | # of Prospects |
|---|---|---|---|---|---|---|---|
| Industry1 | $1.50 | | $3.20 | $4.00 | $8.70 | 76 | 345 |
| Industry2 | $1.75 | | $2.75 | $6.60 | $11.10 | 85 | 468 |
| Industry3 | $1.55 | | $1.80 | $4.20 | $7.55 | 24 | 356 |
| Industry4 | $1.30 | | $4.20 | $4.50 | $10.00 | 95 | 264 |
| Industry5 | $1.40 | | $1.90 | $5.40 | $8.70 | 135 | 1,254 |
| Industry6 | $2.60 | | $1.95 | $4.60 | $9.15 | 36 | 265 |
| Total | $10.10 | | $15.80 | $29.30 | $55.20 | 451 | 2,952 |

Broker Home

5700

Criteria Selected

Total $ Estimated Opportunity: $45.1M

| Industry | Current $ Revenue | Current % Revenue Share | Estimated $ Expanded | Estimated $ New | Total Estimated Market | # of Clients | # of Prospects |
|---|---|---|---|---|---|---|---|
| $10B+ | $1.20 | | $2.50 | $4.20 | $8.70 | 76 | 345 |
| $1B to $10B | $2.10 | | $1.50 | $3.60 | $11.10 | 85 | 468 |
| $750M to $1B | $1.20 | | $3.20 | $4.30 | $7.55 | 24 | 356 |
| $500M to $750M | $1.15 | | $1.70 | $4.90 | $10.00 | 95 | 264 |
| $250M to $500M | $1.30 | | $1.70 | $3.90 | $8.70 | 135 | 1,254 |
| $150M to $250M | | | | | | | |
| Total | $6.95 | | $10.60 | $20.90 | $55.20 | 451 | 2,952 |

Broker Home

5800
Criteria Selected
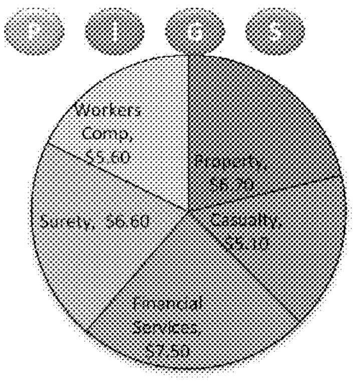
Total $ Estimated Opportunity: $45.1M
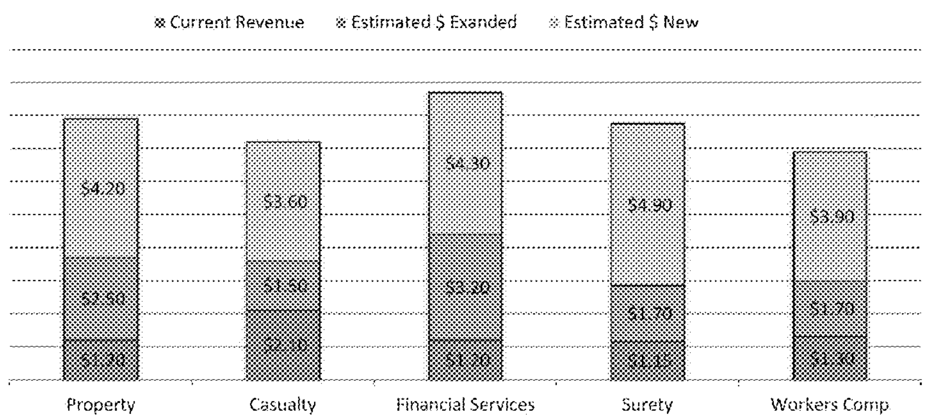
| Industry | Current $ Revenue | Current % Revenue Share | Estimated $ Expanded | Estimated $ New | Total Estimated Market | # of Clients | # of Prospects |
|---|---|---|---|---|---|---|---|
| Property | $1.20 | | $2.50 | $4.20 | $8.70 | 76 | 345 |
| Casualty | $2.10 | | $1.50 | $3.60 | $11.10 | 85 | 468 |
| Financial Services | $1.20 | | $3.20 | $4.30 | $7.55 | 24 | 356 |
| Surety | $1.15 | | $1.70 | $4.90 | $10.00 | 95 | 264 |
| Workers Comp | $1.30 | | $1.70 | $3.90 | $8.70 | 135 | 1,254 |
| Total | $6.95 | | $10.60 | $20.90 | $55.20 | 451 | 2,952 |
Broker Home
FIG. 58

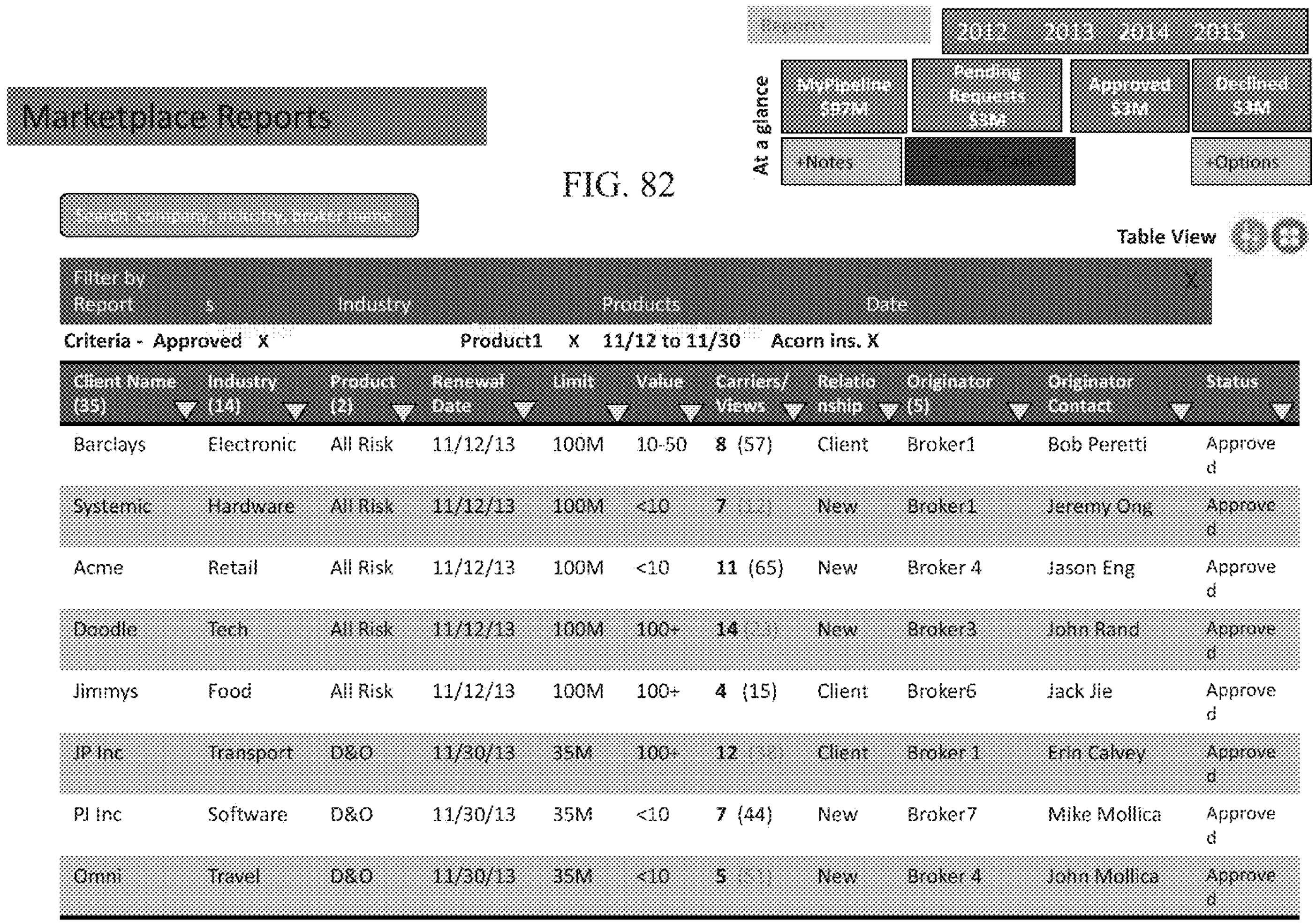

| Client Name (35) | Industry (14) | Product (2) | Renewal Date | Limit | Value | Carriers/ Views | Relationship | Originator (5) | Originator Contact | Status |
|---|---|---|---|---|---|---|---|---|---|---|
| Barclays | Electronic | All Risk | 11/12/13 | 100M | 10-50 | **8** (57) | Client | Broker1 | Bob Peretti | Approved |
| Systemic | Hardware | All Risk | 11/12/13 | 100M | <10 | **7** | New | Broker1 | Jeremy Ong | Approved |
| Acme | Retail | All Risk | 11/12/13 | 100M | <10 | **11** (65) | New | Broker 4 | Jason Eng | Approved |
| Doodle | Tech | All Risk | 11/12/13 | 100M | 100+ | **14** | New | Broker3 | John Rand | Approved |
| Jimmys | Food | All Risk | 11/12/13 | 100M | 100+ | **4** (15) | Client | Broker6 | Jack Jie | Approved |
| JP Inc | Transport | D&O | 11/30/13 | 35M | 100+ | **12** | Client | Broker 1 | Erin Calvey | Approved |
| PJ Inc | Software | D&O | 11/30/13 | 35M | <10 | **7** (44) | New | Broker7 | Mike Mollica | Approved |
| Omni | Travel | D&O | 11/30/13 | 35M | <10 | **5** | New | Broker 4 | John Mollica | Approved |

FIG. 82

| Originator | Your Ranking | Broker Prem. | Your Premium Share | # of clients | Client Density | Pipeline | Submission Requests | Approved | Declined | Hit Ratio |
|---|---|---|---|---|---|---|---|---|---|---|
| Acorn Insurance Broker | 12 (43) | 100M | 6% | 235 | 15% | $50 | 235 | 72 | 14 | 23% |
| IMA Financial Group | 12 (17) | 100M | 6% | 235 | 15% | $50 | 235 | 72 | 14 | 23% |

| Product | Total Premium | Your Density | # of competing carriers | # of originators | Total MarketPlace Value |
|---|---|---|---|---|---|
| Property | 414M | 8% | 15 | 15 | 1020M |
| Casualty | 602M | 12% | 23 | 42 | 1845M |
| Marine | 125M | 2% | 3 | 4 | 437M |
| Liability | 643M | 4% | 27 | 27 | 2176M |

SYSTEMS AND METHODS FOR FACILITATING AN INSURANCE MARKETPLACE FOR NEGOTIATIONS AMONG BROKERS AND INSURANCE CARRIERS

CROSS-REFERENCE TO RELATED APPLICATION

This patent application claims priority to, and incorporates by reference in its entirety, U.S. Provisional Patent Application No. 61/762,440, entitled "SYSTEMS AND METHODS FOR FACILITATING AN INSURANCE MARKETPLACE FOR NEGOTIATIONS AMONG BROKERS AND INSURANCE CARRIERS", and filed Feb. 8, 2013.

FIELD

The present disclosure generally relates to a system for facilitating transactions among multiple insurance brokers and multiple insurance carriers.

SUMMARY

The present disclosure generally relates to a system for facilitating transactions among multiple insurance brokers and multiple insurance carriers.

According to exemplary embodiments, an exemplary method includes the steps of receiving, at one or more computers from a first requestor device, a request to identify one or more insurance carriers, the request associated with a party seeking insurance coverage; determining, at the one or more computers, one or more search parameters based at least in part on the received request. The method further includes accessing, using the one or more computers, one or more electronic databases stored on one or more non-transitory computer-readable storage media and operatively connected to the one or more computers, the databases comprising information for a plurality of insurance carriers, including for one or more of the respective carriers: (i) profile information identifying the respective carriers, (ii) product information identifying one or more insurance products offered or underwritten currently or historically by the respective carriers; (iii) coverage information indicating terms, conditions, coverage limits, layer preferences, deductible preferences, catastrophic coverage preferences, geography preferences, and industry preferences associated with the respective carriers; (iv) experience information indicating the current or historical experience of the respective carriers by industry, geography, insured size, loss ratios, engineering and loss control, insurance claims, and total underwritten premiums; (v) carrier ratings information indicating one or more financial ratings for the respective carriers; (vi) relationship information indicating current or historical relationships with at least one of: 1) one or more entities related to the party seeking insurance; or 2) one or more intermediaries associated with the party seeking insurance; and (vii) reputation information indicating current or historical feedback regarding the services or performance of the respective carriers. The method further includes determining, by the one or more computers accessing data in the databases, one or more carriers matching the determined search parameters; obtaining, at the one or more computers, one or more refinement preferences associated with the requestor; determining, by the one or more computers, a subset of carrier matches based at least in part on applying the obtained refinements preferences to the determined matches; and providing, to the requestor device by the one or more computers, at least the determined subset of carrier matches.

According to the method the provided carrier matches may comprise at least one of 1) carriers which have sent a request for submission to the party seeking insurance; 2) carriers which have declined the party seeking insurance; and 3) carriers which have not sent a request for submission and have not declined the party seeking insurance. After providing the carrier matches, the method may further include receiving, at the one or more computers from the first requestor device, a selection of one or more of the provided carrier matches, and yet may further include receiving, at the one or more computers, an indication to send a submission to the one or more selected carriers; and sending, by the one or more computers, a submission on behalf of the requestor to one or more devices associated with the one or more selected carriers.

In embodiments, after receiving a selection, the method may further include providing, by the one or more computers, a negotiation interface to the requestor device; and providing a negotiation interface for each of the one or more selected carriers, wherein the interface provided to the requestor can communicate with each of the interfaces provided to the selected carriers so as to facilitate negotiations to purchase insurance.

In embodiments, receiving a selection, the method may further include receiving, at the one or more computers, an indication to decline at least previously sent request for submission from one of the one or more selected carriers.

In embodiments, the party seeking insurance coverage is any one of a corporation, limited liability corporation, joint venture, bank, hedge fund, industry association, lending institution, non-profit organization, and/or government entity.

In embodiments, the one or more search parameters of the method may include information indicating any of one or more insurance products, total risk exposure, one or more coverage limits, one or more exclusions, one or more deductibles, one or more insurance layer preferences, and/or one or more self insured retention amounts. The one or more search parameters may also include information indicating any of one or more geographies, one or more industries, one or more revenue amounts, one or more employee sizes, catastrophic exposure history, and loss and claims history. Further, the catastrophic coverage preferences may include information indicating the amount of coverage for earthquake, wind, flood, and tornado events. For example, the earthquake events may be for regional or global earthquakes.

In embodiments, the experience information may include information indicating market share of premiums underwritten by the respective carriers for one or more products by geography, size, industry, the number clients underwritten by the respective carriers, the length of time in the marketplace of one or more products offered by the respective carriers.

In embodiments, the engineering and loss control may include information indicating the respective carriers expertise in providing safety and loss control advice. In embodiments, the requestor device may be associated with an insurance broker, an insurance agent, an insurance wholesaler, an insurance managing general agent, or an insurance pool.

According to exemplary embodiments, an exemplary method includes the steps of receiving, at one or more computers from a carrier device, a request to identify one or more entities on behalf of a carrier; determining, at the one or more computers, one or more search parameters based at least in part on, the received request; and accessing, using the one or more computers, one or more electronic databases stored on one or more non-transitory computer-readable storage media and operatively connected to the one or more computers, the databases comprising information for a plurality of insurance seeking entities, including for one or more of the respective entities: (i) profile information identifying the respective entities; (ii) product information identifying one or more insurance products sought by the respective entities; (iii) industry information indicating the one or more industries related to the respective entities; (iv) size information indicating at least one of the amount of individuals persons part of the respective entities, the amount sales generated by the respective entities, and the market capitalization of the respective insurance seeking entities; (v) coverage information indicating one or more current or historical, premium payments, terms, conditions, coverage limits, program layer designs, deductible amounts, catastrophic coverage requirements, geography requirements, and associated industry requirements for the respective entities; (vi) negotiation information indicating actions undertaken with respect to one or more negotiations involving the respective entities and one or more associated insurance products; (vii) risk selection weighting criteria indicating preferences for at least one of carrier ratings, reputation, claim payment history, financial security, geographic implementation abilities, pricing, and relationship duration history; and (viii) interaction information indicating current or historical actions undertaken by the respective entities to seek coverage, and request insurance quotes.

The method may further include the steps of determining, by the one or more computers accessing data in the databases, carrier preferences by analyzing the respective entities' current or historical insurance programs including the carrier; determining, by the one or more computers accessing data in the databases, one or more entities matching the determined carrier preferences; determining, by the one or more computers accessing data in the databases, one or more entities matching the determined search parameters; determining, by the one or more computers accessing data in the databases, one or more entities based at least in part on previous declinations involving the carrier; determining, by the one or more computers accessing data in the databases, one or more entities matching a modified version of the determined search parameters; determining, by the one or more computers accessing data in the databases, one or more entities based at least in part on negotiations involving the carrier; aggregating, by the one or more computers, the entities determined by previous steps; and providing, to the carrier device by the one or more computers, the aggregated entities.

The method may further include the step of receiving, at the one or more computers from the carrier device, a selection of one or more of the provided entities and the step of receiving, at the one or more computers from the carrier device, an indication to send a request for submission with respect to one or more of the selected entities.

After the step of sending a request for submission, the method may further include the steps of (o) sending, by the one or more computers to the carrier device, in response to the request for submission, a submission indication on behalf of the respective entity and providing, by the one or more computers, a negotiation interface to the carrier device.

Further, after the step of receiving a selection of one or more of the provided entities, the method may further include the step of receiving, at the one or more computers from the device associated with at least one of the selected entities, an indication to decline a submission previously sent to the carrier.

According to the method at least one of declinations are either by the carrier and/or by the entity.

Further, one or more provided entities are at least one of a corporation, limited liability corporation, joint venture, bank, hedge fund, industry association, lending institution, non-profit organization, or government entity.

DESCRIPTION OF THE DRAWINGS

The features and advantages of the present disclosure will be more fully understood with reference to the following, detailed description when taken in conjunction with the accompanying figures, wherein:

FIGS. 2A and 2B are schematic representations illustrating types of data stored in a database of the system according to an exemplary embodiment of the present disclosure.

FIG. 42 is an exemplary interface providing report information to a carrier according to an exemplary embodiment of the present disclosure.

FIG. 48 is an exemplary interface providing submission request information to a broker according to an exemplary embodiment of the present disclosure.

FIG. 49 is an exemplary interface providing carrier appetite information to a broker according to an exemplary embodiment of the present disclosure.

FIG. 50 is an exemplary interface providing broker-carrier relationship information to a broker according to an exemplary embodiment of the present disclosure.

FIG. 51 is an exemplary interface providing carrier match information to a broker according to an exemplary embodiment of the present disclosure.

FIGS. 52-58 are exemplary interfaces providing market opportunity information to a broker according to an exemplary embodiment of the present disclosure.

FIGS. 73-88 are exemplary interfaces illustrating screenshots for a carrier dashboard according to an exemplary embodiment of the present disclosure.

DETAILED DESCRIPTION

The present disclosure generally relates to systems and methods for facilitating negotiations and/or transactions among insurance carriers and brokers/wholesalers/pools in the property, casualty, and benefits insurance space/market. In embodiments, clients, (which are corporations/organizations/entities/etc.) may also participate. Generally, in the current systems, there is a lack of transparency of opportunities and/or options available. In other words, there is a lack of product/insured-risk transparency, price transparency, and competition knowledge. In exemplary embodiments, the present disclosure provides systems and methods by which information regarding potential insurance opportunities becomes more transparent to potential carriers, brokers/wholesalers/pools of insurance buyers and/or insureds.

Figure 1:
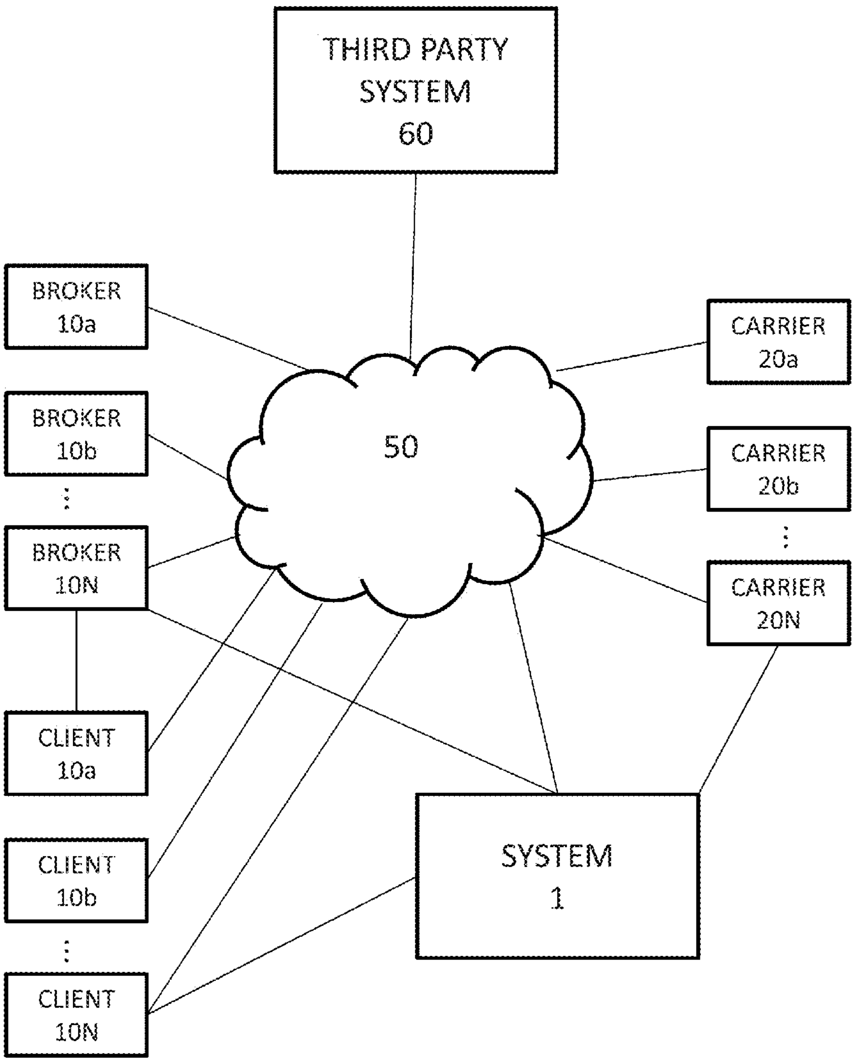
FIGS. 1 and 1A are schematic representations illustrating a system 1 operatively connected to one or more client devices, broker devices, carrier devices, third party systems, and/or reinsurance brokers according to an exemplary embodiment of the present disclosure.

FIG. 1 shows, according to an exemplary embodiment, a system diagram including a system generally designated by number 1. The system 1 can operatively connect to one or more broker devices or systems 10*a*, 10*b* . . . 10N, which are collectively or individually designated by number 10. The system 1 can operatively connect to one or more insurance carrier devices or systems 20*a*, 20*b* . . . 20N, which are collectively or individually designated by number 20.

As shown in FIG. 1, the system 1 can connect directly or indirectly to the broker devices 10, and/or carrier 20 devices. The system 1 can operatively connect with one or more networks, referenced herein as network 50 for convenience. The network 50 may include, for example, the Internet, a cellular network, WAN, LAN, or other private or public networks.

The broker devices 10, and/or the carriers devices 20 may be any type of desktop, laptop, smartphone (e.g., iPhone, Android, Windows Phone, Blackberry, to name a few), tablet device (e.g., iPad, iPod, Touch, Kindle, Android, Microsoft Surface, Chrome Book, to name a few), and any other suitable computing device(s), etc.

The broker devices 10 and/or the carrier devices 20 can interact with the system 1. For example the broker devices 10 and/or carrier devices 20 may execute one or more processes/applications to interface and interact with the system 1. In exemplary embodiments, the broker devices 10 and/or carrier devices 20 can interact with the system 1 through a web browser, an application, or any suitable user interface.

In some exemplary embodiments, the system 1 may operatively connect with one or more third party networks/systems 60 in accordance with exemplary embodiments described herein. The third party networks 60 may include, for example, information networks or any other suitable network. Exemplary third party networks can include billing systems, risk benchmarking systems, program management systems, carrier relationship systems, policy/contract storage systems, people management systems (broker's and carriers employees) customer relationship management systems, information systems, rating agency information, to name a few. For example, some systems used in accordance with embodiments described herein include Dun & Bradstreet, OneSource, Hoovers, Edgar (SEC information), SNL Financial, Moody's A.M. Best, and the like, to name a few.

Figure 1A:
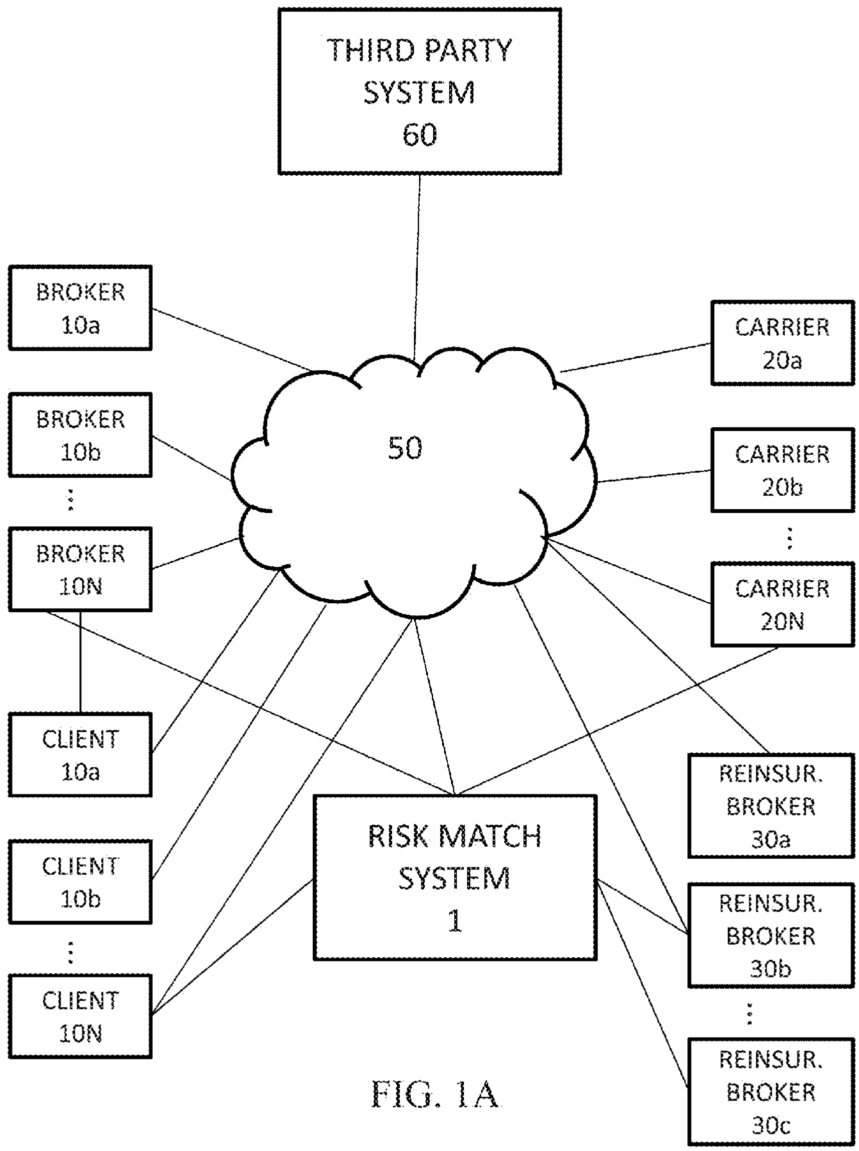

FIG. 1A shows, according to an exemplary embodiment, an alternative system diagram including a system 1 operatively connected to one or more broker/client devices 10, carrier 20 devices, reinsurance broker devices 30*a*,30*b*, . . . 30N (collectively or individually designated reinsurance device 30), and third party systems.

Figure 2:
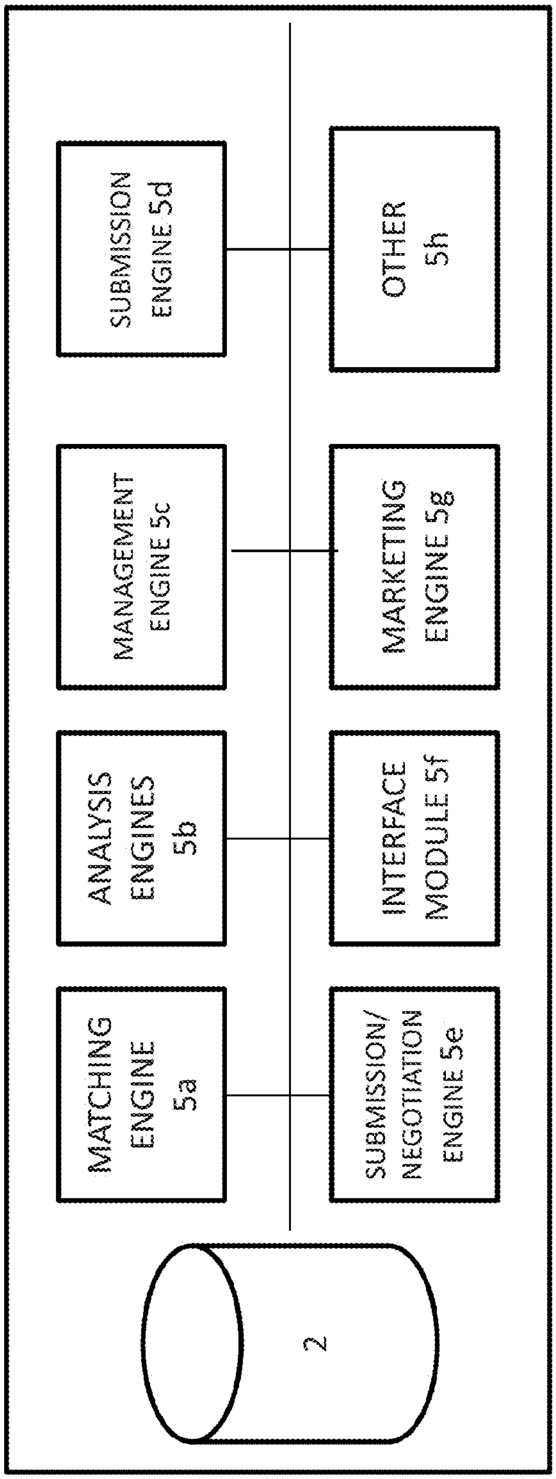
FIG. 2 is a schematic representation of aspects of the system according to an exemplary embodiment of the present disclosure.

FIG. 2 shows, according to an exemplary embodiment, a diagram showing exemplary components or modules of the system 1. The risk system 1 may include a database 2 and one or more modules 5*a*, 5*b*, 5*c*, 5*d*, 5*e* and 5*f*, may be implemented, at least in part, as one or more executable software instructions/processes. Such software instructions may be stored on and/or accessed from non-volatile (e.g., non-transitory) computer-readable storage media.

In exemplary embodiments, the system 1 can include a matching engine 5*a*, an analysis engine 5*b*, a management engine 5*c*, a submission engine 5*d*, a negotiation engine 5*e*, an interface module 5*f*, a marketing engine 5*g*, and/or other complementary modules 5*h*. The process associated with the modules may be implemented by one or more computer devices/processors (not shown) as well as any other required software/hardware. The database 2 can store and retrieve data information related to brokers, carriers, clients/corporations, insurance policies (past and current), analyses, etc., as well as any other suitable information. In exemplary embodiments, the engines and associated components can be implemented on one or more computing devices. For example, one more of the engines may be implemented on one or more separate computing devices and/or hardware devices which are operatively connected.

The processes associated with the modules may be implemented by one or more computer devices/processors (not shown) as well as any other required software/hardware. The database 2 can store and retrieve data information related to user, mortgage and related property, financial information, contact information, etc. as well as any other suitable information.

In exemplary embodiments, the engines and associated components can be implemented on one or more computing devices. For example, one more of the engines may be implemented on one or more separate computing devices and/or hardware devices which are operatively connected.

While the database 2 is illustrated as a single component, this merely exemplary and not meant to be limitation. In some exemplary embodiments, the database 2 can comprise one or more database systems which may be located locally and/or remotely and operatively connected to the other components of the system 1 (e.g., hardware, software, subsystems, etc.). Any suitable database systems or formats may be used, wherein the various data/information may be subdivided and managed into one or more databases, tables, etc. as is appropriate in accordance with embodiments described herein.

FIGS. 2A-2B, show, according to exemplary embodiments, exemplary data which may be stored in the database 2, including, for example, broker data 70 and the broker-client data 80, and carrier data 75.

Regarding the broker data 70, the database 2 may store with respect to one or more brokers, broker name 70*a* (for example organizational name), broker location 70*b*, employees or contact persons for the broker 70*c* (including contact information), and products associated with broker 70*d* (e.g., the broker deals with property, casualty, etc.). Additionally, the stored broker data 70 may include data including carrier relationships 70*e*, commissions and fees 70*f*, clients 70*g*, broker organization, broker hierarchy, & broker departments 70*h*, correspondent broker relationships 70*i*, current & past interaction history & surveys 70*j*, risk selection weighting 70*k*, to name a few. For example, the carrier relationships data 70*e* may indicate any (current and past) relationships and/or interactions the broker has had with the one or more carriers, and the nature of the relationships, including carriers who have underwritten policies for the broker's client, and the like. The commission and fees data 70*f* may information indicating commission and/or fees the broker currently charges, and/or has previously offered or charged for various insurance products. The clients data 70*g* may be information related to current and/or past clients of the carrier(s). Such data may include data may include data reflecting or describing the broker's clients (e.g., geography, size, sales, contact persons, etc.). The broker organization, hierarchy & department data 70*h* may include information indicating the broker's organization structure. The correspondent broker relationship data 70*i* may indicate other brokers that may correspond and/or work with in brokering insurance transactions. This correspondent brokers may not necessarily be affiliated with the broker.

The current & past interaction history and surveys may be data indicating all or some of the interactions the broker has had through the system 1, in other words data that tracks the engagements and/or actions of the broker. The risk selection weighting data 70*k*, may be information indicating the broker's and/or broker's clients preferences with respect finding prospective carriers to underwrite insurance. In this regard the risk selection weighting data 70*k* may include weights or factors that are to be applied or utilized in determining matches for one or more clients.

The broker data may include placement information 701, which may include information regarding the vendors who have or currently involved with the broker and the associated vendor contacts, the size of clients (e.g., size with regard to employee size, sales size, etc.), the geographical location the broker deals covers, etc.

Regarding the broker-client data 80, the database 2 may store with respect to one or more clients (the insureds may, but do not necessarily have to be associated a broker), client name 80*a* (e.g., company or organizational name), demographic profile 80*b* (client or insured size, sales, location(s), etc.), contact persons for the client 80*c*, client risk profile 80*d* (e.g., amount of coverage the client desire to be underwritten), risk history 80*e* (e.g., previous risk underwritten).

Other broker-client 80 may include exposure details 80*f*, risk history 80*g*, interaction & negotiation history 80*h*, insurance related vendors 80*i*, program design 80*j*, carrier details 80*k*, losses, claims, settlements 80*l*, policy terms, conditions, and exclusions 80*m*, risk selection weighting 80*n*, financial ratings 80*o*, social media information 80*p*. The exposure details data 80*f* may include data indicating how much exposure the client/insured may want or ask to be underwritten. The risk history data 80*g* may include information indicating the client's previous risks or risk relate events. The interaction & negotiation history data 80*h* may indicate all or some of the interactions the client/insured has through the system 1. The program design data 80*j* may indicate the past and/or current insurance program design the client is seeking or previously sought. The carrier detail data 80*k* may indicate the one or more carriers associated with the client/broker, for example, carriers which currently or previously provided insurance for the client, or carriers which have negotiated with the client. The losses, claims, and settlements data 80*l*, may contain data indicating one or more current, on-going, or historical losses, claims and settlements negotiated, litigated, etc. on behalf of the client. The policy terms, conditions, and exclusions data 80*m* may include the information regarding the insurance policies that the client current or previously had, including terms, conditions, exclusions, etc.

The risk selection weighting data 80*n* may include data indicating the clients preferences with respect finding prospective carriers to underwrite insurance. The financial rating data 80*o* may be information indicating the financial or credit worthiness of the client, e.g., and may be from one or more ratings agencies (example, Moody's). The social media data 80*p* may be information from one or more social networks related to the broker and/or client.

Regarding the carrier data 75, the database 2 may store with respect to one or more carriers, organization name 75*a*, carrier location 75*b*, employees or contact persons for the carrier (including employee hierarchy and contact information) 75*c*, carrier profile 75*d*, products 75*e*, broker relationship 75*f*, commission & fees 75*g*, carrier's appetite 75*h*, carrier's underwriter 75*i* (including name & contact information), underwrite metrics (e.g. reputation, statistics regarding underwriter) to name a few.

The profile data 75*d*, may include information related to the carrier's corporate structure (e.g., including a family tree showing all related entities of the carrier), the carrier's issuing papers etc. The broker relationship data 75*f* may be information indicating brokers (current and/or previous) that have engaged with the carrier. The commission & fees data 75*g* may be information indicating the fees/commissions associated with brokers that have engaged with the carrier, or brokers that may engage with the carrier. The appetite data 75*h*, may be information indicating the amount of exposure that the carrier wishes to underwrite, currently or historically has underwritten. The underwriter data 75*i* may be information indicating the underwriters associated with carrier and one or more clients/brokers. The underwriter metrics 75*j* may be information indicating the reputation and/or performance of the underwriter 75*j*. The carrier organization, hierarchy & depts data 75*k* may be information indicating the structure of the carrier with regards to employees, departments, etc.

The ratings data 75*l*, may include information indicating financial, broker and client ratings. The financial ratings may indicate the credit or financial worthiness with respect to one or more clients. The broker and/or client ratings may indicate the reputation, effectiveness, or other feedback indicating suitability of brokers/clients. The client data 75*m*, may identify the one or more clients the carrier is engaged with, e.g., negotiating, interested in underwriting, currently underwriting, and/or previously underwritten.

The metrics data 75*n*, may be information indicating carrier characteristics or performance, for example, metrics indicating density information (for industry, geography, etc.), metrics indicating amount of business successful won, amount of business lost, amount of business/negotiations declined, and amount of pipeline (e.g., total amount of business currently engaged with or underwritten). The carrier reputation data 75*o* may be information indicating the reputation (actual and/or perceived data). The interaction history 75*p* may be tracking related information indicating the some or all the actions and/or interactions involving the carrier with respect to the system 1.

Referring to FIG. 2, the matching engine 5*a* may include one or more processes for matching prospective clients, and by extensions their brokers, with carrier using, for example, information obtained from brokers/clients and information obtained from the insurance carriers. The matching engine 5*a* may use related information from third-party sources and/or information from metrics/calculations derived by the system 1. The matches may be based on, for example, a request containing one or more criteria, based on historical deployment of capital, and/or based on nearness of similar industries to historical deployment of capital.

In some exemplary embodiments, the matching engine 5*a* may implement a learning engine where the results and information provided by the matching engine can be modified or adjusted based on previous interactions, selections/choices, and the like by a party such as a broker, insured, and/or carrier. In this regard, the matching engine 5*a* may collect, store, segment, and/or classify inputs associated with one or more parties, profile and index every variable collected/obtained by time interaction, by product and/or by party. The matching engine 5*a* may also analyze and/or rank requirements by using a probability hierarchy and/or nearness factors, for example, based past experiences.

The analysis engine 5*b* may implement one or more processes in order to analyze insurance brokers, carriers, and/or clients. In exemplary embodiments, analyses may be provided to the broker devices 10 and/or client devices 30, for example to assess the viability of insurance carriers for clients. The engine 5*b* may provide useful information regarding one or more of a plurality of insurance carriers or markets. For example, a broker or client may be provided one or more analyses for one or more carriers for density/experience/market share in product, industry, geography, size, client relationship, and the like, to name a few.

In an exemplary embodiment, analyses may be provided to the carrier devices 20, regarding insurance carriers. For example, a carrier may be provided one or more analyses for one or more brokers/clients for density/experience/market share in product, originator, industry, geography, size, client relationship, and the like, to name a few.

The management engine 5*c* may implement one or more processes for managing insurance transactions among brokers, clients, and/or carriers. For example, with regard to a broker, the management engine may provide functionalities and/or interfaces for reviewing broker and associated client information, including with respect to billing, notifications (e.g., notifications about upcoming insurance policies to renew, new opportunities, etc.). Similarly interfaces can be provided to clients and/or carriers. The management engine 5*c* may facilitate the storage and retrieval of insurance policies, contracts, billings, and the like (historical and current) as is appropriately needed by brokers, clients, carriers, and/or other components of the system 1.

The communication engine 5*d* may implement one or more processes for facilitating communications among brokers, clients and/or carriers. The communication engine 5*d* may provide interfaces/tools for allowing brokers, clients, and/or carriers to communicate and/or exchange information with each other, including providing submissions or request for submissions. In exemplary embodiments, the communication engine 5*e* can allow brokers via broker devices 10 to provide a Submission to an indicated insurance carrier. The negotiation engine can also receive and provide Request for Submissions from carrier devices 20 directed to a broker and/or a client. The communication engine 5*d* may facilitate the negotiation and/or finalization an insurance agreement between a broker/client and insurance carrier. The communication engine 5*d* may provide detailed information regarding a quote to a broker device 10 in response to a Submission. In some embodiments, the communication engine 5 can merely identify contacts.

The report module 5*f* may implement one or more processes for allowing the system 1 to generate and/or provide reports to broker(s), clients, and/or the carrier(s). For example, the interface module can implement process that allow brokers 10 and carriers 20 to register with the system 1.

The marketing engine 5*g* may implement one or more processes for providing market opportunities and/or advertisements to brokers, clients, and/or carriers. Exemplary embodiments regarding the marketing opportunities are described herein detail. Regarding advertisements, the marketing engine 5*g*, may provide, list, highlight, and/or indicate one or more featured brokers, carriers, and/or clients. In this regard, the marketing engine 5*g* may allow anyone of brokers, clients, of carriers to be listed or displayed in some appropriate conscious way, as a sponsored broker, client, and/or carrier in order to receive exposure/attention. For example, a featured carrier may be listed in the matches provided to a broker. In another example, a sponsored broker may be displayed on one or more carrier's home page provided by the system 1.

In some exemplary embodiments, the system 1 feature listings/displays in exchange for monetary consideration. For example, the frequency and/or the prominence of a featured/sponsored listing may determine the rate or amount to be paid.

In exemplary embodiments, the marketing engine 5*g* may provide introductions services. In this regard, a broker, a client, and/or a carrier, in exchange for some benefit, may be required to meet with another party. For example, a carrier may get benefit, such as a discount or the like for using the system 1, but may be required to meet with an interested broker and/or client who wishes to purchase insurance from the carrier regardless of the carrier's appetite or predefined settings. Conversely, an interested party, (broker, client, carrier) may also in some regard pay for the privilege to get a meeting with another party, e.g., a carrier paying for the privilege to meet with a particular client. The meeting may be done through voice, chat, email, face-to-face, etc. wherein the target party, or a designated representative/contact person is required to have a bona fide meeting with a requesting party's representative/contact person.

In exemplary embodiments, the system 1 may receive inputs in order facilitate providing matches among brokers, clients, and carriers. For example, some inputs or input factors the system 1 may receive include Insured and Uninsured Risk Detail, Historical Interactions of Participants and Risk, Risk Selection Weighting, Capital Deployment History, Capital Allocation Strategy (future), Ratings, Demographic Information, Claims, Reputation, Interaction Ratings, Ratings of carriers and brokers.

Insured and Uninsured Risk Detail type input may indicate and/or cover historical or current placement details of uninsured and/or insured risk: Which carriers are/were involved in the past, program designs, limits, rates, exposure details, claims, settlements, policy terms, policy, covered entities, exclusions, demographic profile (sales, employees, locations, industry, family trees, ventures, and like etc) of broker's clients, broker, carrier and other participants like TPA, etc.

Historical Interactions of Participants and Risk may indicate or include experiential data from all types of interactions (email, phone, in person, notes etc) between participants (carriers, clients, vendors and others) regarding the risk.

Risk Selection Weighting may indicate a ranking/weighting of the top factors by carrier, client, broker, MGA/wholesaler and other participants in determining the selection process.

Capital Deployment History may indicate a carrier has historically underwritten, quoted, analyzed, or declined. In other words Capital Deployment history may include or indicate a carrier's historical appetite implementation and capital deployment.

Capital Allocation Strategy (future) may indicate what a carrier would like to underwrite, quote, analyze, or decline in the present or future. In other words, it may indicate or include the carrier's present and/or future appetite implementation strategy and capital deployment outline.

Ratings may indicate a carrier's current or historical rating by various agencies (like S&P, Moody's, AM Best, etc).

Demographic Information may indicate demographic profile of carrier, broker, client (e.g., risk), wholesaler, TPA, and any other participant sourced from various public, private and individual sources and systems.

Claims, Reputation, Interaction Ratings, Ratings of carriers and brokers may indicate or include (for example from individual brokers, external sources, interactions, surveys and other such sources) claims, engineering and risk control abilities facilities, services, ratings by clients brokers and carriers.

Figure 3:
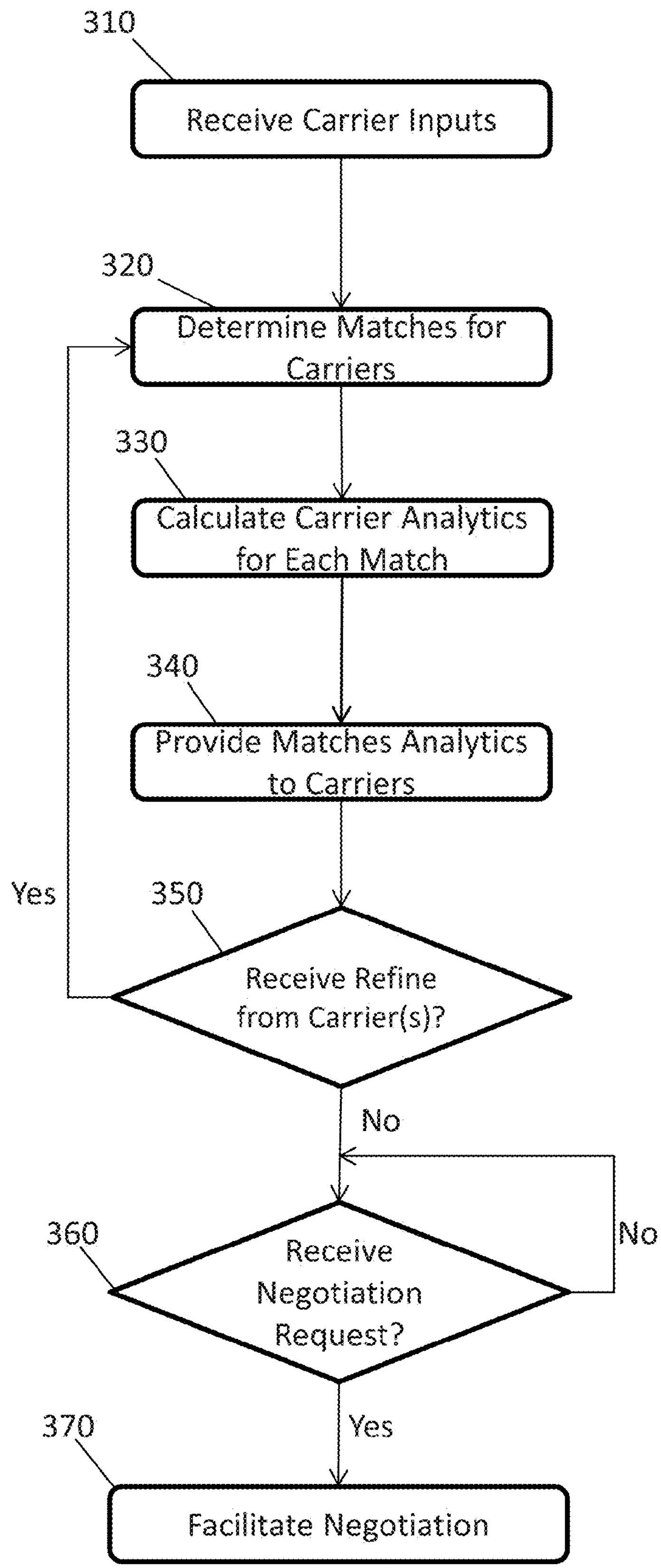
FIGS. 3 and 3A are flows charts illustrating methods involving carriers interacting with the system according to an exemplary embodiment of the present disclosure.

FIG. 3 shows according to an exemplary embodiment, a flow chart illustrating an exemplary method for a carrier utilizing the system 1. At step 310, the system 1, may receive inputs from carrier devices 20.

In exemplary embodiments, carriers provide information regarding their appetite for providing their insurance products. For example, the system 1 receives information indicating the insurance products a carrier may desire to potentially offer. For each product specified, the carrier can specify the industries in which the specified insurance products are to be offered. Other information provided by the carrier can indicate specific product lines and the total insurance value (TIV). The TIV can be specified for each product, for a specific industry, for a combination of specified industries, or for all industries covered by an insurance product.

Similarly, for each product, a carrier can also specify, on an individual or industry basis, such as, for example, the size or number of employees to be covered, the geographical locations where the product is to be offered, and/or locations where the product is not to be offered. For example, a carrier can provide the total number of sales to be covered by insurance product, for example as an exact number and/or a range. Additionally, carriers may specify exclusions, e.g., people, properties, conditions, events, etc. that the insurance carrier will not cover in its policy terms.

In exemplary embodiments, carrier provided information may be specific to the carrier's insurance products. For example, with regards to for property insurance, the percentage of or value of a policy covering catastrophic insurance (CAT %) may be provided. The system 1 allows the carriers to specify the percentage or amount of an insurance covering specific types of catastrophes. Carriers can specify the percentage/amount of an insurance policy for wind damage/catastrophe, flood damage, for earthquake damage, etc.

Other data that carriers may specify is a deductible amount, again, either as percentage, a value, (such as a minimum required value), or a range of values selected from a drop down selection menu. The carriers can also provide data which specifies the insurance layers they wish to insure. For example, a carrier may only want to insure one or more secondary layers, while yet other carriers prefer to insure only the primary or first layer. Some carriers may only insure the first couple of layers, or only the first layer after primary layer. Carriers may also specify any suitable combination of layers to insure to the system 1.

The system 1 can receive information from carriers indicating the amount/degree of business interruptions to be covered for a product, (again either on individual industry basis or for all industries). Other appropriate appetite settings can be specified that are well known in the insurance field. The aforementioned insurance properties are only described for illustration purposes, and other factors can be specified by the carrier to the system 1.

In exemplary embodiments, carrier information may be received by the system 1, such as by being directly or indirectly input from carrier devices. In some embodiments, the carrier information is received at the system 1 through fetching and/or requesting the carrier information directly or indirectly from carrier devices and/or from other third party systems or networks. In some embodiments carriers 20 submit carrier information by selecting from one or more predefined options, which are included, for example, in an interface.

At step 320, the system 1 may determine and/or calculate matches to the carrier based on the carrier appetite. The matches may include brokers and/or clients which are based on client risk profiles, appetite, historical capital deployment, and/or nearness of historical capital deployment, and current appetite, to name a few. In other words, in response to a request for matches to a carrier's appetite, the system 1 may return results which are a combination of matches to the carrier request or appetite, near matches to the carrier's appetite and historical matches to the carrier.

These matches can be stored in the database 2. At step 330, the system 1 may analyze a carrier's profile, appetite, history, nearness, matches, etc. and generates various information, including metrics for the carrier. At step 340, the analyses, e.g., the metrics and other generated/calculated information are provided to the carrier. For example, a carrier may be provided one or more analyses for one or more brokers/clients for density/experience/market share in product, industry, geography, size, client relationship, and the like, to name a few. The carrier or carrier-user requests the matches or analyses, which are to be provided in various interfaces including those described and illustrated herein. The analyses can be stored in database 2.

At step 350, the carrier may amend one or more of their settings, e.g., profile, appetite, etc. In response, the system 1 can repeat steps 330 and 340 and determine matches and analyses based on refined appetite/profile.

Further, the carrier, based on the matches and/or the analyses provided from the system 1, may decide to send a Request for a Submission to one or more brokers/clients via the system 1. These Request for Submissions may be electronically authored by the carrier through the system 1 and then sent to the recipient (broker/client) through any suitable means. If a Request for Submission is accepted by the corresponding broker/client then at step 360 the system 1 can provide an interface step 370 to facilitate negotiations between the carrier and the broker/client.

Figure 3A:
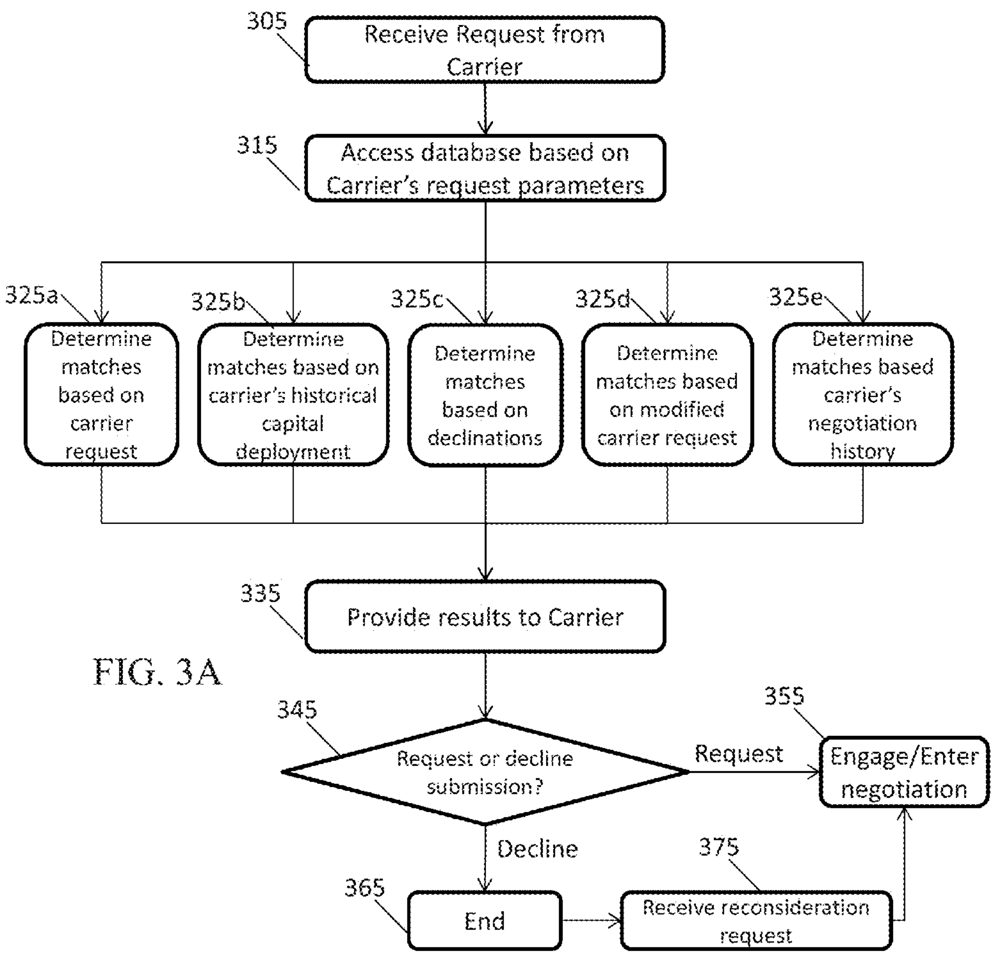

FIG. 3A shows, according to an exemplary embodiment, a flow chart illustrating another exemplary method for a carrier utilizing the system 1. At step 305, the system 1, may receive a request from a carrier device 20. The request may include one or more search parameters specified by the carrier and/or determined or retrieved from carrier settings (appetite) and/or previous search requests. At step 315, the system may access the one or more database 2 based on the received request. In this regard, the system 1 may execute one or more searches. The searches may be done concurrently, separately, together, in any suitable manner in accordance with exemplary embodiments described herein.

For example, at step 325*a*, the system 1 may execute a search of the database 2 in order to determine matches based on the carrier's request. In other words the search is based on the carrier's stated and/or desired appetite.

At step 325*b*, the carrier may execute a search to determine one or more matches based on the carrier's historical capital deployment. In other words, such a search may be done based on historically, the type of products, clients, industries, markets, geographies, etc. the carrier has previously or traditionally done business in, rather than on what the carrier is requesting in search.

At step 325*c*, the carrier may execute a search to determine one or more matches based on the declinations involving the carrier. In other words such a search may be done based on retrieving matches that were in the process of being negotiated or potentially negotiated by the carrier, but one party (e.g., either the carrier, broker, and/or client) declined to proceed.

At step 325*d*, the carrier may execute a search to determine one or more matches by modifying the original search request from the carrier. In this regard the search request may be modified to broaden and/or narrow the search request of the carrier.

At step 325*e*, the carrier may execute a search to determine one or more matches based on the carrier's negotiation history. In other words, such a search may be done by providing matches from brokers/clients that the carrier negotiated with previously.

At step 335, the system 1 may or provide or present the results to the carrier based on the determined matches. In some exemplary embodiments, the results from the one or more searches conducted by the system (e.g., steps 325*a*-325*e*) may be first aggregated. In some embodiments, all the results may be provided and/or may be available to the carrier.

In exemplary embodiments, one or more subsets of the results matches may be provided, presented, or made available to the carrier. In this regard, the results may be presented in various manners and/or methods. In exemplary embodiments, the system 1, may apply "weights" to one or more of the determined matches from steps 325*a*-325*e*. For example the weights or factors may be applied to the each of the determined matches. In this regard, some of the matches from some of the results may be weighted differently. In one case, the results or matches returned from the carrier request may be given more weight/emphasis than other searches, including the type of searches/matches described with respect to steps 325*a*-*e*. Therefore, certain types of results from one or more types of searches may be more prominently presented, arranged, highlighted, than other matches. In some embodiments, some of the determined matches, such as those from steps 325*a*-*e*, may not presented and/or provided to the while others may not be presented/provided. In other words, the weights may filter some of the determined matches.

In some embodiments, the weights may be based on other factors such as carrier settings, and the weights do not necessarily have to be based on the type of searches conducted by the system 1. For example, a carrier may indicate preferences for matches within one or more geographical regions, one or more industries, one or more products etc.

At step 345, based on the results (e.g., brokers/clients/insureds) the carrier may submit a request for a submission to one or more of the matches, or may decline a previous submission sent from one of the matches. If a request for a submission sent by a carrier is accepted, then at step 355, the carrier and the match (broker/client/insured) may enter into a negotiation. The negotiation may be facilitate by the system in any suitable manner in accordance with embodiments described herein.

If at step 345, the carrier does nothing, or declines a submission, then at step 365, the carrier may end the engagement with system 1 and/or or may await further engagements/actions from a broker, carrier, insured, etc. At step 375, the a reconsideration may be received with from a previously declined negotiation, submission requires, etc. In response, the carrier via the system 1 may elect to enter negotiation with the party (e.g., broker, client, insured) sending the reconsideration request, at step 385.

Figure 4:
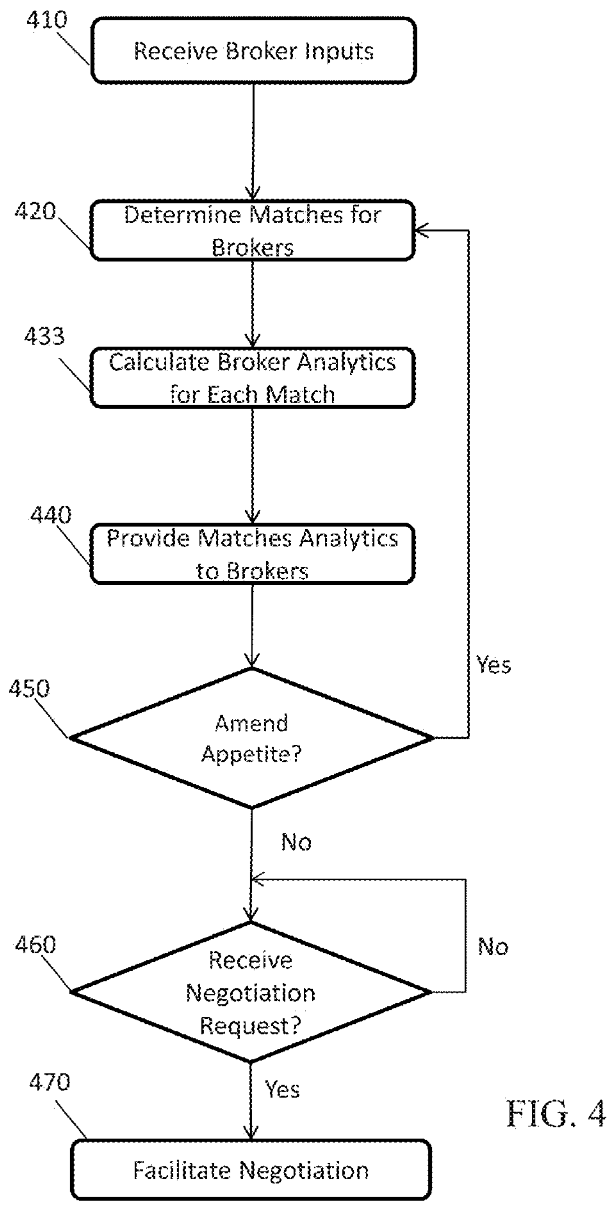
FIGS. 4, 4A, and 4B are flow charts illustrating a method involving brokers interacting with the system according to an exemplary embodiment of the present disclosure.

FIG. 4 shows according to an exemplary embodiment, a flow chart illustrating an exemplary method for brokers/clients/insureds utilizing the system 1. At step 410, the system 1 receives inputs from broker devices 10. The system 1 can receive such input from brokers that already registered with the system 1. The brokers can provide a profile of the broker's clients. The broker's clients may be any type of entity, such as a business, company, charity, person, etc. that is seeking to renew/purchase insurance.

In exemplary embodiments, the client profile may include demographic information relating to one or more clients (e.g., a client or client family tree), risk information relating to one or more clients, placement history, program history, vendor participation history, etc. For example, the client profile can indicate the type of insurance product(s) being sought by the broker on behalf of the client, e.g., property insurance, construction insurance, terrorism insurance, etc. The profile can include an insurance program design showing the insurance scheme sought by the client. The program design can indicate the number and/or amount of insurance layers desired, amount reserves desired, amount of deductibility sought, and other desired features or parameters. For example, an organization may desire to implement an insurance program with 10 layers of insurance with $10 million of coverage in each layer. In some situations, one or more of layers in the program may be specified to be covered by a plurality of carriers. In some cases, an entity may specify a desire for a higher amounts and/or levels of insurance coverage in the primary/first layer than in the secondary layers.

The client profile can describe, for example, in the case of a business, the business type, industry, the business location(s), business size (number employees, number of stores, etc.), business revenue/sales figures, legal history, financial documents (e.g., financial filings such as 10K), business interruptions, and any other relevant business characteristics.

At step 420, the system 1, determines and calculates matches to the broker/broker's clients. These matches (which in this case are carriers which match the broker's client's risk profile) can be stored in the database 2. At step 430, the system 1 analyzes the clients' profiles, appetites, history, nearness, etc. and generates various information, metrics, etc. for the broker and/or the broker's clients. At step 440, the analysis, e.g., the metrics and other generated/calculated information can be provided to the broker. The broker or an employee/user of the broker requests the matches or analyses, which are to be provided in various interfaces as described and illustrated herein. The analysis information generated for the broker is stored in database 2.

At step 450, the broker can amend one or more of their settings, e.g., client profiles, appetites, etc. In response, the system 1 can repeat steps 430 and 440 and determine matches and analyses based on refined appetites/profiles.

Further, the broker, based on the matches and/or analyses provided by the system 1, may submit one or more submissions to one or more carriers via the system 1. Separately and/or concurrently, the broker may receive one or more requests for submissions from one or more carriers. Request for submissions, which may be received on the broker device 30, can be accepted or declined by the broker. If a request for submission is accepted, the broker may submit one or more risk profiles corresponding to one or more clients to carriers via the system 1. If accepted by the carrier, the system 1 can provide at step 470, an interface to facilitate negotiations between the carrier and the broker/client regarding terms, price, time periods for the policy coverage, and/or other related negotiable aspects.

Figure 4A:
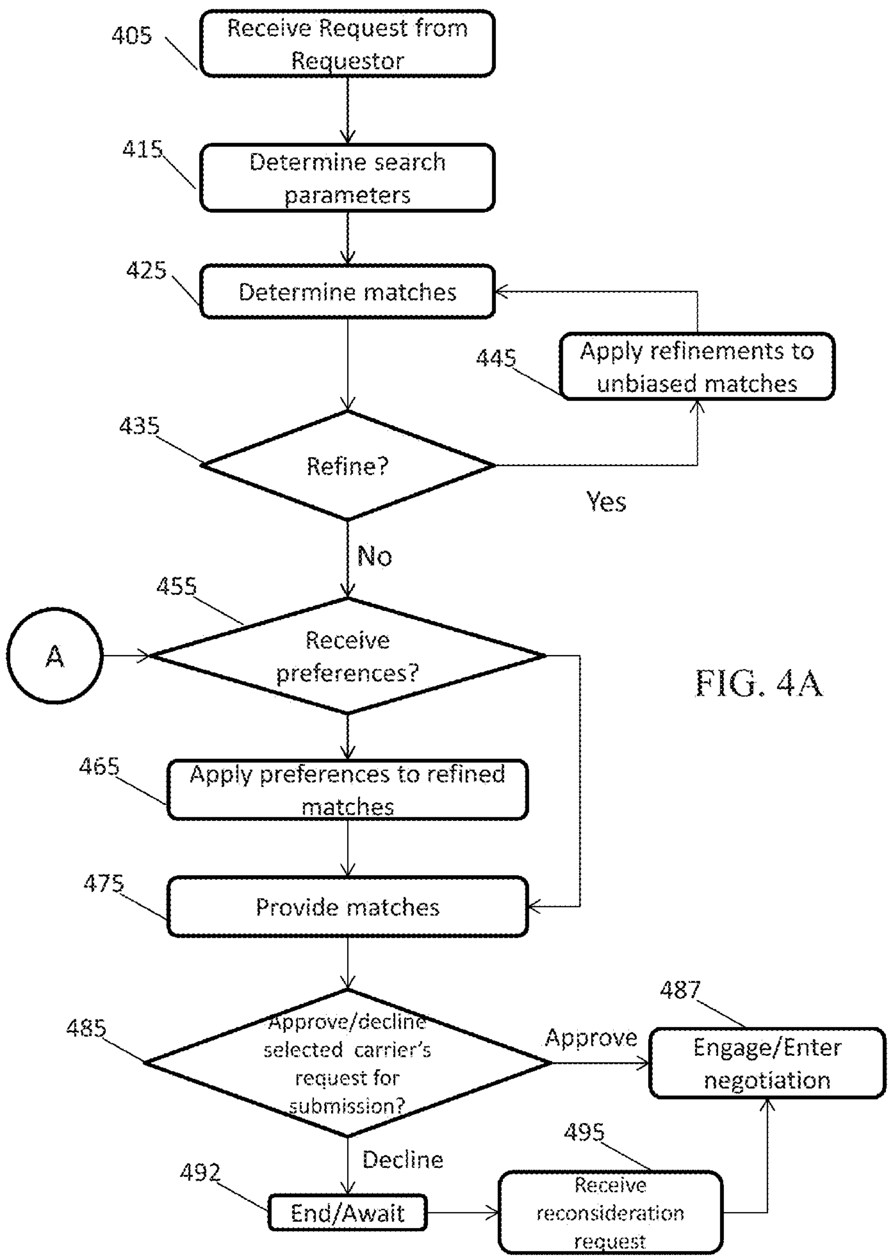

FIG. 4A shows according to an exemplary embodiment, a flow chart illustrating another exemplary method for brokers/clients/insureds utilizing the system 1. At step 405, the system 1 can receive a request from a broker, insured, and/or client ("requestor"). The request may include one or more parameters described herein. In this regard requests may include, for example, one or more industries, one or more products, a risk exposure (e.g., TIV), one or more limits of capital deployment, client/insured profile (e.g., sales, employee size, location, type of company/industry, etc.), losses, claims, and the like, to name a few. Some of the parameters from the request may have been previously specified by the broker, insured, etc. and retrieved from the database 2 and/or from any other suitable storage medium.

At step 415, based on the request, one or search parameters may determined/selected by the system 1 to search the database 2. Based on the search parameters, the system 1, at step 425, may determine one or more matches for the requestor.

The system 1, at step 435, may determine whether to further refine or filter the results from the determined matches. For example, based on the requestor's previously searches, preferences, historical interactions, etc. the system 1 may determine biases/preferences and use them to weigh/filter the results. At step 445, refinements and/or weights may be applied to the determined results. Using the refinements, the matches may be determined again at step 435. Steps 435-455 may be implemented recursively to, for example, pare down a set of results.

Figure 4B:
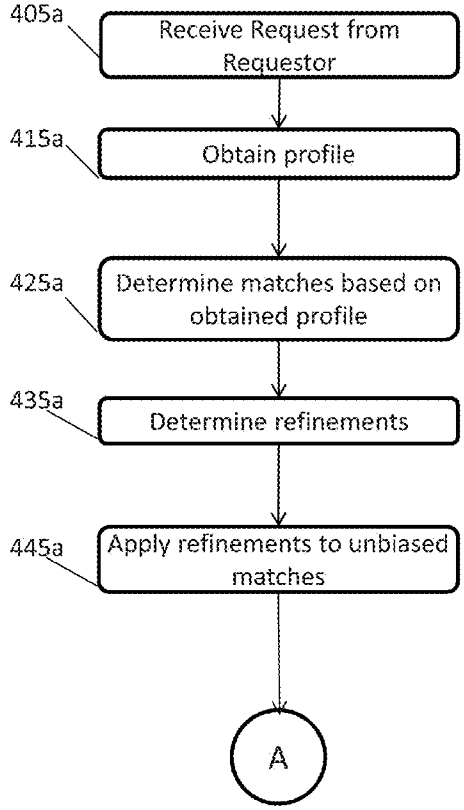
Figure 4C:
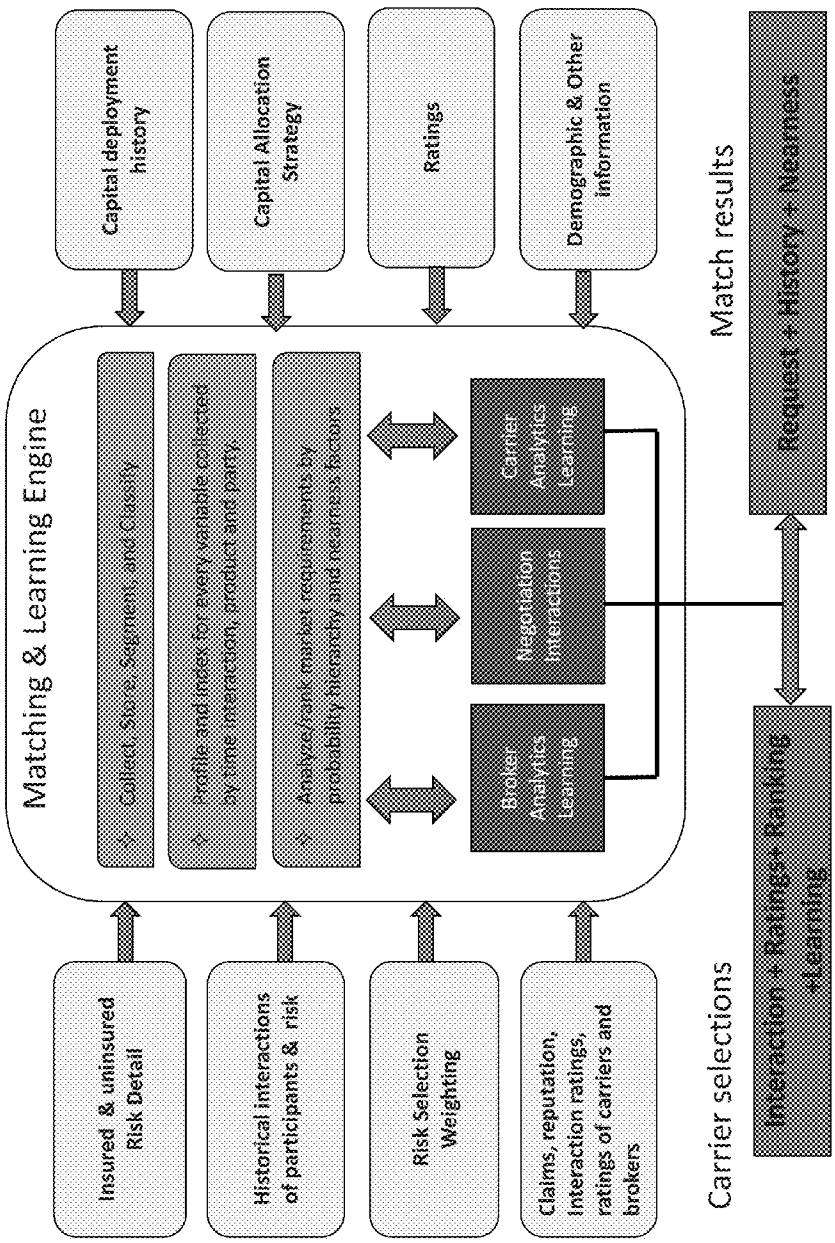
FIG. 4C is a diagram illustrating data processing methods involving broker and carrier interactions according to an exemplary embodiment of the present disclosure.

Alternatively, instead of steps 405-445, FIG. 4B, shows another exemplary method for determining results, with steps 405*a*-445*a*. At step 405*a*, the system 1 receives a request from a requestor (e.g., broker, client, insured, etc.). In response, the system 1 obtains the a profile associated with the requestor. Based on the obtained profile, the system 1, determines matches to the obtained profile, at step 425*a*. At step 435*a*, the system 1 may determine one or more refinements (e.g., filters, weights, etc.) to apply to the determined matches. The refinements may be based at least in part on an analysis of the obtained broker/client/insured profile. For example, it may be determined from the profile, that the broker/client/insured, has tendencies, such as preferences for certain types of carriers, products, premiums, layers, geographies, etc., which may be used by the system 1 to filter results so as to emphasize or provide more relevant results.

At step 445*a*, the determined refinements are applied to the matches determined in step 425*a*. In embodiments, the method may continue as illustrated in FIG. 4A.

At step 455, the system 1 may determine whether to obtain/receive one or more preferences by the requestor. For example, the system 1, may prompt the requestor to input characteristics or explicit preferences regarding the desired type of matches/results. In some situations, the requestor may not have and/or may not provide any particular preferences.

At step 455, the system 1, may determine if there are any preferences/settings with from the requestor. For example a requestor may want to indicate an emphasis and/or focus on matches with respect to one or more geographies, sizes, limit values, layers, and the like to name a few. If there are not preferences, then the matches are provided to the requestor or related party, at step 475. If there are preferences, at step 455, the system 1 will obtains them and applies the preferences to the previously determined matches at step 465, and then provide the matches, at step 475.

At step 485, after providing the matches at step 475, the system 1 may receive an indication of approval or declination with respect to a selected carrier that has sent/transmitted a request for submission to the broker/client/insured associated with the requestor. If an approval has been received with respect to a carrier, the broker/client/insured and the respective carrier may enter/engage in negotiations at step 487.

If an indication of declination with respect to a requesting carrier is received by the system 1 at step 485, then the interaction with the system 1 may be over and/or suspended at step 492. After suspension, or awaiting action, the requestor may receive a reconsideration request at step 495, which can lead back to entering/engaging in negotiations with the carrier, at step 487.

Figure 5:
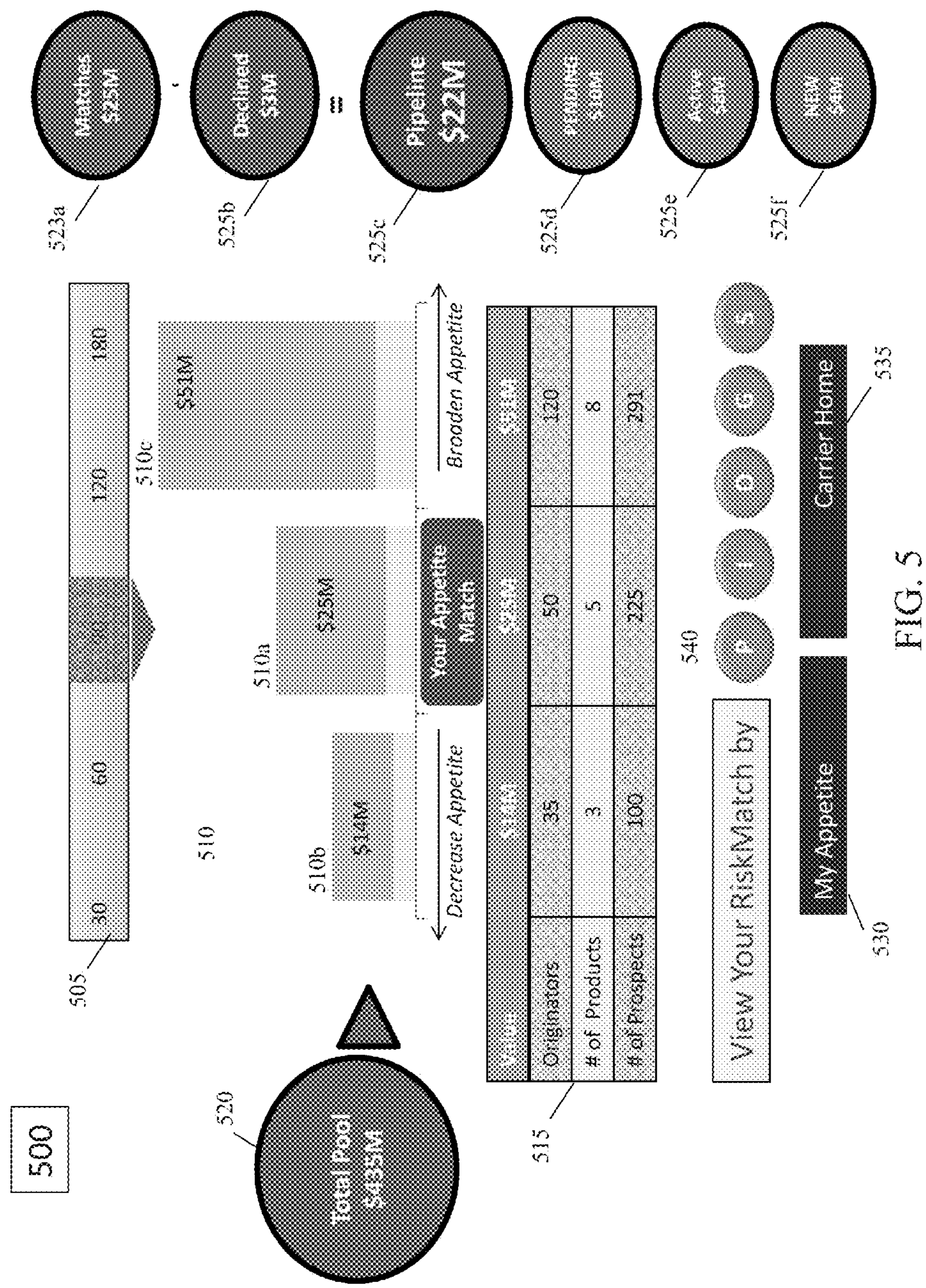
FIGS. 5-10 are exemplary interfaces providing the match results to a carrier according to an exemplary embodiment of the present disclosure.

The system 1 provides various analyses based on carrier insurance appetite settings/history of capital deployment/nearness of capital deployment data. In exemplary embodiments, FIGS. 4 and 4A-4B, shows exemplary processes for providing matches to a carrier or carrier devices. FIG. 5 shows according an exemplary embodiment, an interface 500 providing the match results. The interface 500 may be provided to a carrier device 20 operatively connected to the system 1. As explained herein, the interface 500 may be accessed by an agent/employee of a carrier.

The interface 500 provides aggregate data regarding the matches. The timeline selector 505, determines the period in which the data or aggregate results are shown. In this case, the aggregate results are from matches (e.g., clients, companies, etc.) renewing/seeking insurance matching the carrier's provided appetite settings/history of capital deployment/nearness of capital deployment. In this case, the timeline selector 505 has selected the time period of seeking insurance in 90 to 120 days. Therefore the system 1 provides to carrier data from the matches whose insurance policies requiring renewal in 90 to 120 days. Through the interface, an agent/employee of the carrier may select a different timeline of days, e.g., from 30 to 60, 60 to 90, etc. By selecting each timeline through the timeline selector 505, the other metric and data from the interface may be updated automatically. The timeline selector 505 can be changed by a selection, such as, for example, through a mouse click or some other suitable type of input, and other variations of the timeline selector 505 may be implemented. For example, in some embodiments, the interface 500 provides a timeline selector wherein a user manual inputs a time period.

The interface 500, shows the aggregate appetite match information in various forms. For example, bar graph 510, show the aggregate value of exact matches 510*a*, aggregate value of matches if the carrier's appetite were decreased 510*b*, and aggregate value of matches if the carrier's appetite were broadened 510*c*. In the example of FIG. 5, the interface 500 displays that there is an aggregate $25 million dollars of insurance matching to the carrier's appetite settings. Bar 510*c*, also indicate if the carrier's appetite settings were increased, e.g., the provided TIV were increased, the amount of insurance matching would increase to $51 million dollars. Similarly, if the TIV value of the carrier's appetite settings were decreased (510*c*), the amount of insurance matching the carrier's settings would be $14 million dollars. In exemplary embodiments, other factors of the carrier's settings can also be increased or decreased and with the insurance value of the matches can be provided in the interface 500.

In exemplary embodiments, the interface 500 may provide information in various other formats. For example, Table 515 provides similar information as bar graph 510. For example, Table 515 provides the number of originators (brokers acting on behalf of clients/companies), number of different insurance product, and the number of prospects (clients/companies) corresponding to an exact match of the carrier's appetite settings and, for the matches, when the carrier's appetite settings are increased and decreased.

In exemplary embodiment, the interface 500 provides total pool (potential match insurance value) 520. Additionally, the interface 500 provides exact match value 525*a*, declined match value 525*b*, pipeline value 525*c*, pending match value 525*d*, active match value 525*e*, and/or new match value 525*f*. For example, the declined match value 525*b* may be the insurance value from matching clients/companies that were previously engaged and declined, e.g., the carrier requested to submit a quote and/or the client (or a broker acting on behalf of client) requested a submission, and one of the parties, the carrier or client/broker, subsequently declined. FIG. 5, shows for a carrier, out of the $25 million of exact matches, $3 million was from matches already from declined by either the carrier and/or broker/broker representative. As a result, 525*c* represents, the pipeline value or total exact matching value of clients where one party has not declined. The pending value 525*d* represents the value from matches which the carrier has submitted a request or a quote to a client. The active value 525*e* represents the aggregate value from matching clients who are engaged with the carrier after has submitted a quote. The new value 525*f*, represents the aggregate value from matching clients which are new or have never been engaged by the carrier before. In FIG. 5, these values are displayed on the interface within ovals, but this only exemplary as such information may be displayed in various other formats.

The interface 500 may include various ways to navigate to obtain further analytics, and/or change settings. For example, as shown in FIG. 5 selecting My Appetite 530 may return the user of the interface to the a display or interface for updating carrier's appetite, or selecting 535 for returning to a home screen. Other important options provided in interface 500 include the ability to breakdown the matches by products, industry's, originators, geographys, and sizes. In FIG. 5, the interface 500 provides the "P" 540*a*, the "I" 540*b*, the "O" 540*c*, the "G" 540*d*, and the "S" 540 navigators options which a carrier user can select. Selection of one these options brings the user to another interface. These options may be further provided on other interfaces described herein.

Figure 6:
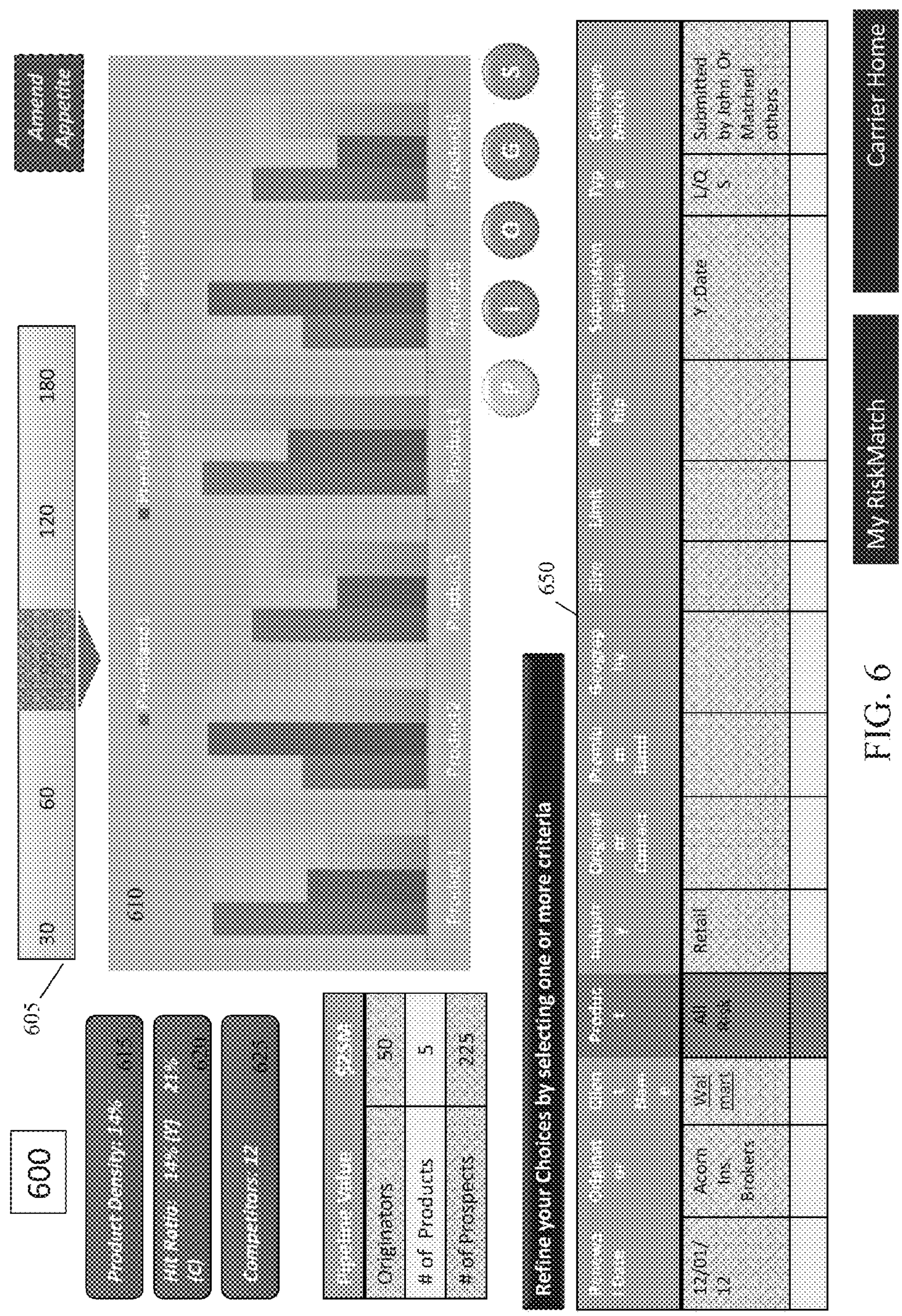

FIG. 6 shows, according an exemplary embodiment, an interface 600 providing the matching results by product. The carrier, as explained herein may specify an appetite to provide one or more insurance products. The results of matches can be displayed in the aggregate as shown in FIG. 5, or may be further broken down by product. For example, in FIG. 6, interface 600 provide product bar graph 610 which shows matching values for Product 1, Product 2, . . . , Product 6 based on the carrier's appetite. For each product listed in the product bar graph 610, aggregate matching values are provided or represented by premium bands. For example, the first or let most bar corresponding to "Product 1" may represent matches to clients requesting insurance with premiums greater than $1 million dollars, the second or middle premium bar may represent the total value of insurance being sought from matches requesting insurance with premium of $100,000 to $1 million dollars, and the third premium bar may represent value of matches for clients seeking insurance with premium less than $100,000 dollars. Please note that these figure are exemplary. Moreover, while the product bar graph 610 shows six products and three premium bands, this is also exemplary and other configuration or variations may be implemented. In some cases there may not be any premium bands, more premium band bars, and/or less premium band bars depending on the circumstances.

Similarly to the interface 500, interface 600 also provides a timeline selector 605. Upon selection of a new or different time period is selected, interface 600 updates with matching results corresponding to the selected time period.

Interface 600 also provides competitor information such as, for example, product density 615, hit ratio 620, and/or the number of competitors 625. The product density 615 is based on the particular carrier's market share for one or more product lines based on the entire universe of participating entities in the system 1. The hit ratio density or success ratio, can be two calculations, including the percentage of successful requests for submissions (e.g., percentage of request for submissions accepted), and the percentage of successful submissions (e.g., submissions that lead to sale with client).

As shown in FIG. 6, the system 1 has determined that the carrier has only has 14% market share in across all its product lines, has a hit ratio 14% for its request for submissions, and a success ratio of 21% of its submissions, and has 12 competitors. While the product density 615, hit ratio 620, and/or the number of competitors 625 are shown in interface 600, such information may be displayed in other interfaces provided to the carrier.

In exemplary embodiments, interface 600 provides table 650, which is a sortable table providing matching results, i.e. the matching companies/potential clients based on the carrier's appetite settings. In embodiments, the table 650 may provide all matches, only top 5 matches, or some other suitable subset of matches. For each match listed, the table has the renewal date, originator, client name, insurance product, industry, contact person for client, premium band of insurance, geography of client, TIV/size, insurance limit, relationship status with the carrier, submission status with carrier, type of layered insurance, and/or colleague match. For example renewal date indicates, provide when the client/companies insurance needs be renewed. The originator indicates brokerage firm or organization representing the client. The client name identifies the client; the product specifies the type of insurance product needing renewal for the client; the industry specifies the industries of the client; the originator provides the contact person or specific broker representing the client; the premium band indicating which premium band does the client's needed insurance value fit within, the geography indicating what geographical area(s)/region(s) the sought insurance covers; the size indicating the number of employees or individuals to be covered or number of sales; limit indicating the amount of coverage required for that layer in the program; relationship indicating any the previous existing between the client and the carrier; submission status indicating the status (if any, like pending, approved, or declined) of a submission by the client to a carrier at a certain date; type indicating the which layers of insurance sought by client (e.g., primary, secondary, etc.); colleague match, indicating if another agent or employee of the carrier has already contacted and/or sent a submission and/or a request for submission to the client.

In embodiments, each of these entries may be clickable in order to provide additional information about the entry, either within the existing interface or on a new screen. For example, clicking a broker under a result may provide additional information about the broker, such as contact information, and other related useful information.

Figure 7:
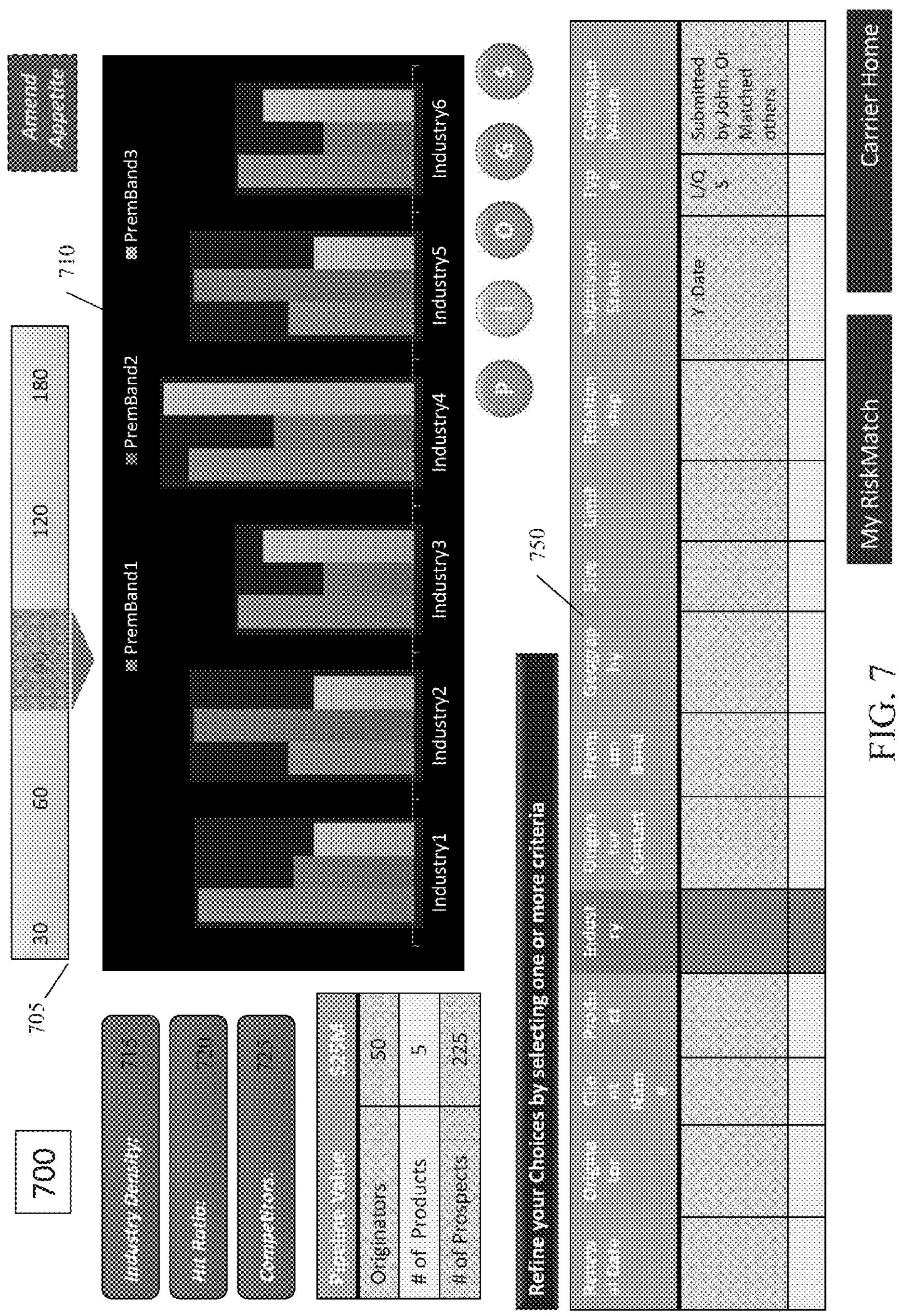

FIG. 7 shows, according an exemplary embodiment, an interface 700 for providing the matching results by industry. Interface 700 shares some the same information and similarities with interface 600.

In this regard, interface 700 provides an insurance bar graph 710 which shows matching values for Industry 1, Industry 2, . . . , Industry 6 based on the carrier's specified appetite settings/history of capital deployment/nearness of capital deployment. For each industry listed in the industry bar graph 710, aggregate matching values are further provided or represented by premium bands, similar to product bar graph 610. For example, the first bar corresponding to "Industry 1", may represent insurance amount matching to clients requesting insurance with premiums greater than $1 million dollars, and the second premium bar represents the total value of insurance being sought from matches associated with Industry 1 and seeking insurance with premiums of $100,000 to $1 million dollars, and so on.

Similar to interface 600, industry density 715, provides the carrier's market share for insurance products in one or more industries as defined in the appetite settings. The industry hit ratio 720, and industry competitors 725 are calculated the same as the corresponding product hit ratio and product competitors 625, except are based on the industry in the appetite settings of the carrier.

Again, like interface 600 interface 700 provides table 750, which is a sortable table providing matching results, i.e. the matching companies/potential clients based on the carrier's specified appetite settings. Sortable table 750 is the same as table 650, except the results are at least initially sorted by industry, instead of by product as in table 650.

Figure 8:
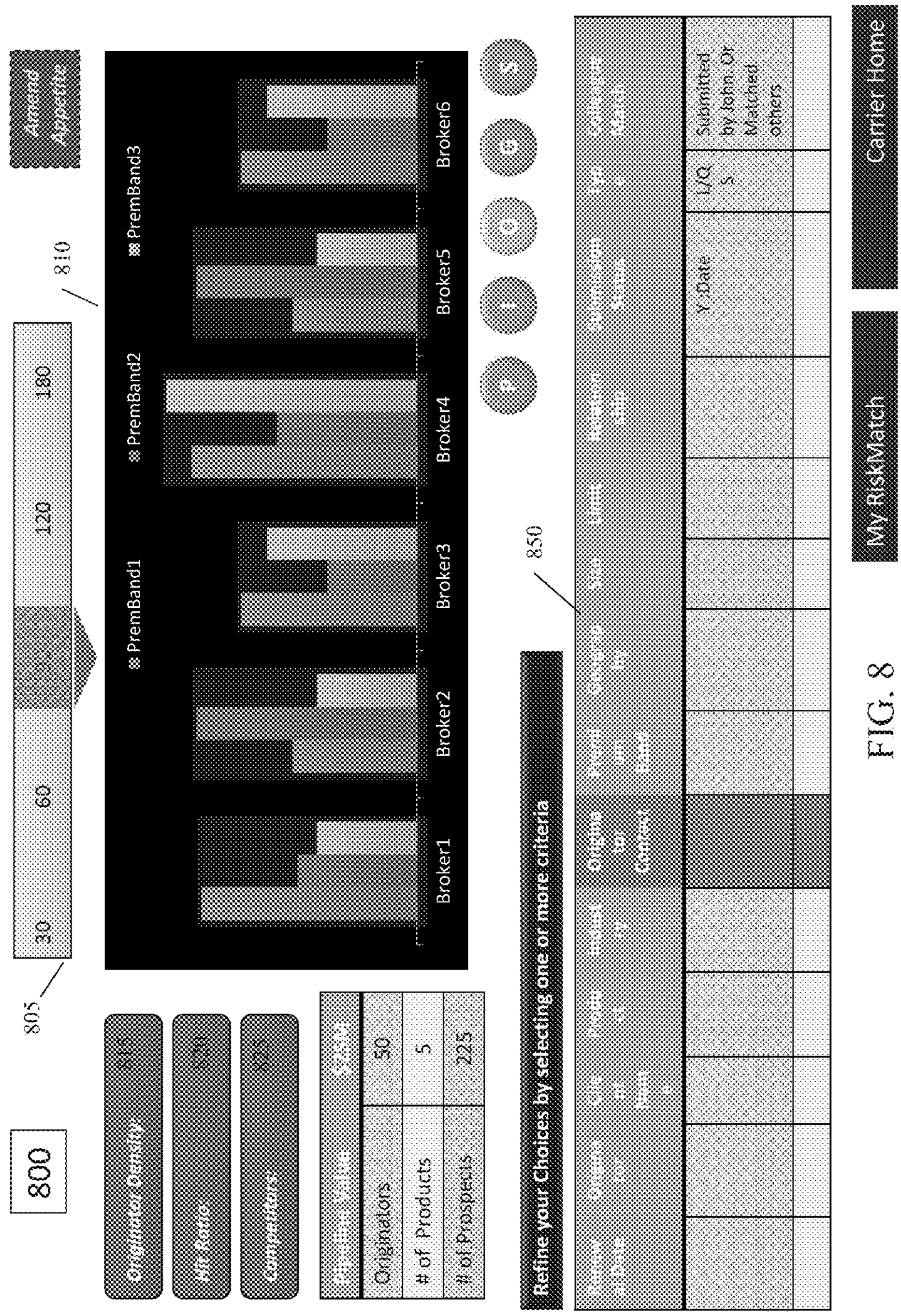

FIG. 8 shows, according an exemplary embodiment, an interface 800 for providing the matching results by originator (broker). Interface 800 shares some of the same information and similarities with interfaces 600 & 700.

In this regard, interface 800 provides an originator bar graph 810 which shows matching values for Broker 1, Broker 2, . . . , Broker 6, again based on the carrier's appetite settings/history of capital deployment/nearness of capital deployment. For each broker listed in the industry bar graph 810, aggregate matching values are further provided or represented by premium bands, similar to product bar graphs 610, 710. For example, the first bar corresponding to "Broker 1", may represents matches to clients associated with Broker 1 who are requesting insurance with premiums greater than $1 million dollars, and the second premium bar representing the total value of insurance being sought from matches represented by Broker 1 and requesting insurance with premium of $100,000 to $1 million dollars, and so on.

Similar to the interfaces 600 and 700, originator density 815, provide the carrier's market share for insurance products for clients represented by one or more brokers according to appetite. The originator hit ratio, and competitors 830 are calculated the same as the corresponding product hit ratio 620 and product competitors 625, except are based on the broker based on the appetite settings of the carrier.

Similar to interfaces 600 and 700, the interface 800 provides table 850, which is a sortable table providing matching results, i.e. the matching companies/potential clients based on the carrier's specified appetite settings. Sortable table 850 is the same as tables 650 and 750, except the results are at least initially sorted by originator/broker, instead of by product as in table 650.

Figure 9:
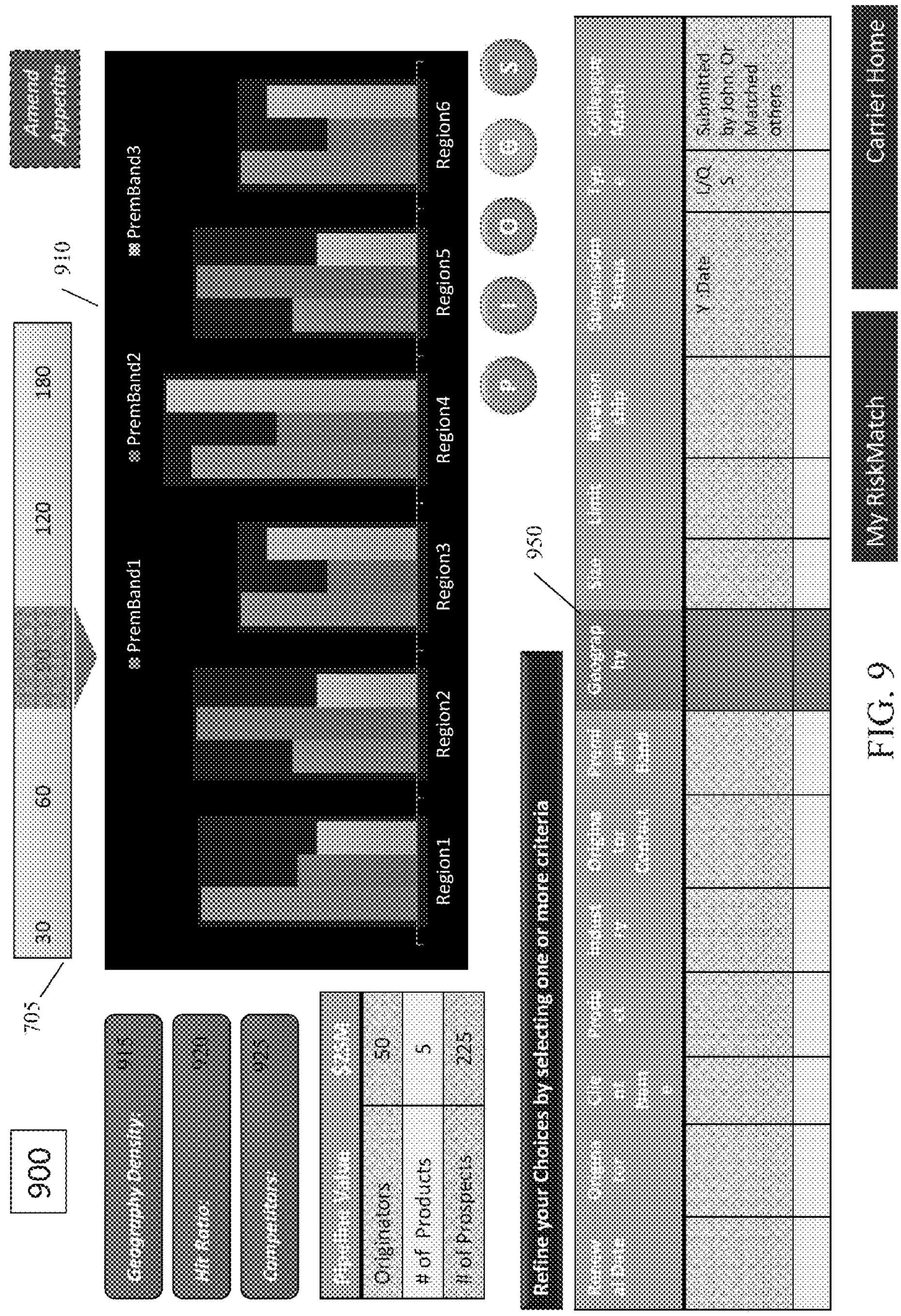

FIG. 9 shows, according an exemplary embodiment, an interface 900 for providing the matching results by geography. The interface 900 shares some of the same information and similarities with previous described interfaces (e.g., 600, 700, etc.).

In this regard, the interface 900 provides a geography bar graph 910 which shows matching values for Region 1, Region 2, . . . , Region 6, again based on the carrier's appetite settings/history of capital deployment/nearness of capital deployment. For each region/area listed in the geography bar graph 910, aggregate matching values provided or represented by premium bands, similar to bar graphs 610, 710, etc. For example, the first bar corresponding to "Region 1", may represent insurance values of matches to clients seeking insurance and are located Region 1 (e.g., northeast, Midwest, New Jersey, Chicago, etc.) with premiums greater than $1 million dollars, and the second premium bar representing the total value of insurance being sought from matches for Region 1 who are requesting insurance with premium of $100,000 to $1 million dollars, and so on.

Similar to the previous interfaces (600, 700, etc.) the geographical density 915, provides the carrier's market share for insurance products for clients needing insurance in one or more geographical regions specified according to in the appetite settings. The geography hit ratio 920, and geographical competitors 925 are calculated the same as the corresponding product hit ratio 620 and product competitors 625, except are based on the geography information indicated in the appetite of the carrier.

The interface 900 provides table 950, which is a sortable table providing matching results, i.e. the matching companies/potential clients based on the carrier's appetite. The table 950 is the same as previous described tables (650, 750, etc.) except the results are at least initially sorted by geography, instead of by product as in table 650.

Figure 10:
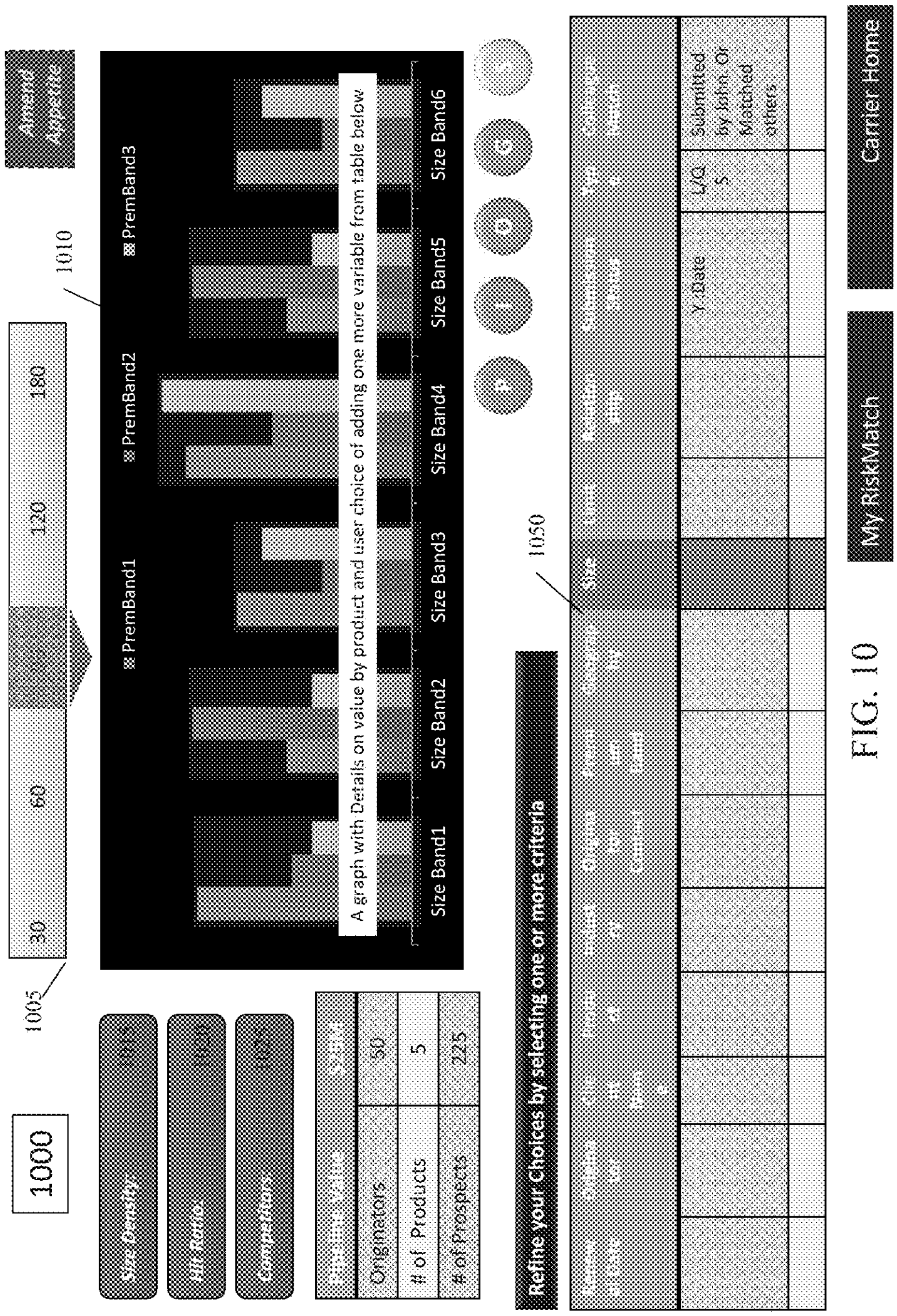

FIG. 10 shows, according an exemplary embodiment, an interface 1000 for providing the matching results by size. The interface 1000 shares some of the same information and similarities with the previous described interfaces (e.g., 600, 700, etc.).

In this regard, the interface 1000 provides a size bar graph 1010 which shows matching values for Size Band 1, Size Band 2, . . . , Size 6, again based on the carrier's appetite settings. For each size band listed in the size bar graph 1010, aggregate matching insurance amounts are further provided or represented by premium bands, similar to previous bar graphs (610, 710, etc). For example, the first bar corresponding to "Size Band 1" may represent insurance amounts from matches seeking insurance (e.g., company with 1-100 employees) for premiums greater than $1 million dollars that have a "Size 1", so on.

Similar to the previous interfaces (600, 700, etc.) the size density 1015, provides the carrier's market share for insurance products for clients needing insurance in band specified in the appetite. The size hit ratio 1020, and competitors by size 1025 are calculated the same as the corresponding product hit ratio 620 and product competitors 625, except are based on the size bands indicated in the appetite.

The interface 1000 provides table 1050, which is a sortable table providing matching results, i.e. the matching companies/potential clients based on the carrier's appetite settings/history of capital deployment/nearness of capital deployment. The table 1050 is the same as previous described tables (650, 750, etc.) except the results are at least initially sorted by size, instead of by product as in table 650.

Figure 11:
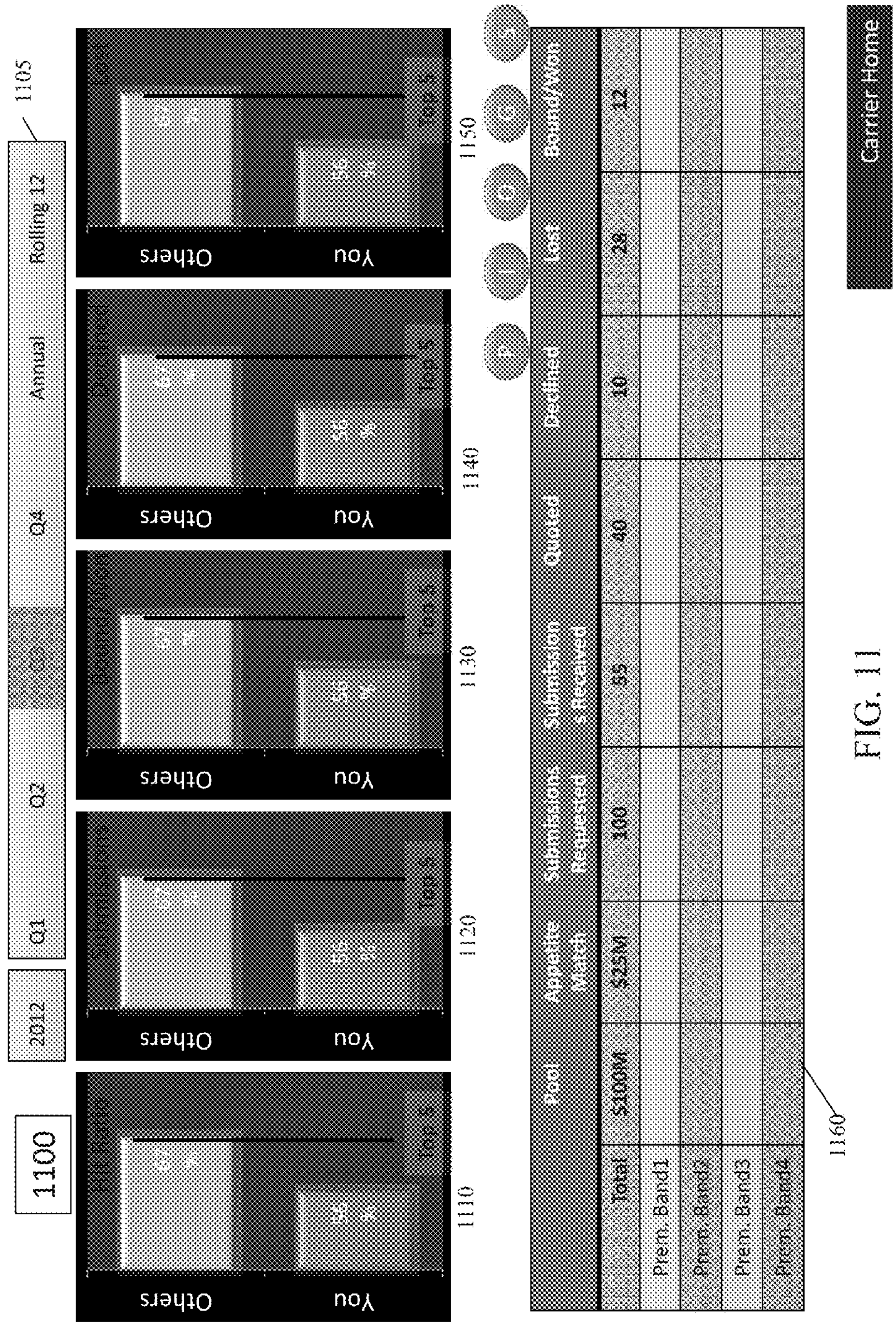
FIGS. 11-16 are exemplary interfaces providing success ratios information to a carrier according to an exemplary embodiment of the present disclosure.
Figure 12:
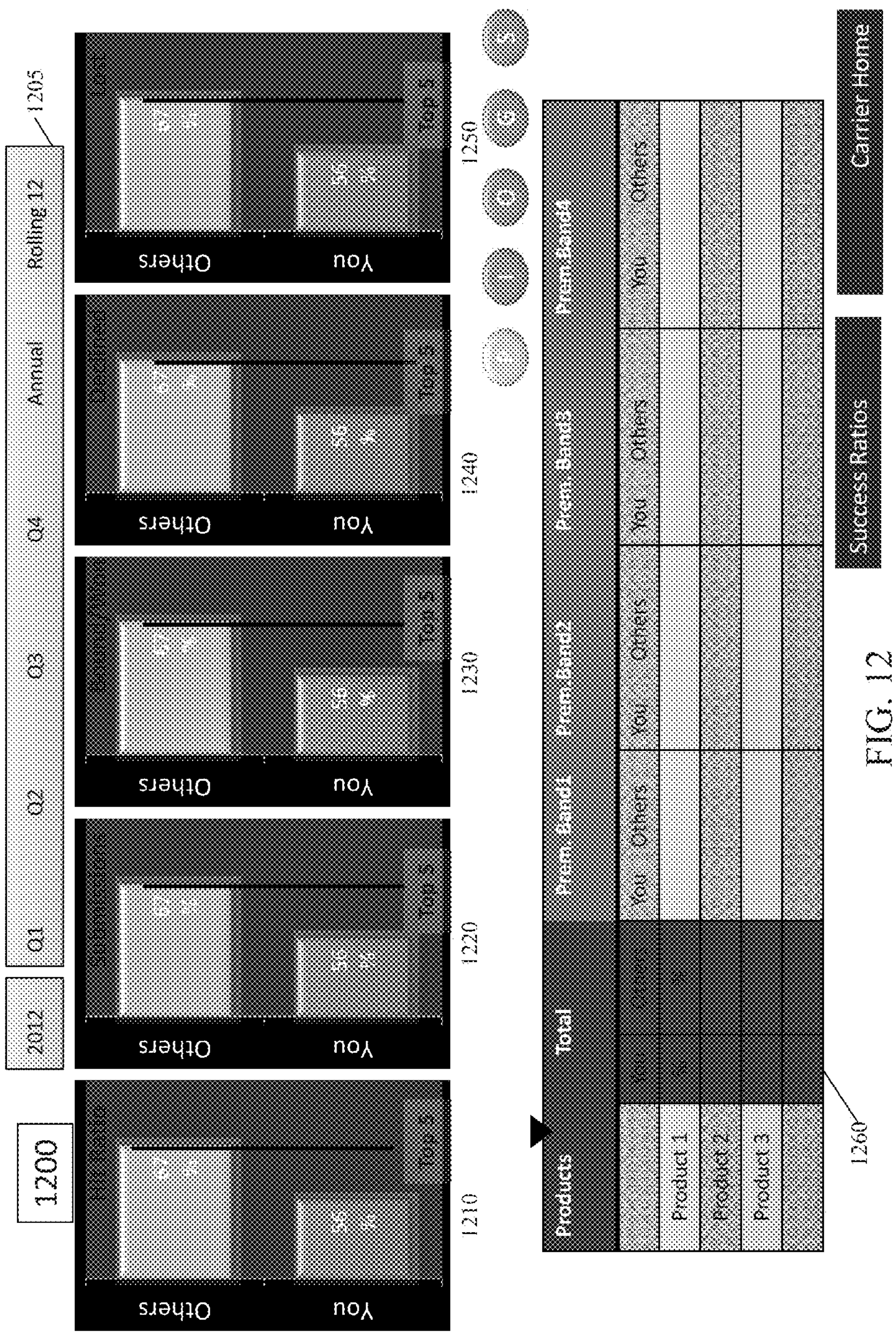
Figure 13:
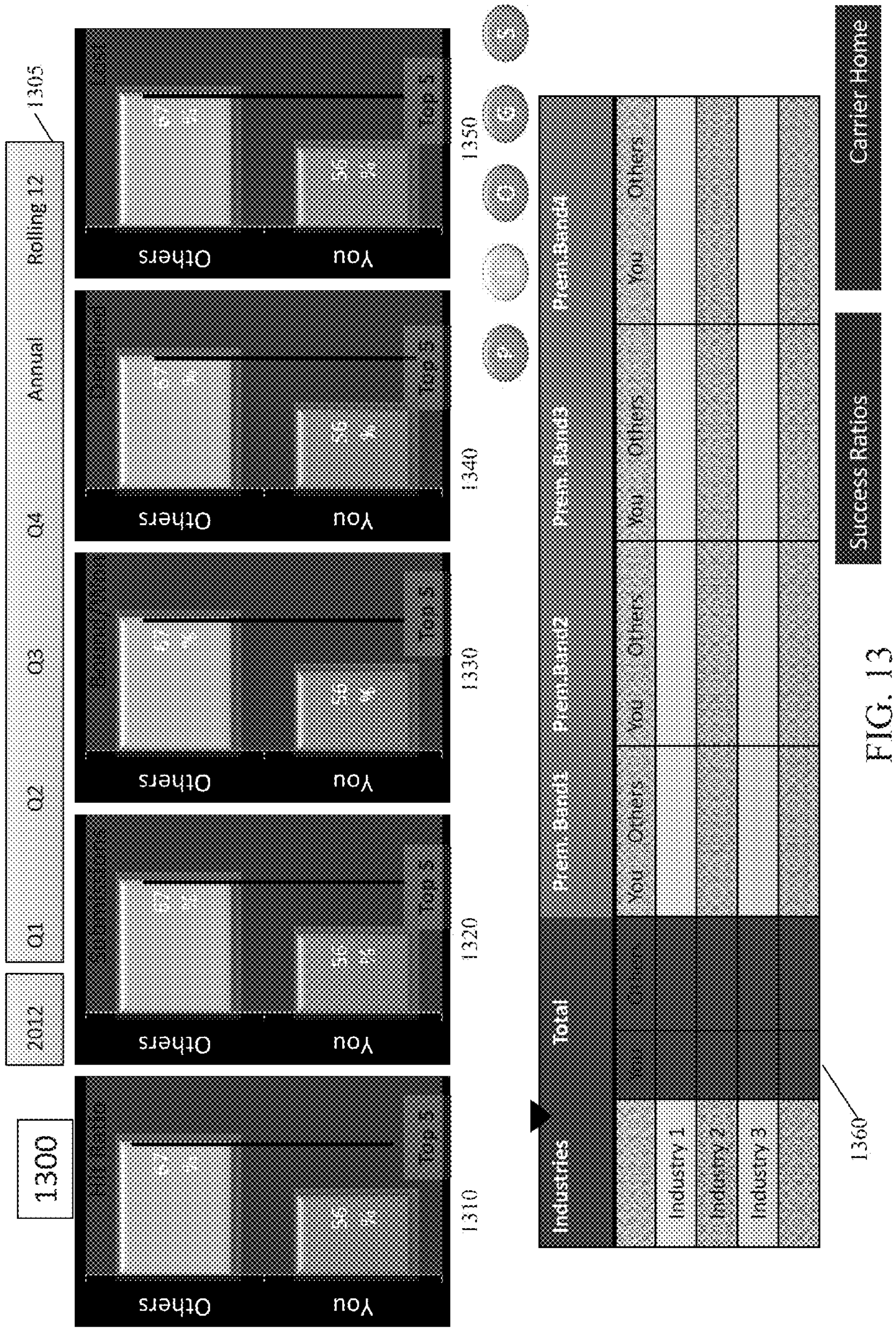
Figure 14:
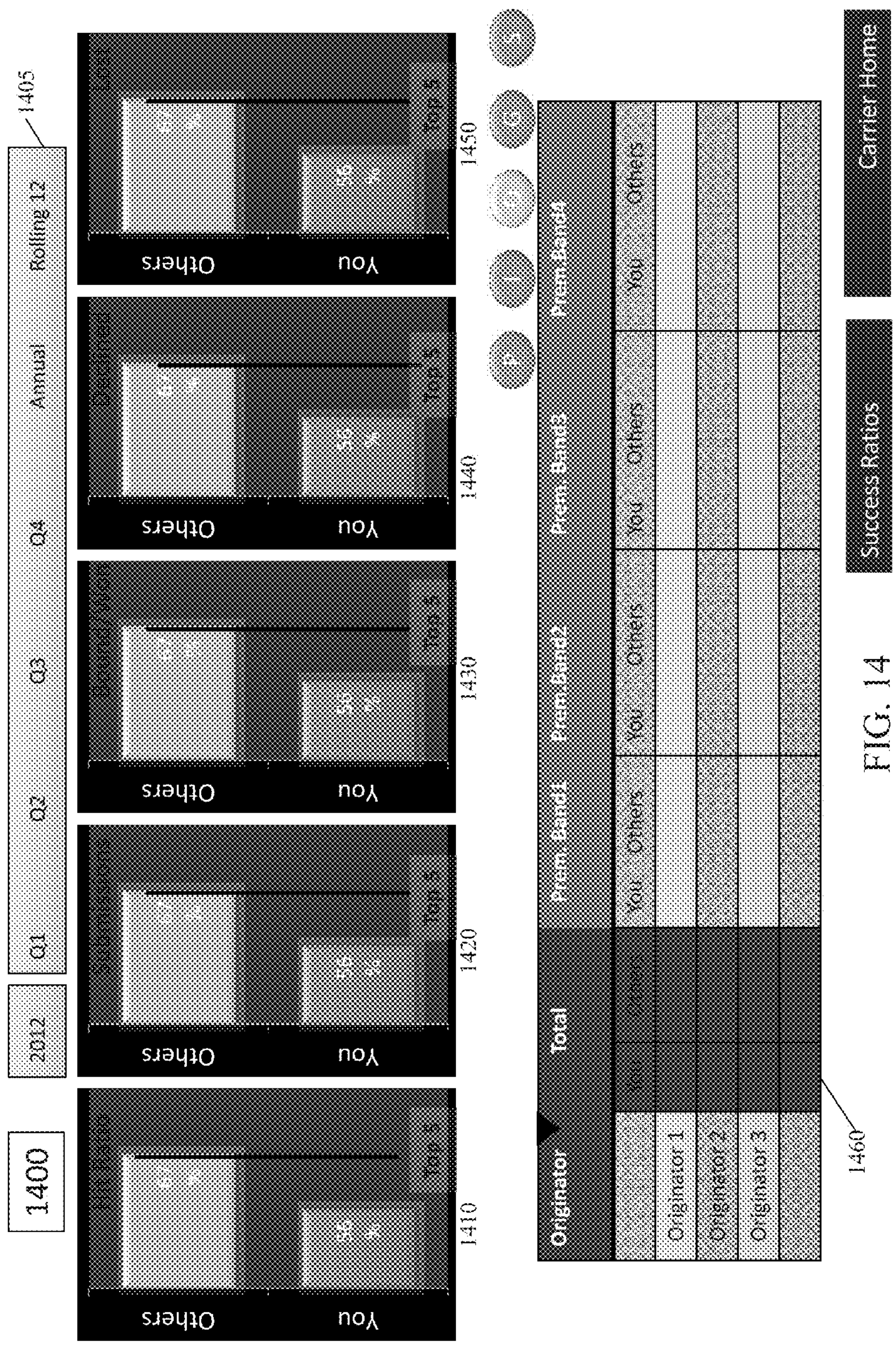
Figure 15:
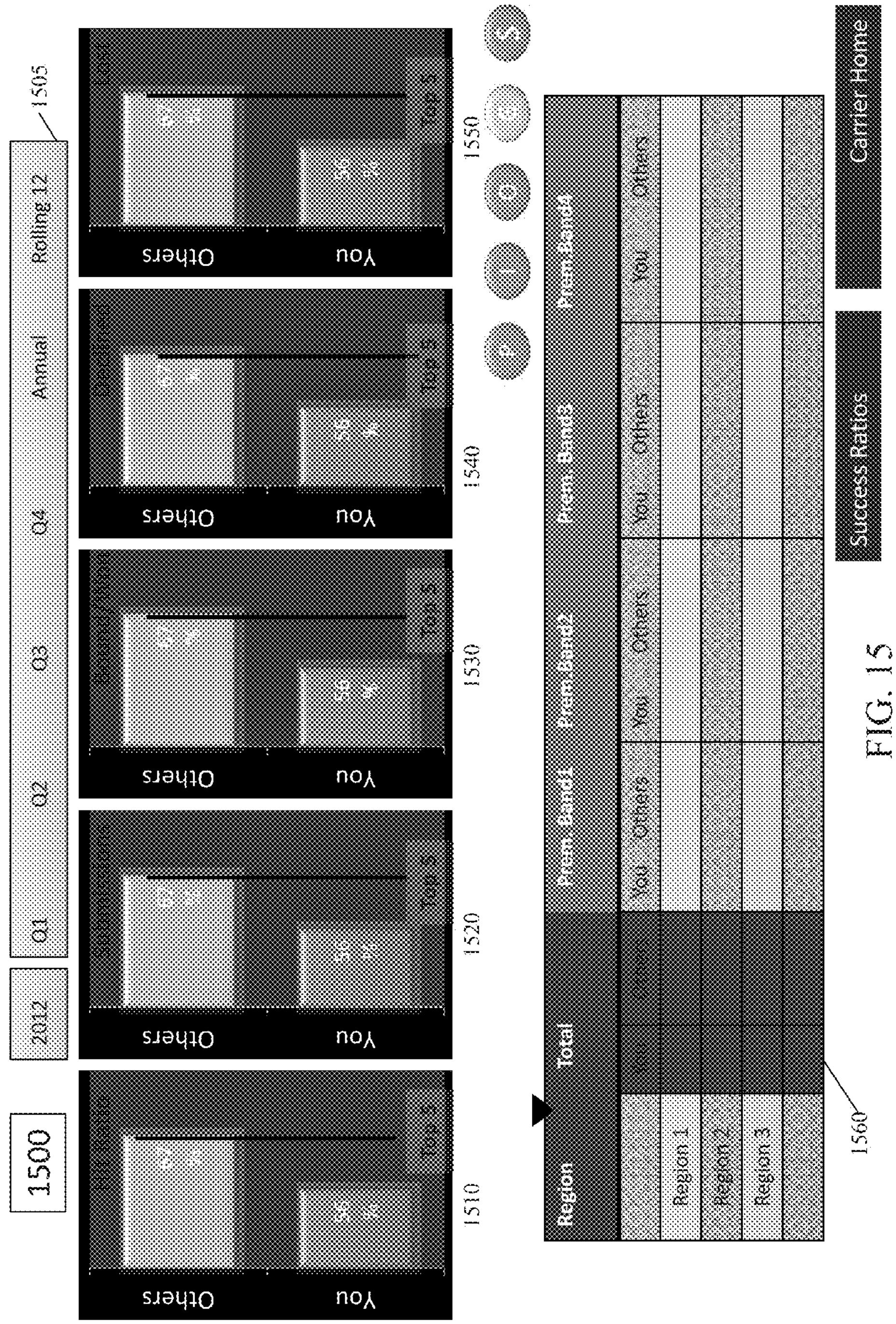
Figure 16:
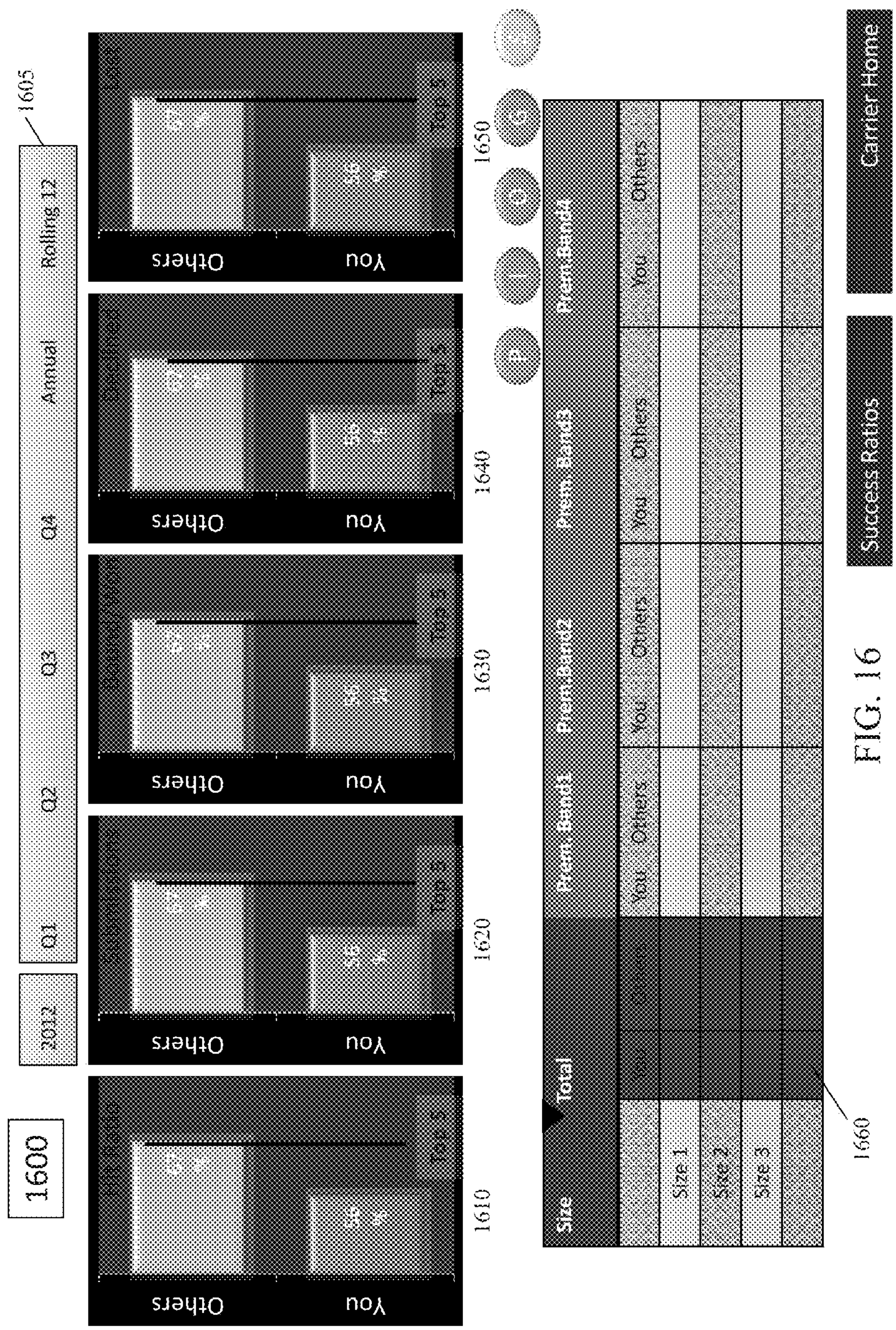

Additionally, the system 1 may provide a carrier with metrics and/or statistics regarding their past successes and failures as well as competitors. In this regard, FIG. 11 shows, according an exemplary embodiment, an interface 1100 providing success ratios for a carrier. The interface 1100 provides a carrier's success/failures based on hit ratio % 1110, submissions % 1120, bound/won % 1130, declined 1140, and lost 1150. In exemplary embodiments, the hit ratio % 1110 is based on the number submissions accepted by the brokers. On interface 1100, the hit ratio % is provided for the carrier, and the top (5 or other) overall competitors to the carrier. In example of FIG. 6, the carrier's submissions have been accepted 56% of the time compared to 67% for the carrier's top 5 competitors. While the top (5 or other) competitors are shown in interface 1100, other variations regarding the number of competitors to be compared, may be implemented.

Similarly, the submissions % 1120 is the percentage of submissions sent from the carrier or out of the number of request for submissions sent. For example, as shown in FIG. 6, the 56% of submission requests have led to sent submissions. The bound/won % 1130 indicates the percentage of submissions becoming an insurance sale/transaction between carrier and client based on the total number of submissions sent to the broker/client. The decline % 1140 indicates the percentage of submissions not leading to an insurance sale/transaction between carrier and client based on the total number of submissions sent to the broker/client. The transaction can be declined by either the carrier or client/broker. The lost % 1150 is indicates the percentage of submissions that are declined by the broker/client.

The interface 1100, includes a table 1160, which provides the aggregate results information regarding the matches, including, for example, the total pool size, total appetite match value, submissions requested, number of submissions received, number of quotes submitted, number of transaction declines, number of submissions lost, and/or number of bound/won. The information may further broken down into premium bands as discussed herein. A user of the interface can select a premium brand, such as through a click or other suitable selection mechanism, and the interface 1100 updates the success ratios information, e.g., 1110, 1120, . . . , 1150 based on the selection.

The interface 1100 may also include a timeline selector 1105 as well as "P", "I", "O", "G", and/or the "S" options, as previously discussed herein.

According to exemplary embodiments, FIGS. 12-16, include exemplary interfaces 1200, 1300, 1400, 1500, and 1600 respectively. These interfaces, are similar in nature to interface 1100, except the results, including those in the respective tables 1260, 1360, . . . 1660 are broken down by a products, industries, originators, geographies, and sizes respectively.

Figure 17:
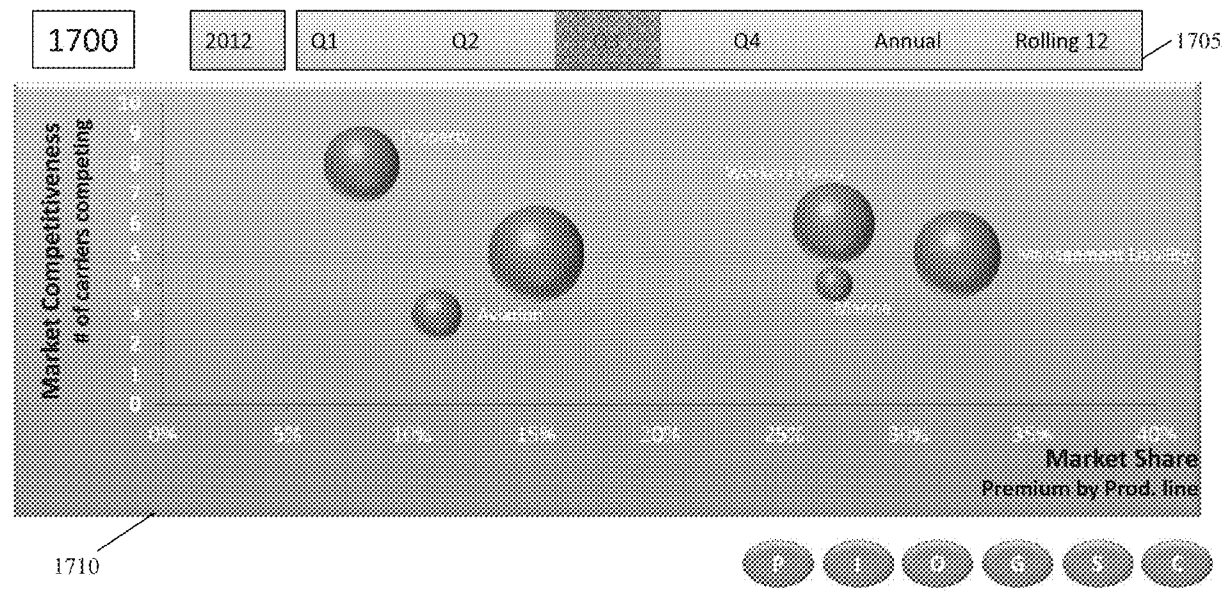
FIGS. 17-24 are exemplary interfaces providing success ratios information to a carrier according to an exemplary embodiment of the present disclosure.

The system 1 provides a carrier with analyses regarding the carrier's market share. In this regard, FIG. 17 shows, according an exemplary embodiment, an interface 1700 providing density or market share metrics. Interface 1700 includes a graph 1710, which visually shows a carrier's market share in various areas, e.g., property, aviation, workers compensation, etc. versus the number of competitors the carrier has in each area. For example, the graph 1710 shows the carrier has between 5% and 10% of the market share for property insurance, with approximately 8 competing carriers.

Interface 1700 can include a table 1720, which provides the information in a tabular format. For example, regarding property, the table 1720, shows that the carrier has 8% market share, with 8 competitors, out of a $42 million dollar market. As previously described the information provided in graph 1710 and graph 1720 may be adjusted by changing the selected time period in the timeline selector 1705. As with other interfaces described herein, interface 1700 can include a "P", "I", "O", "G", "S" navigation options as well as a "C" (client) option.

Figure 18:
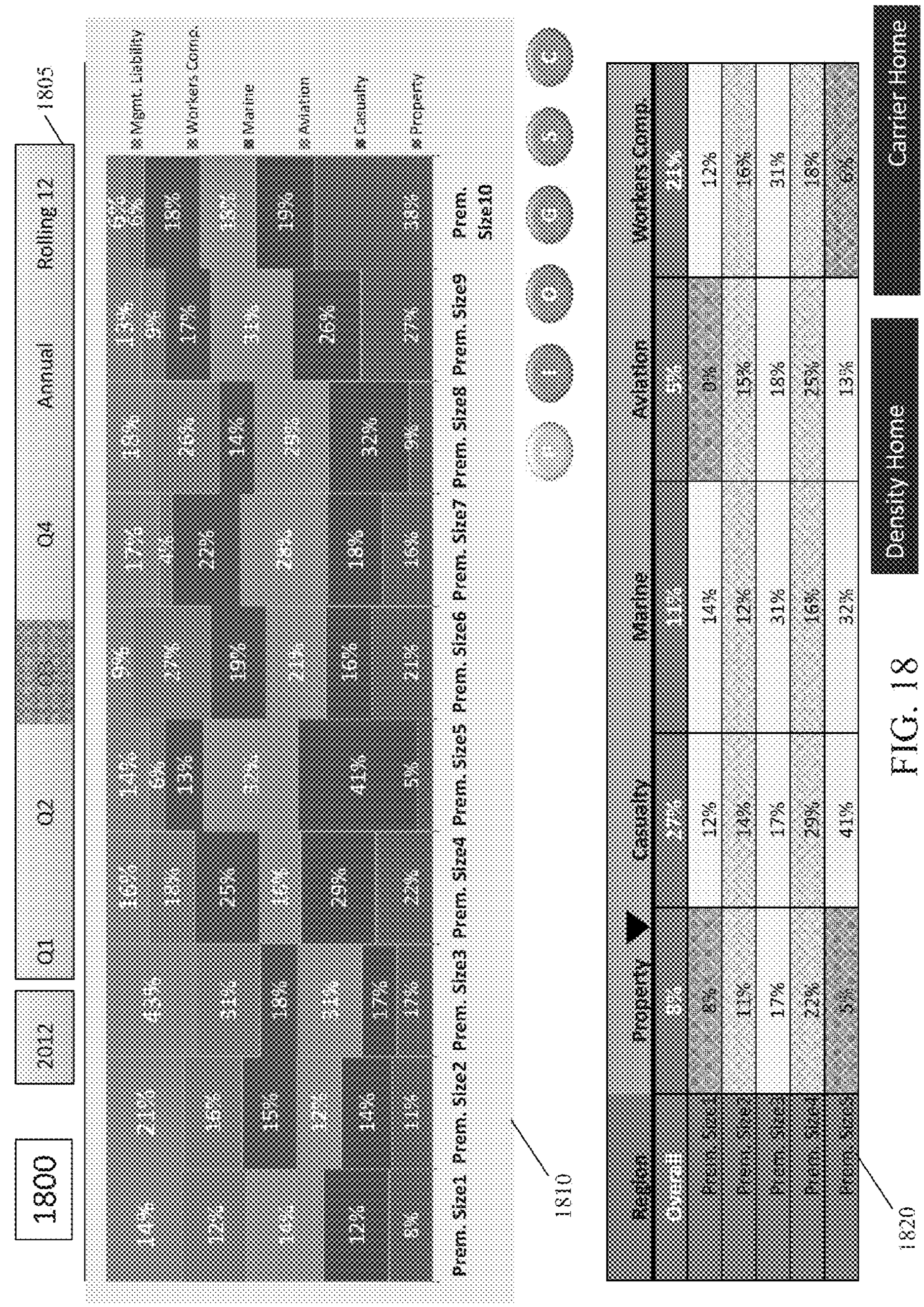

According to exemplary embodiments, FIGS. 18-22, include exemplary interfaces 1800, 1900, 2000, 2100, and 2200 respectively. These interfaces are similar to one another and are related to interface 1700. For example, a user from interface 1700 may select the "P" option in order to access interface 1800 associated with product. While graph 1710 and table 1720 of interface 1700 already present market share/density metrics, by product types, interface 1800 providing the density metrics product type and by premium size bands. Each premium size band represents a range of premiums for each appropriate product type, for example, $10,000 to $100,00, $100,000-$1,000,000, etc. Any suitable number of premium size bands may be used. As shown in FIG. 18, interface 1800 may include a table 1810 which visually shows the breakdown of the carrier's market share by product and premium size bands. For example, the carrier has 14% of the aviation insurance market share for the premium size band 1, 12% of the aviation market share for premium size band 2, and so on. The interface 1800 further includes a table 1820 which also numerically breakdowns the market share by premium size in a more standard tabular format. Tables 1810 and 1820 are exemplary and other formats for showing the breakdown of density/market share may be used including other types of graphs, tables, charts, etc. As with other related interfaces, interface 1800 includes a timeline selector 1805 to filter data for a particular time period, as well have the "P", "I", "O", "G", "S" "C" navigation options.

Figure 19:
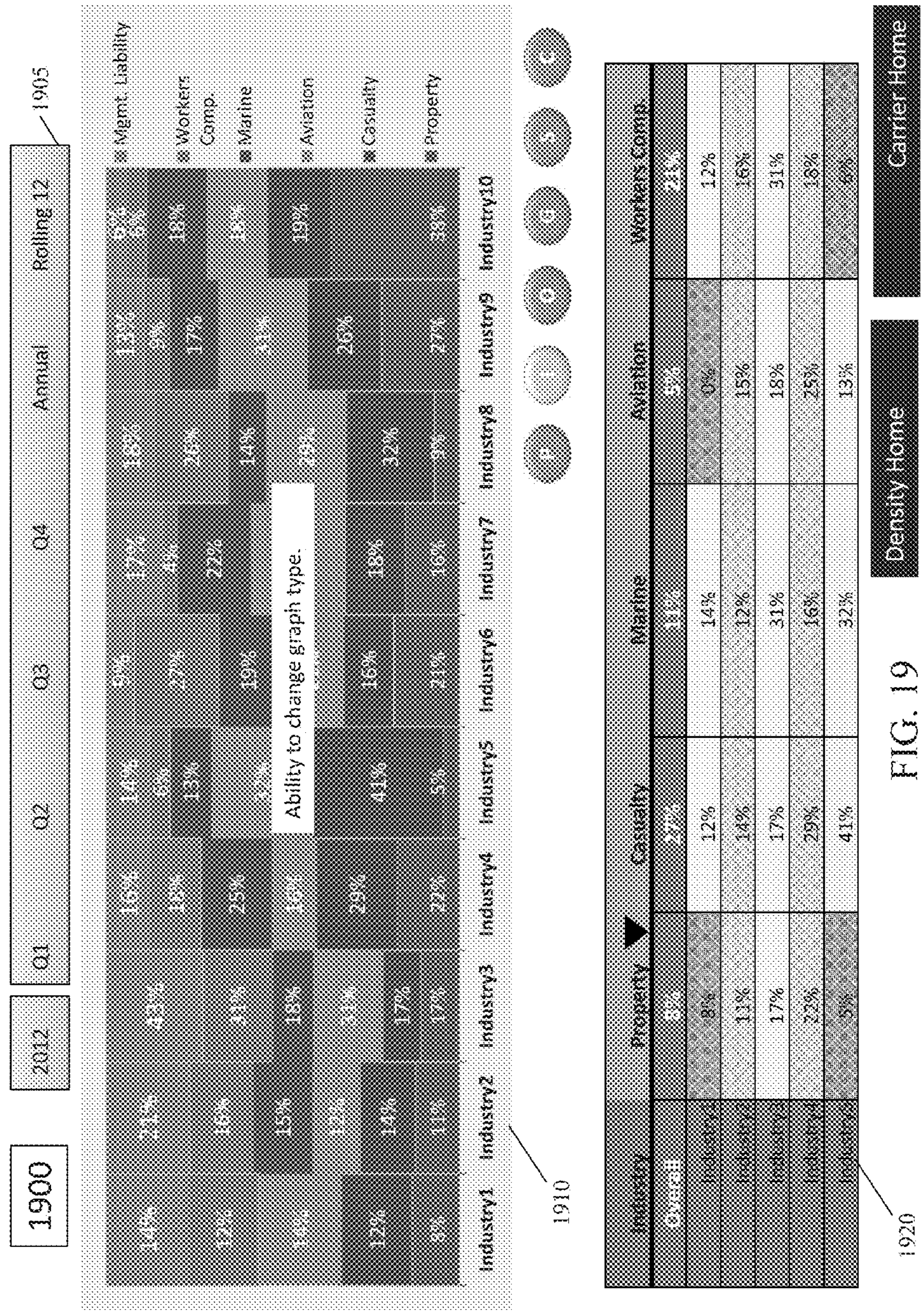

FIG. 19, shows, according to an exemplary embodiment, interface 1900, which includes table 1910 and table 1920. The tables 1910, 1920 are similar to tables 1810 and 1820, except instead of the carrier's market share for each of the type of its products is displayed by industry (Industry 1, Industry 2, . . . etc.). For example, Industry 1 may be retail, Industry 2 may be construction, and so forth.

Figure 20:
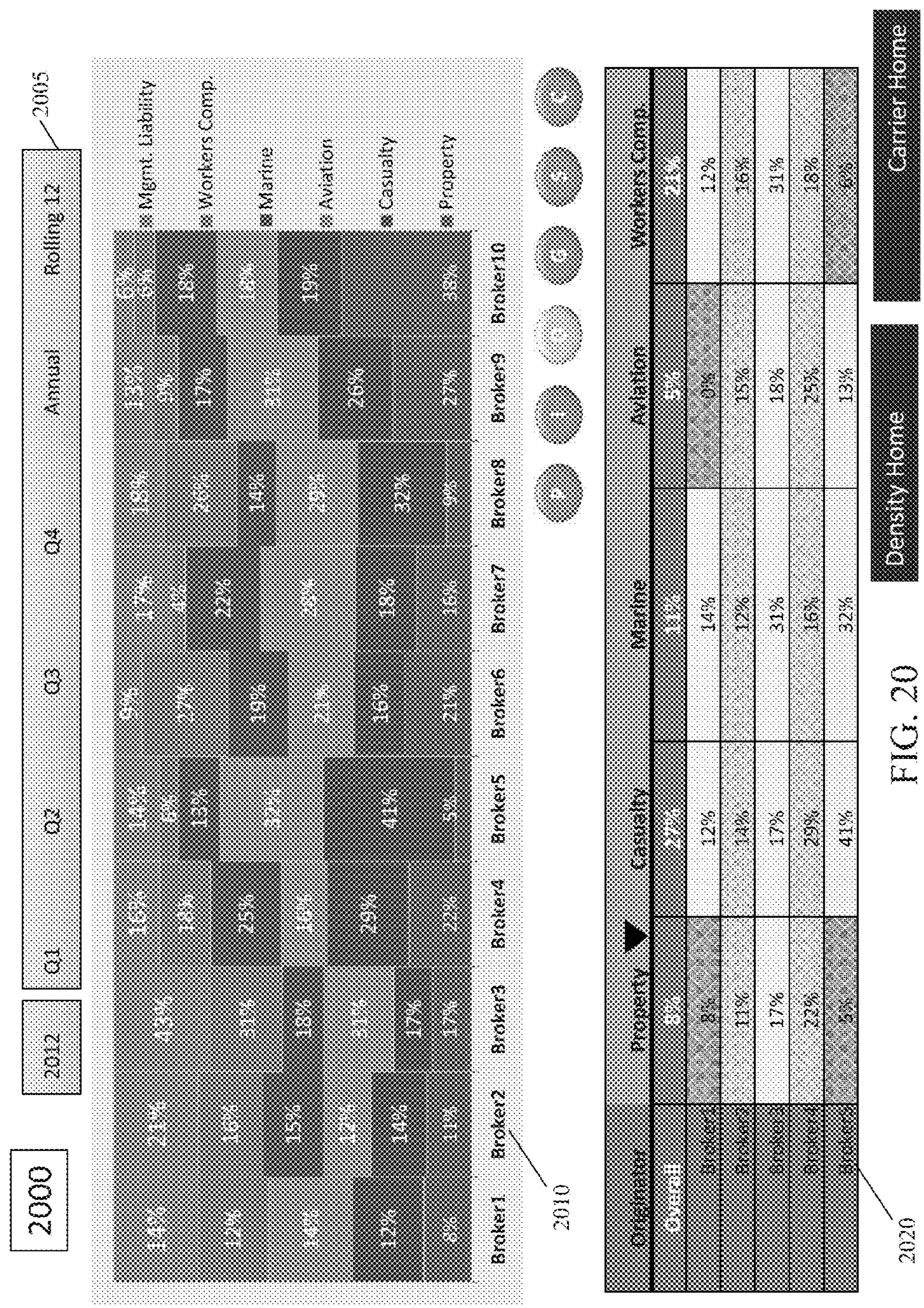
Figure 21:
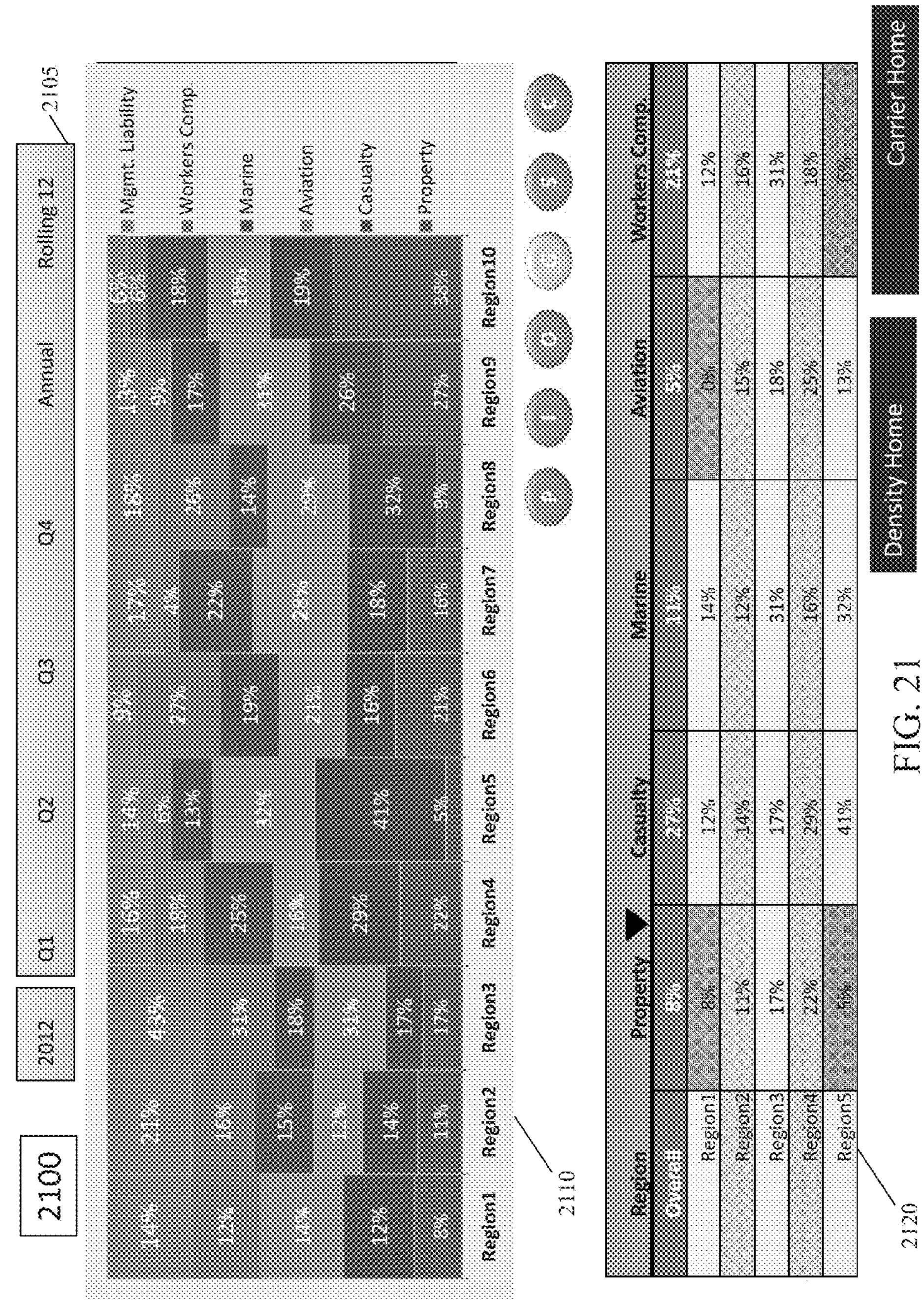
Figure 22:
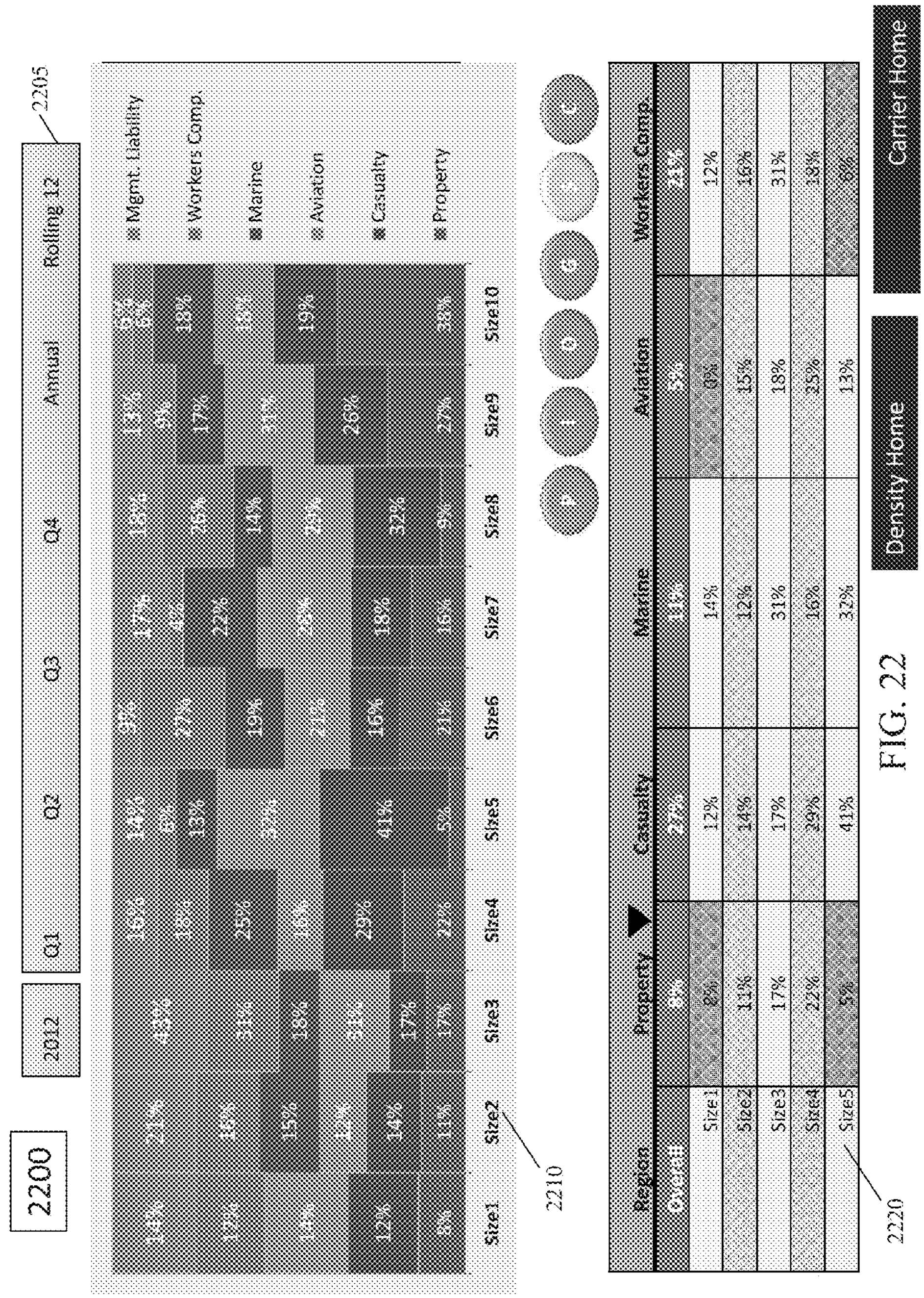

FIGS. 20-22, show interfaces 2000, 2100, and 2200, according to exemplary embodiments. These interfaces, are akin to interface 1900, except the density/market share for each product type offered by the carrier is displayed by originators, geographies, and size, respectively. Each of these interfaces may include the navigations options as well as a corresponding timeline selector.

Figure 23:
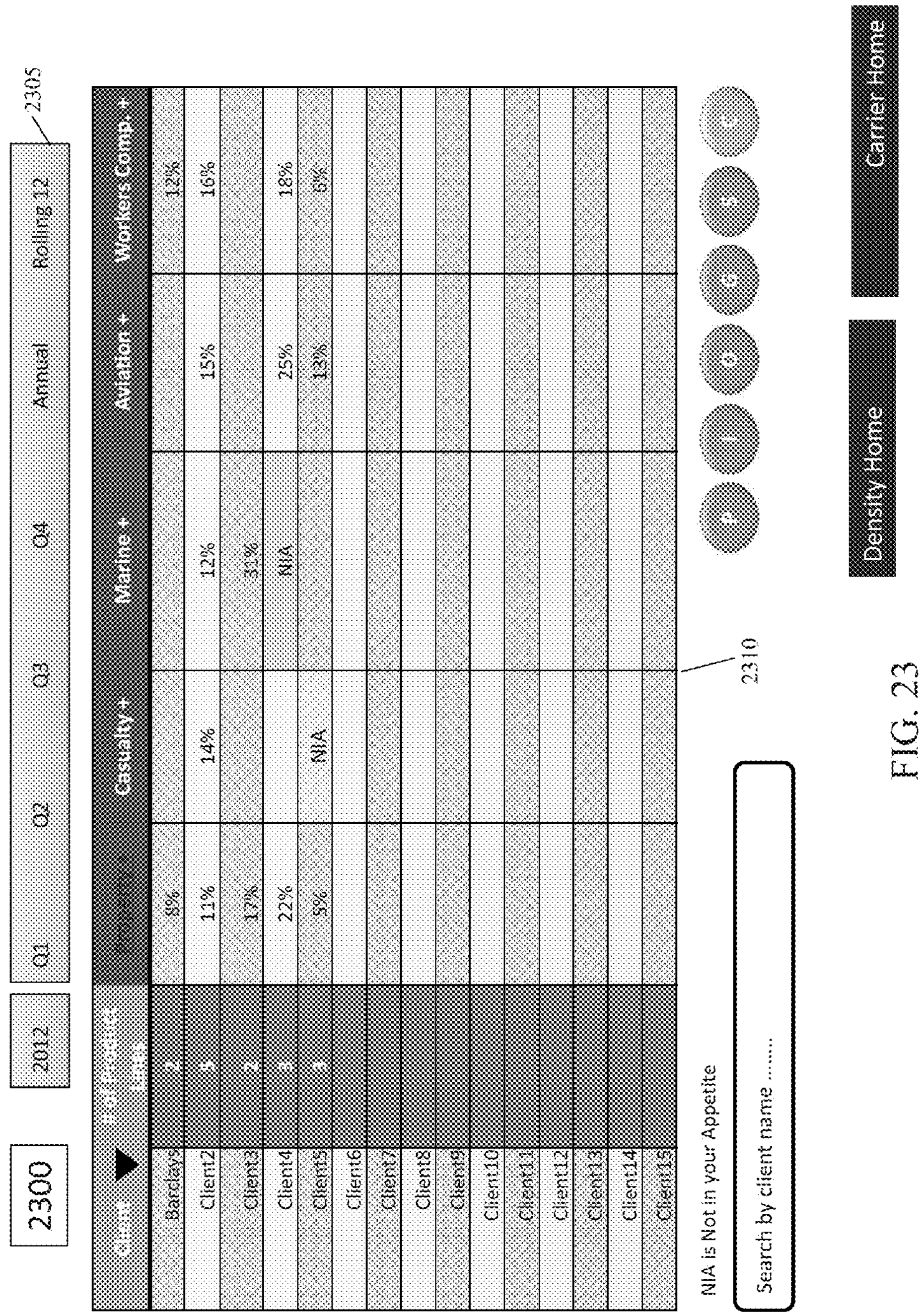

Accordingly to exemplary embodiments, FIG. 23, includes interface 2300. Similar to other interfaces, a user associated with carrier may navigate to this particular interface by selecting the "C" navigation option. The interface 2300, includes exemplary table 2310 which provides the carrier's density/market share by client and product type. Referring to table 2310, the carrier, for example, provides 8% of Barclay's insurance for property, and 14% of Barclay's insurance for worker's compensation. Further, the table 2310 indicates that the carrier provides none of Barclay's casualty, marine, and aviation insurance, which are types of insurance indicated in the carrier's appetite. The table 2310 also indicates if a particular type of insurance product for a client is not within the carrier's appetite/history of capital deployment/nearness of capital deployment, as in the example of casualty type insurance for Client 5, not being in the carrier's appetite.

Figure 24:
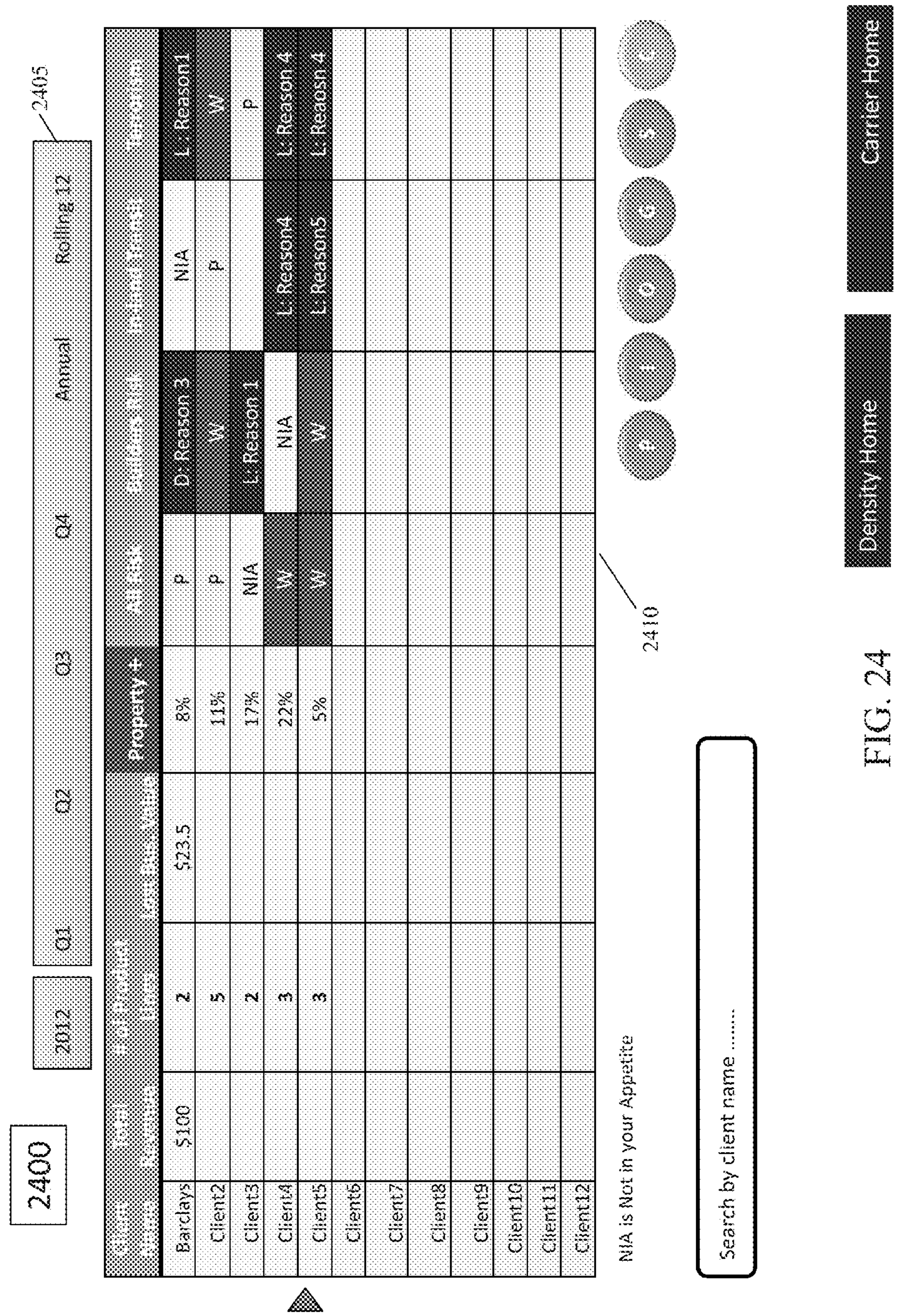

Any above-described interfaces may be interactive, for example, allowing a user to select a specific entry, or object in order to be provided with additional information. For example, a user may select a particular client listed in table 2310 of FIG. 23 in order to be provide with further information regarding that particular client. Alternatively, a user may select the "Property+" category in table 2310, in order to expand the density/market share information regarding property, and as a result, an updated, interface. FIG. 24, show, according to an exemplary embodiment, interface 2400. Interface 2400 provides expanded information regarding a carrier's market share with regard to property insurance for clients.

Table 2410 indicates the carrier is providing $100 million worth of insurance to Barclay's, with 8% of that represented in property insurance and also that the carrier lost $23.5 million to other carriers or competitors. The table 2410 indicates that the carrier, with respect to Barclay's, pending ("P") submissions/quotes for All Risk type insurance with Barclay's. Additionally, the "D:Reason 3" entry associated with the Builders Risk indicates the carrier and/or Barclay's declined a Builder Risk insurance quote/submission due to Reason 3. In embodiments, other or additional codes may be used in conjunction of table 2410 in order to indicate reasons for certain events. In other words a reason code, e.g., Reason 1, Reason 2, . . . , etc. may be provided which references standard reasons why certain transaction/submission/quote was lost, declined, etc.

Additionally, interface 2400, as well other interfaces described herein may include a search function 2420. The search function 2420 allows a user to search for a particular client, but not necessarily a client that carrier is currently or previously done business with.

Figure 25:
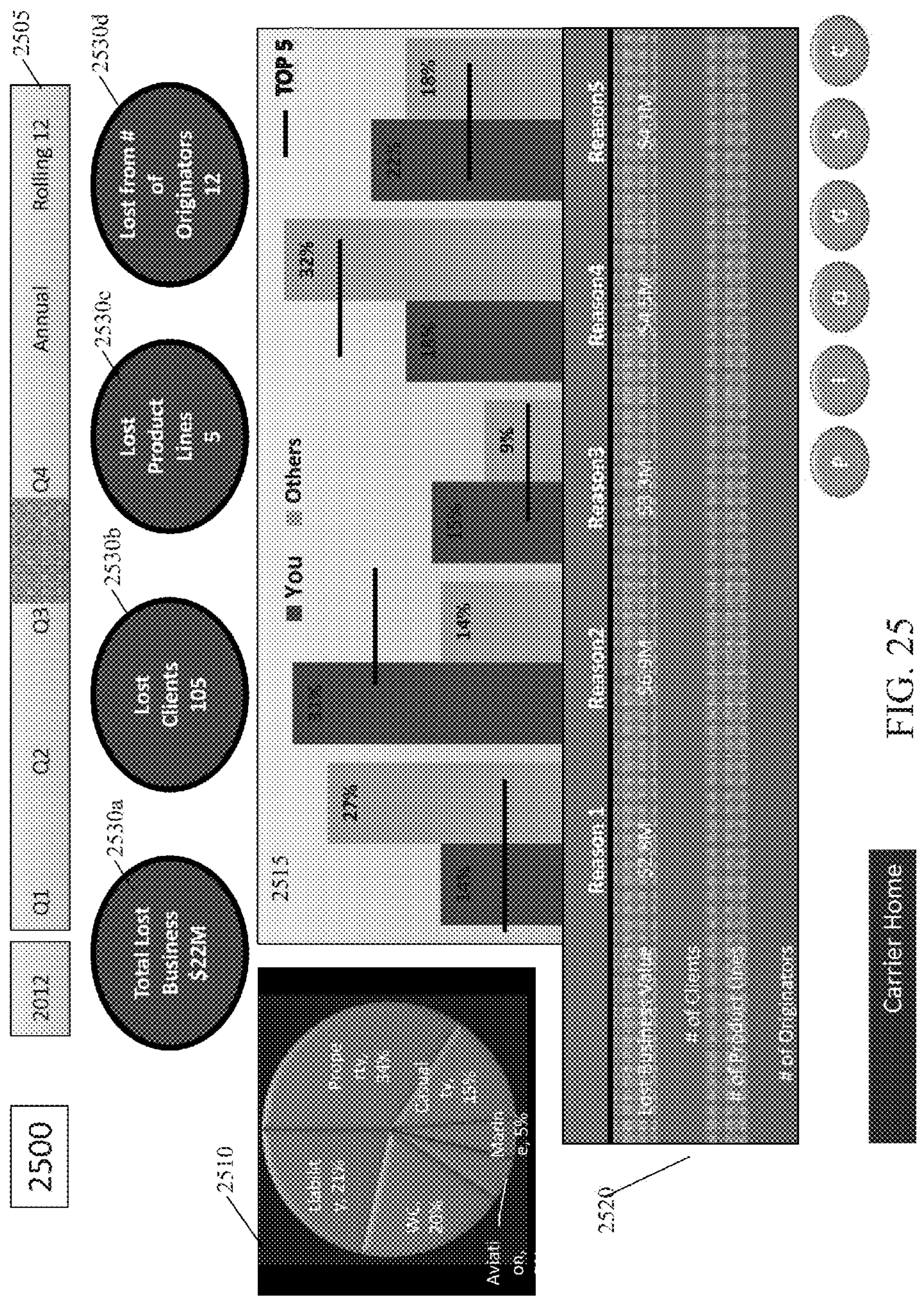
FIGS. 25-31 are exemplary interfaces providing lost business information to a carrier according to an exemplary embodiment of the present disclosure.

The system 1 provides a carrier with analyses regarding the carrier's lost business. In this regard, FIG. 25 shows, according an exemplary embodiment, an interface 2500 providing overall lost business information. The interface 2500 includes a timeline selector 2505, a lost business chart 2510, a lost business graph 2515, and a lost business table 2520. Additionally, the interface 2500 can provide aggregate data, for example, Total Lost business 2530*a*, Lost Clients 2530*b*, Lost Product Lines 2530*c*, Lost Originators Lost from 2530*d*, etc. The interface 2500 indicates that the carrier has lost $22 million in business, lost 105 clients, lost 5 product lines, and lost from 12 originators.

The chart 2510 indicates how the losses were distributed and shows that 21% of the carrier's lost business came for liability insurance losses, 34% of lost business came from property insurance losses, etc. The chart 2510, may be modified and/or selectively changed to show the losses were distributed in other ways, for example by industry, size, clients, premium bands, etc.

The graph 2515, shows a breakdown of the carrier lost business, as well as lost business for the carrier's competitors (typically top 5 competitors), by a plurality of predefined reasons, e.g., Reason 1, Reason 2, . . . , etc. In this regard, the graph 2515 shows that Reason 1 was attributed or responsible for 14% of the carrier's business, and that this same reason was responsible for 27% of the carrier's competitors lost business.

As shown in FIG. 25, the table 2520 may be used in conjunction with graph 2515 to show more precisely, values showing the nature of the carrier's lost business for each displayed reason. For example, the table 2520 shows the carrier lost $2.8 million in business with respect to Reason 1, lost $6.9 million in business with respect to Reason 2, . . . , etc. The table can also indicates how many clients were lost, the number of product lines, and the number of originators from which business is lost for each displayed reason. While the graph 2515 shows the breakdown by 5 reasons (e.g., Reason 1, Reason 2, . . . , Reason 5), other variations may be implemented, such as providing the breakdown with less than or more than five predefined reasons. In some embodiments, the graphs 2515 may show the breakdown by a predefined number of reasons, or by a number of reasons that account for a certain threshold percentage of the lost business. For example, in one variation the graph may have 3 reasons, for example, Reason 1, Reason 2, and Reason 4, since they could account for over 95% of the lost business, and thus the other reasons are less significant and not displayed.

The interface 2500, also includes navigation options "P", "I", "O", "G", "S", "C" in order to present specialized interfaces with lost business metrics regarding Product, Industry, Originator, Geography, Size, and Client.

Figure 26:
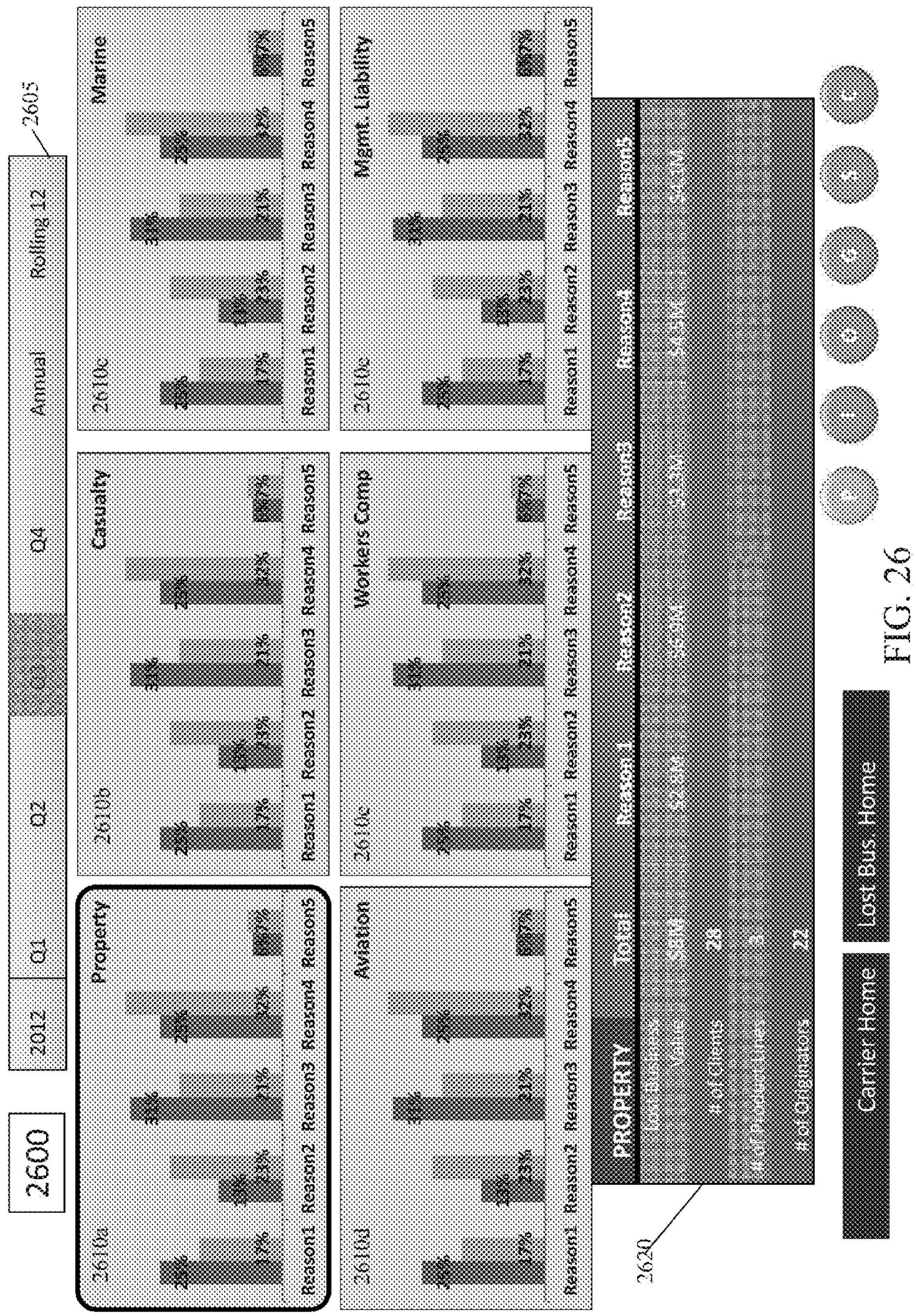
Figure 27:
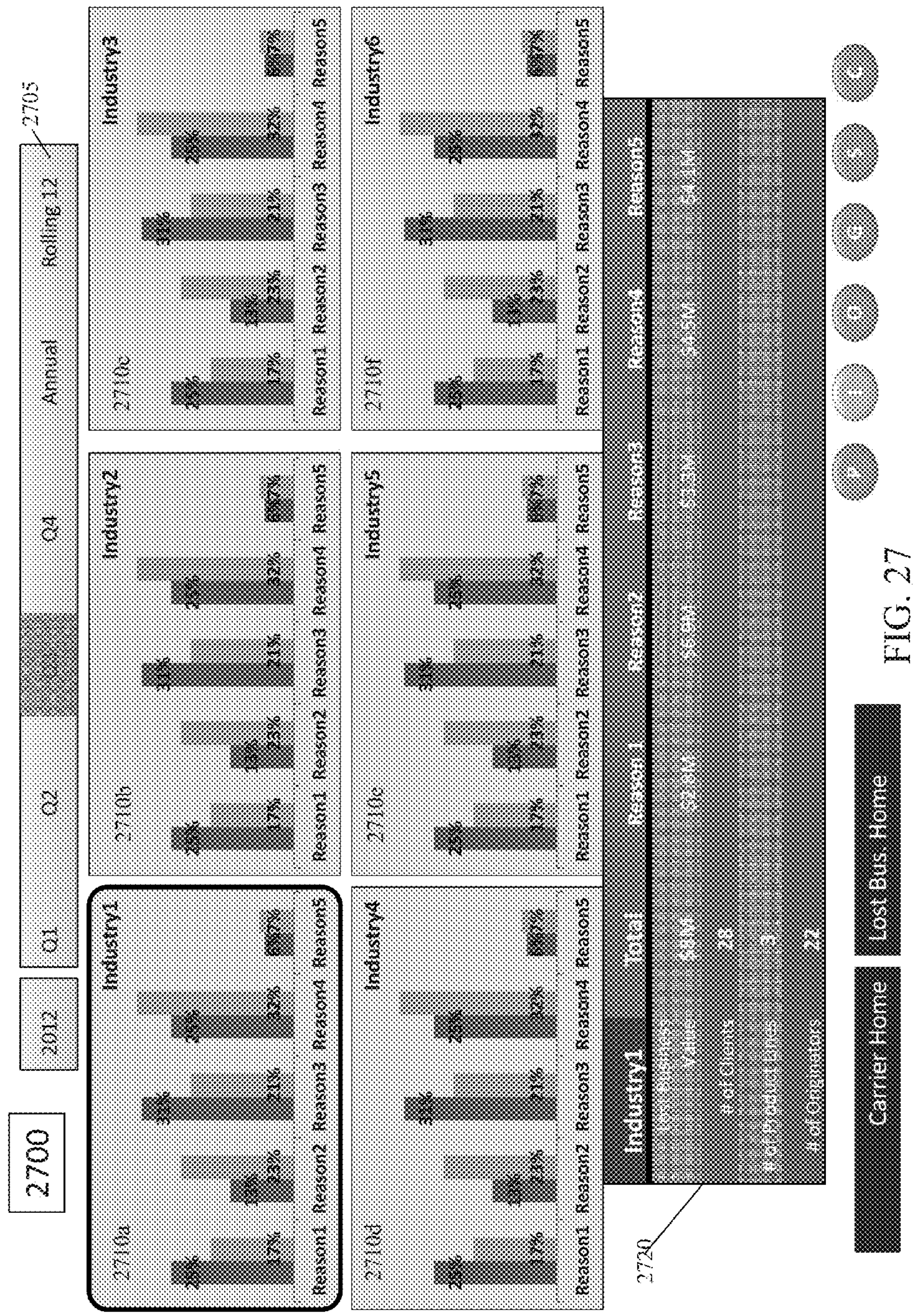
Figure 28:
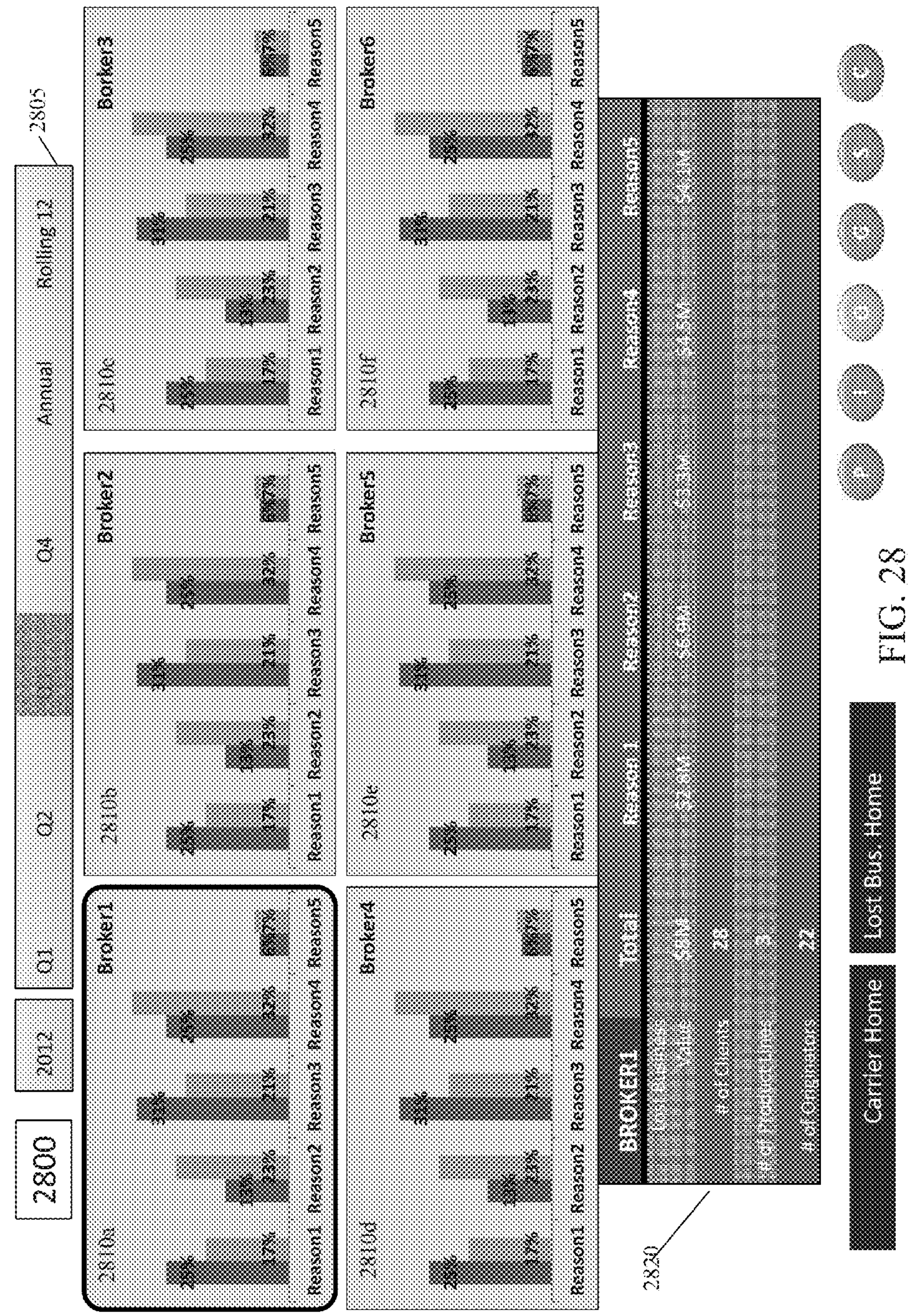
Figure 29:
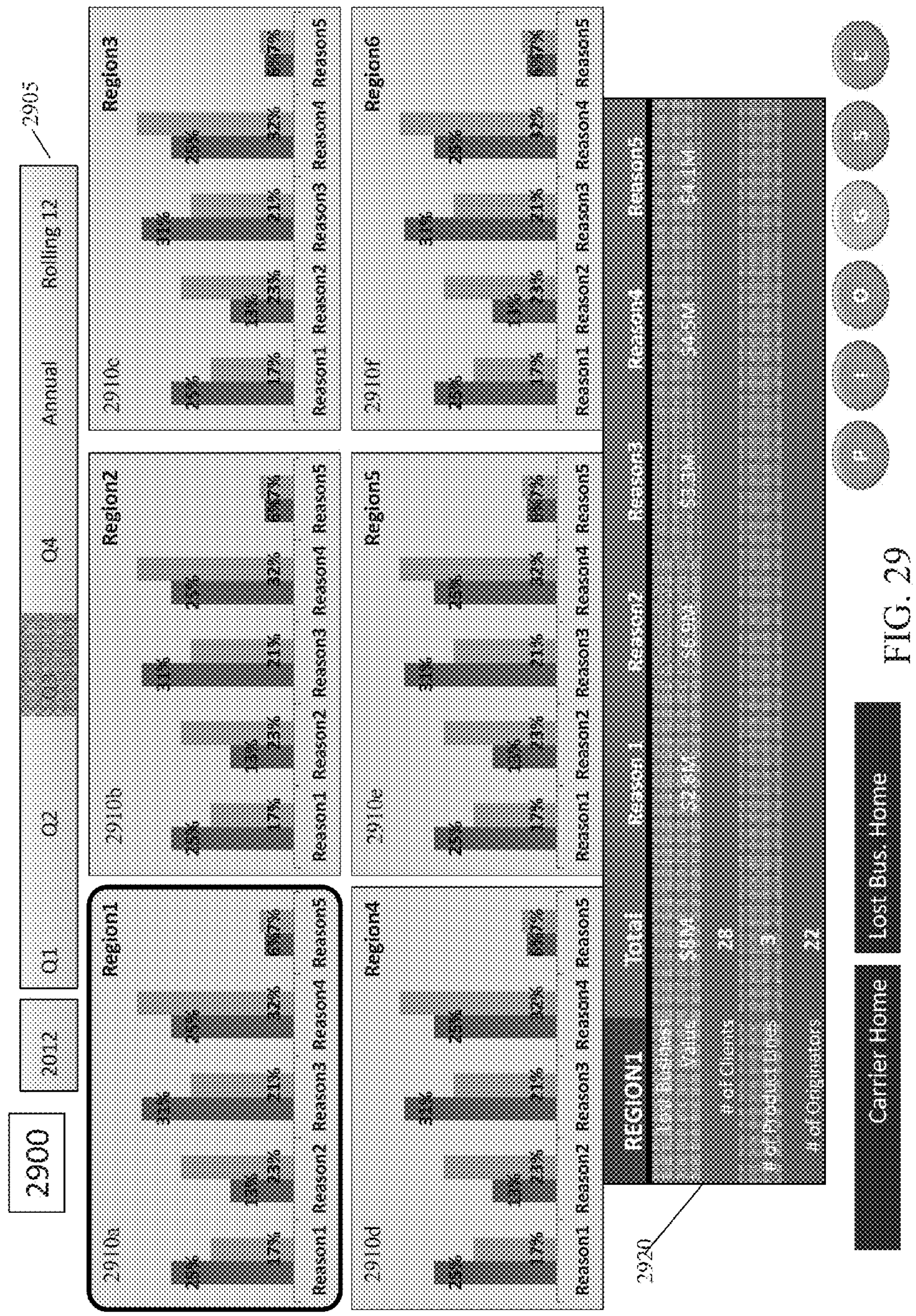
Figure 30:
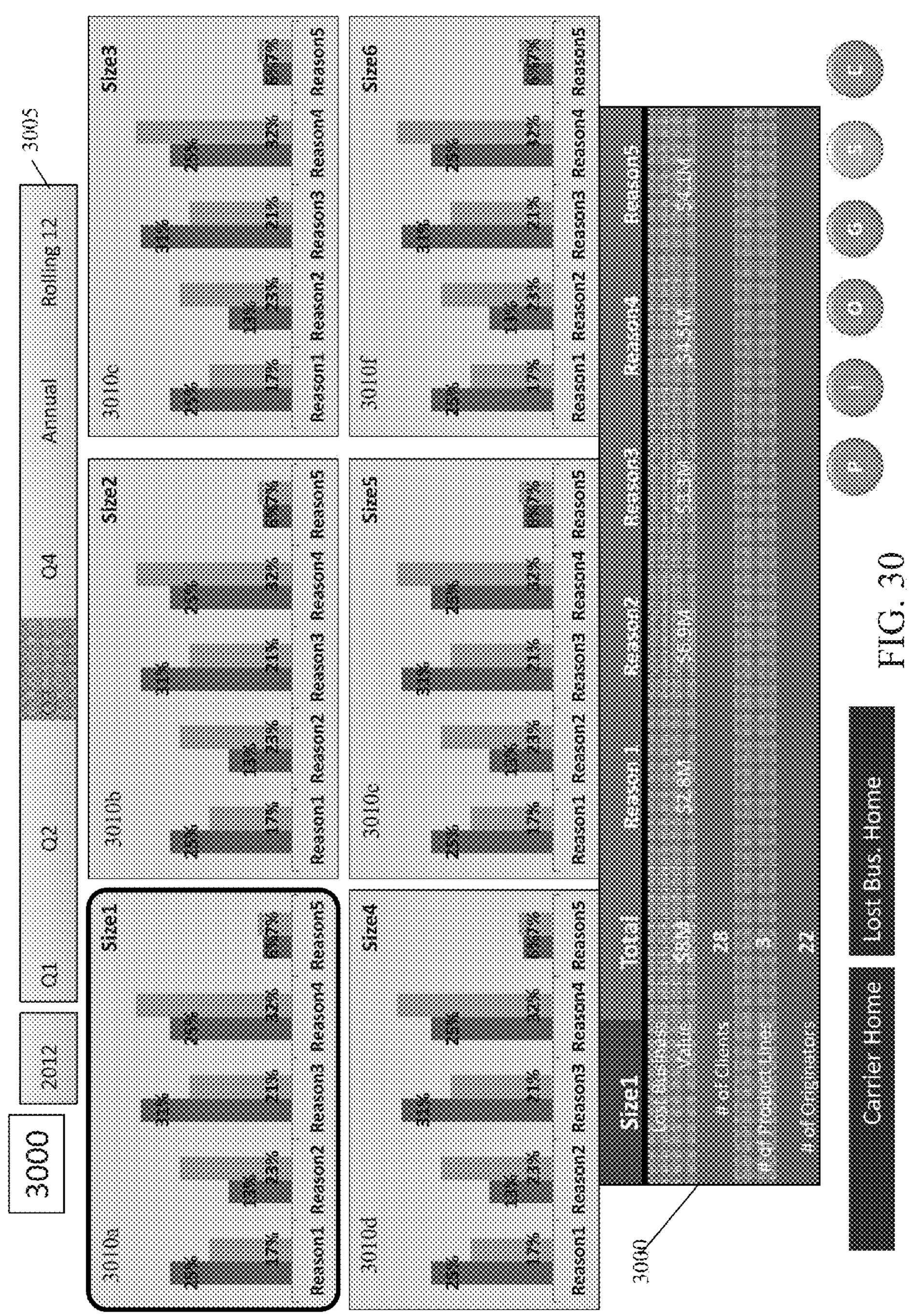

According, to an exemplary embodiment, FIG. 26, shows interface 2600 which provides lost business analyses for a carrier (and carrier's top competitors) by product and reason. The interface provides a series of lost business graphs for property insurance 2610*a*, casualty insurance 2610*b*, marine insurance 2610*c*, aviation insurance 2610*d*, workers comp insurance 2610*e*, and management liability insurance 2610*f*. These lost business product graphs are exemplary, and a different carrier with a different appetite could be provided with a different set of lost business graphs.

As shown in FIG. 26, the lost business product graphs 2610*a-f* are similar in nature to graph 2515 of FIG. 25. The lost business product graphs show for a particular product, the breakdown of losses by reasons. Referring to graph 2610*a*, the 26% of carrier's total lost business for property insurance is due or attributable to Reason 1, 13% is due to Reason 2, etc. Similarly, graph 2610*a* (as well as the other product graphs) show breakdown of lost business for property insurance. As shown in 2610*a*, 17% of the competitors total lost business for property insurance is due to Reason 1, 23% due to Reason 2, etc. The other remaining graphs 2610*b-f* of interface 2600 are similarly structured and show the breakdown of lost business by reason for the other insurance product.

In embodiments, interface 2600 includes a table 2620 which provides the breakdown of losses by numerical value, e.g., monetary losses instead of by percentage as in the graphs 2610*a-f*. In embodiments, a user through any suitable manner, can select a particular insurance product. This may be accomplished by selecting or one of the graphs, e.g., one of graphs 2610*a-f*. For example, in the case of FIG. 26, property insurance and/or graph 2610*a* has been selected and the table 2610 is accordingly provides the monetary losses by reason for property insurance. The table 2620 indicates that the amount of lost business for property insurance is $2.8 Million of loss business due to Reason 1, $6.9 Million of lost business due to Reason 2, etc.

While interface 2600 of FIG. 26 shows various graphs and charts indicating how losses for products are attributed to various predefined reasons, other variations of the graphs, tables, charts, etc. may be provided. In an exemplary embodiments, upon request, the interface can provide one of the lost business product graphs 2610*a-f*, for example, in an enlarged view. Additionally, the interface can provide a graph showing the lost business for a single selected reason for all products. For example, the graph can provide the lost business attributed to Reason 3 for property, casualty, marine, etc. In another embodiment, interface 2600 can provide a single graph showing the breakdown of lost business for one product by all reasons.

FIGS. 27-30, show interfaces 2700, 2800, 2900, and 3000, according to exemplary embodiments. The interfaces 2700, 2800, 2900, and 3000, are akin the interface 2600, except instead of indicating products lost business by specified reasons, these interfaces respectively show industry, originator, geography, and size graphs by specified reasons. For example, interface 2700 of FIG. 27 has lost business industry graphs 2710*a-f*, where each graph is for a different particular industry. Similar, interface 2700 also has a table 2720 which can provide lost business information for a particular industry based upon a selection of an industry or industry graph. The interfaces 2700, 2800, 2900, and 3000 can have all the same features, graphs, tables, navigation options, etc. as described herein with respect to interface 2600.

Figure 31:
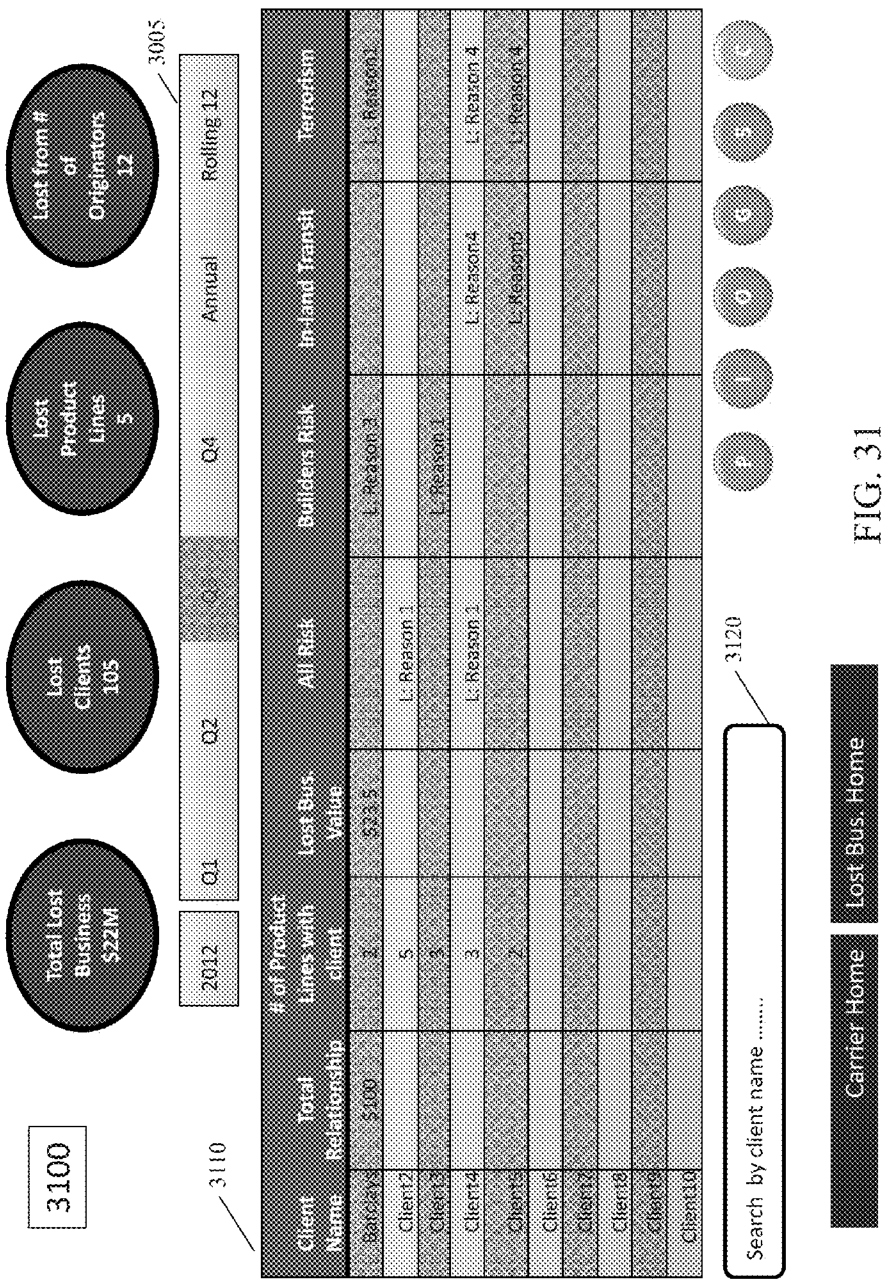

Accordingly to exemplary embodiments, FIG. 31, shows interface 3100. The interface 3100, includes table 3110 which provides the carrier's lost business by client and product type. According to table 3110, the carrier, for example, lost $23.5 million of business with respect to Barclays. In addition the table 3110 provides reasons for the loss with respect to Builders Risk (Reason 3) and Terrorism (Reason 1). The interface 3110 may only provide a fixed or set number of clients in the table, so in addition the interface can provide a search function 3120 to search for specific client and be provided.

The interfaces 2600-3100 may each include a timeline selector which indicates the time period for the metrics, data, etc. provided in the graphs, tables, charts, etc. Further, each of these interfaces can be provided with navigation selection options in order to access various interfaces with respect to lost business, e.g., "P", "I", "O", "G", "S", "C", "Carrier Home" and/or "Lost Business Home" navigation options.

Figure 32:
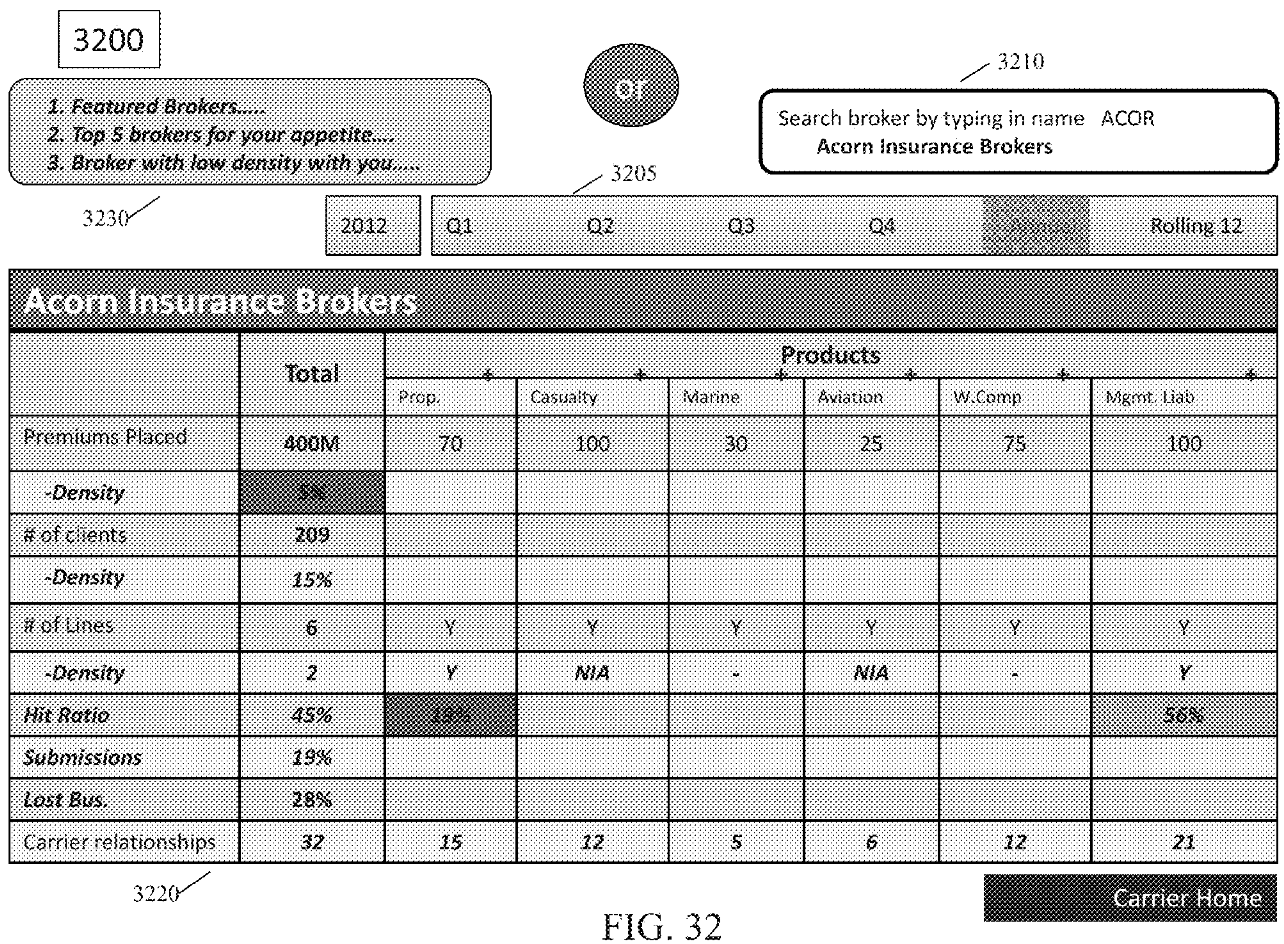
FIG. 32 is an exemplary interface providing ranking information to a carrier according to an exemplary embodiment of the present disclosure.

The system 1 provides a carrier with analyses regarding the carrier's standing/ranking in relation to one or more brokers. In this regard, FIG. 32 shows, according an exemplary embodiment, an interface 3200 provides the carrier's standing with respect to "Acorn Insurance Brokers". The interface 3200 includes table 3220 which provides various metrics regarding the carrier's standing with respect to a specific broker (Acorn Insurance). For example, the table 3220 indicates the total value broker's premiums procured by the broker on behalf of clients that match the carrier's appetite/history of capital deployment/nearness of capital deployment, the number of clients associated with the broker that match the carrier's appetite, and the number of insurance product lines procured by the broker on behalf of clients that match the carrier's appetite/history of capital deployment/nearness of capital deployment. The corresponding density is also indicated in table 3220. For example, out of the 209 clients of the broker which match the carrier's appetite, the carrier provides insurance for only 15% of such clients.

The table 3220 provides other relevant information, or metrics, including, for example, the hit ratio %, submissions ratio %, lost business ratio %, the number of carrier relationships the broker has, and etc., with respect to the specific broker.

Additionally, the interface 3200 can further display some of the above described information by other categories. The table 3220 provides metrics by insurance products (e.g., Property insurance, Casualty insurance, etc.) that match the carrier's appetite. According to the table 3220, out of the $400 million in insurance premiums that are provided to Acorn Insurance Brokers' clients that match the carrier's appetite, $70 million is from Property insurance, $100 million is from casualty insurance, $30 million is from marine insurance, etc. The corresponding carrier density ratio for each of these type of insurance products, may be provided in the table 3220. Similarly, the corresponding carrier density ratios for number of clients, and number of product lines, and the hit ratios, the submission ratios, the lost business ratio, and the number of broker carrier relations for each type of insurance product can also be provided appropriately in the table 3220. In some instances, the table 3220 may indicate a particular data entry in the table 3220 is not provided because it does not match the carrier's setting or is Not in Appetite (NIA).

The interface 3200 has a search mechanism 3210 allowing a carrier user to search and choose a specific broker associated with the system 1 for which the associated data of the data and/or metrics regarding the carrier's standing/ranking is provided.

In some exemplary embodiments, instead of a user selecting a particular carrier for in interface 3200, the user can select from one or more top brokers, such as for example, top 5 brokers matching the carrier's appetite. Additionally, instead of the table 3220 providing carrier standing for a single broker, the table could provide carrier standing information/metrics for a plurality of brokers. Furthermore, in some embodiments, a user may select a broker for which the carrier has a low density. These selections may be suggestion options that could be selected through a selection box.

Figure 33:
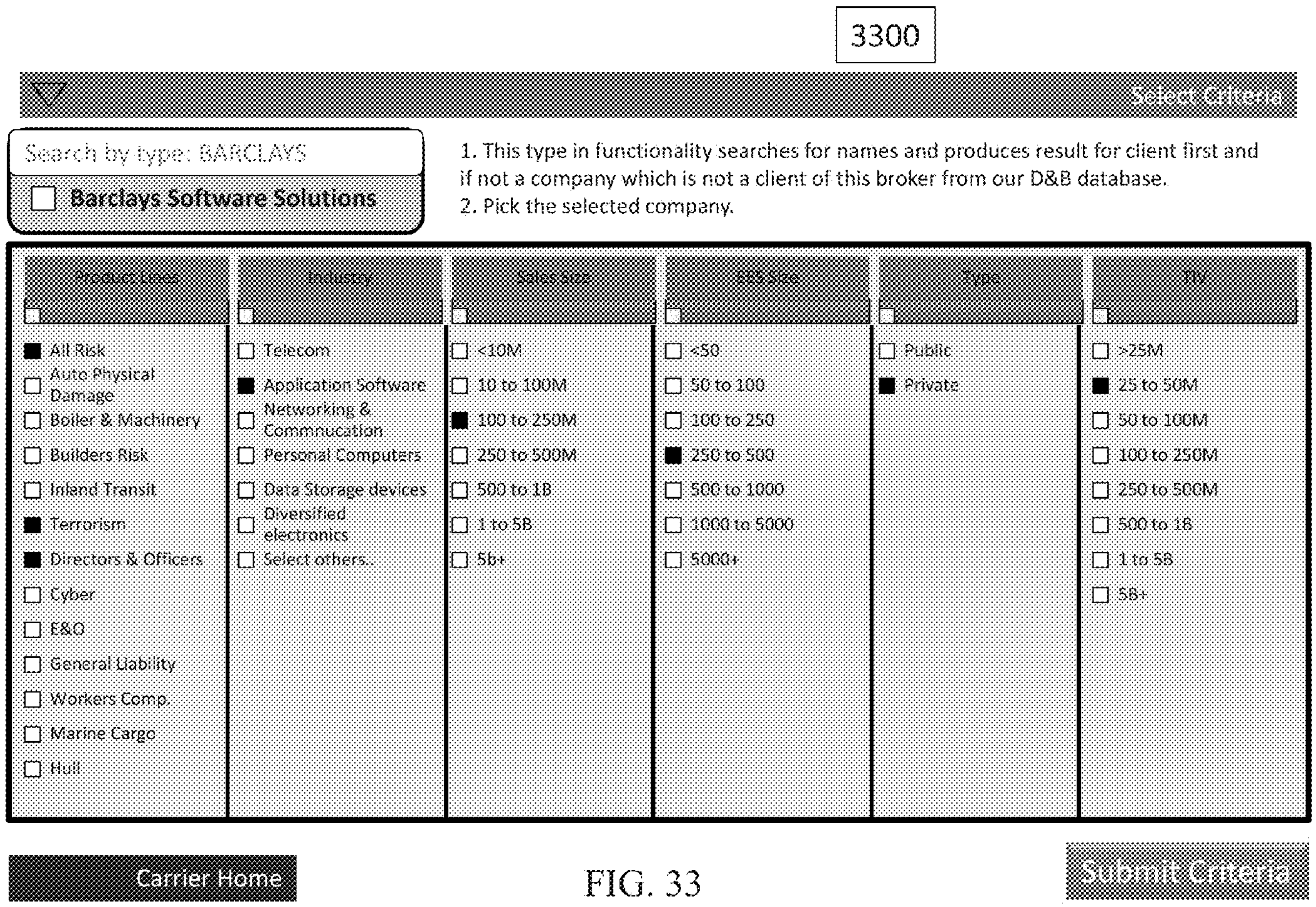
FIGS. 33-39 are exemplary interfaces providing market opportunity information to a carrier according to an exemplary embodiment of the present disclosure.

The system 1 provides a carrier with market research information. A market opportunity estimator of the system 1, can provide or show opportunities for the carrier beyond the carrier's appetite. In this regard, FIG. 33, shows according to an exemplary embodiment, an interface 3300 which allows a user to input criteria to the market opportunity estimator. In the example of FIG. 33, the carrier user has selected Barclay's as the type of client for which the carrier would like to see the market opportunities. Furthermore, the carrier user has indicated interest in All Risk, Terrorism, and Directors & Officers insurance in the Application & Software Industry. The carrier user has also indicated to be interested in sales between $100 to $250 million, with an EES (total number of employees) between 250 and 500, for private (private companies), with total insurance values (TIV) between $25 to 50 million dollars. Some of the information may be automatically entered by the system 1, for example the sale size and EES size may be automatically filled in or selected because they are dependent on other selections. After submitting the criteria, one or more interfaces can be generated and presented to the carrier user.

Figure 34:
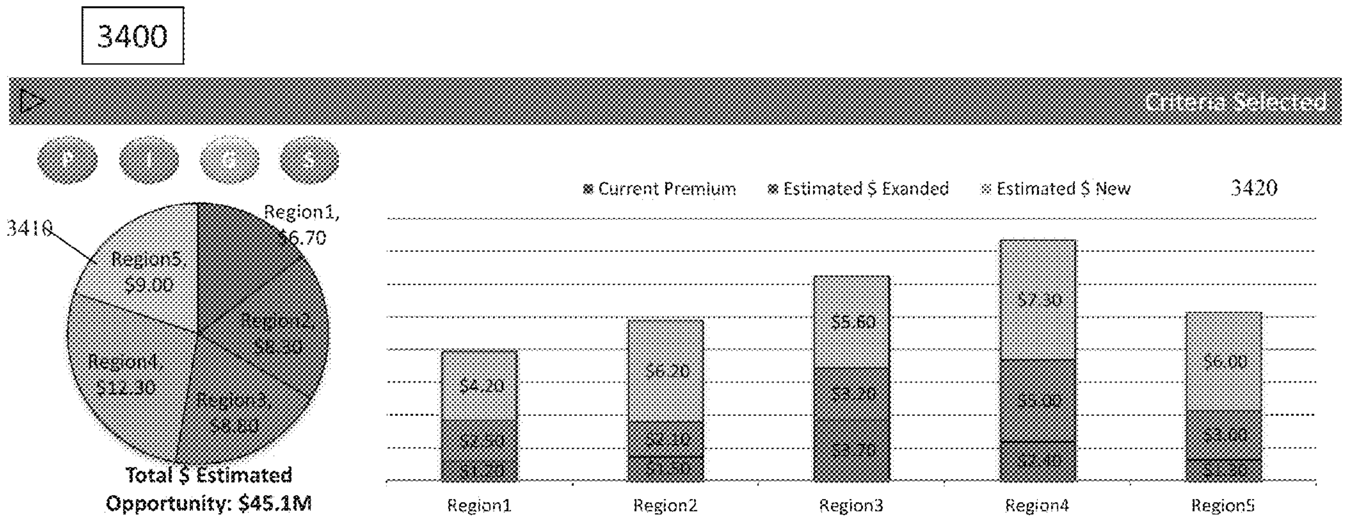
Figure 35:
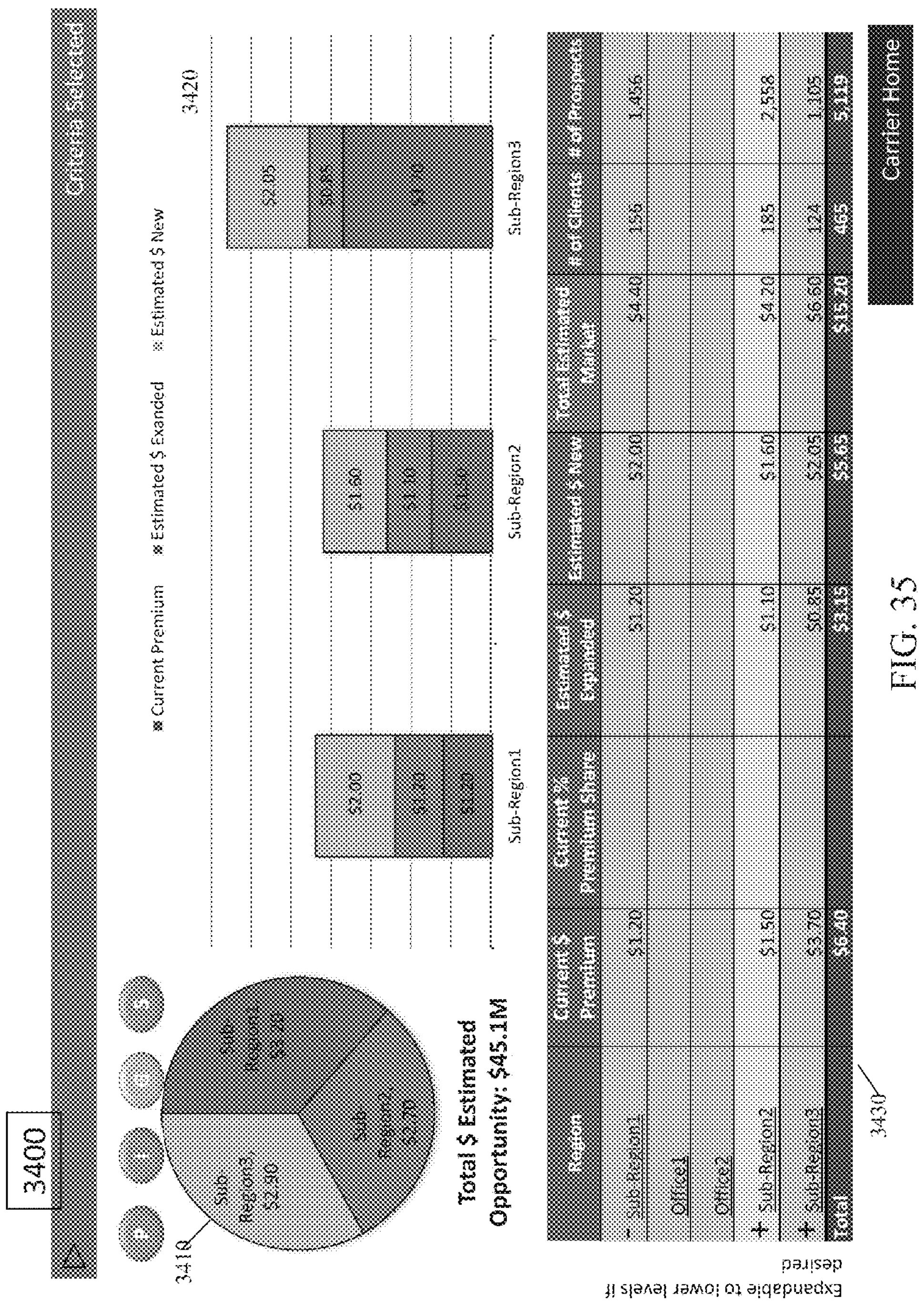

According to exemplary embodiments, FIGS. 34-40 show interfaces generated by the market opportunity estimator. FIG. 34, shows an exemplary interface 3400 which provides information, metrics, and data from the market opportunity estimator based on geography. For example, based on the criteria previously input, interface 3400 provides various graphs, charts, and/or tables. For example chart 3410 indicates the total market opportunity for a plurality of geographical regions, e.g., Region 1, Region 2, . . . , etc. These regions can represent any regions, including for example, as states (New Jersey, New York, etc.), areas (Northeast, Southwest, etc.), countries (US, Canada, Japan, etc.), etc. Chart 3410 provides in pie chart format the market opportunity. In embodiments, the chart may not display every region where there are opportunities, but only regions where non-trivial market opportunities exists for the carrier. As shown in FIG. 34, the chart 3410 shows, that Region 1 has a market opportunity of $6.7 million, Region 2 has a market opportunity of $8.30, etc.

In exemplary embodiments, interface 3400 provides a graph 3420 which shows the market opportunity information of chart 3410 in a bar graph format. Furthermore the graph 3420 further breaks down the market opportunity information into bands, for each region. These bands not only include the market opportunity values of chart 3410, but provide the current amount of business the carrier has in the listed regions. For example, referring to graph 3420, the carrier currently has $1.2 million of business based on premiums for Region 1. The graph 3240 indicates that out of the $6.7 million of market opportunity based in Region 1, there is $2.5 million of business opportunity for current clients of the carrier (estimated expanded opportunities), and $4.2 million of business opportunity for new clients (estimated new opportunities).

The interface 3400 includes table 3430, which also shows the market opportunity information. For each region, the table 3430 provides the carrier's value of business based on premiums for various listed regions, the carrier's premium share, and provides the estimated expanded and new opportunities. Additional the table provides, for each region, the number of carrier's clients and number of prospective clients for the carrier. The table 3430 is expandable. As shown in FIG. 34, Region 2 of the table 3436 has been expanded and shows the market information for additional sub regions located within Region 2. For example, if Region 2 is the northeast, Sub-Region 1 could New York, Sub-Region 2 could be New Jersey, and Sub-Region 3 could be Connecticut.

The entries, such as the regions listed in the table 3430, can be selected, so that interface 3400 provides additional information specific to a selected region. For example, if region 2 has been selected as is the case in FIG. 35, interface 3400 updates chart 3410, graph 3420, and table 3430 so as to provide market opportunity related information for Region 2. In this regard, the market opportunity information based geography for Region 2 is provided by the sub-regions of Region 2, e.g., Sub-Region 1, Sub-Region 2, etc.

Figure 36:
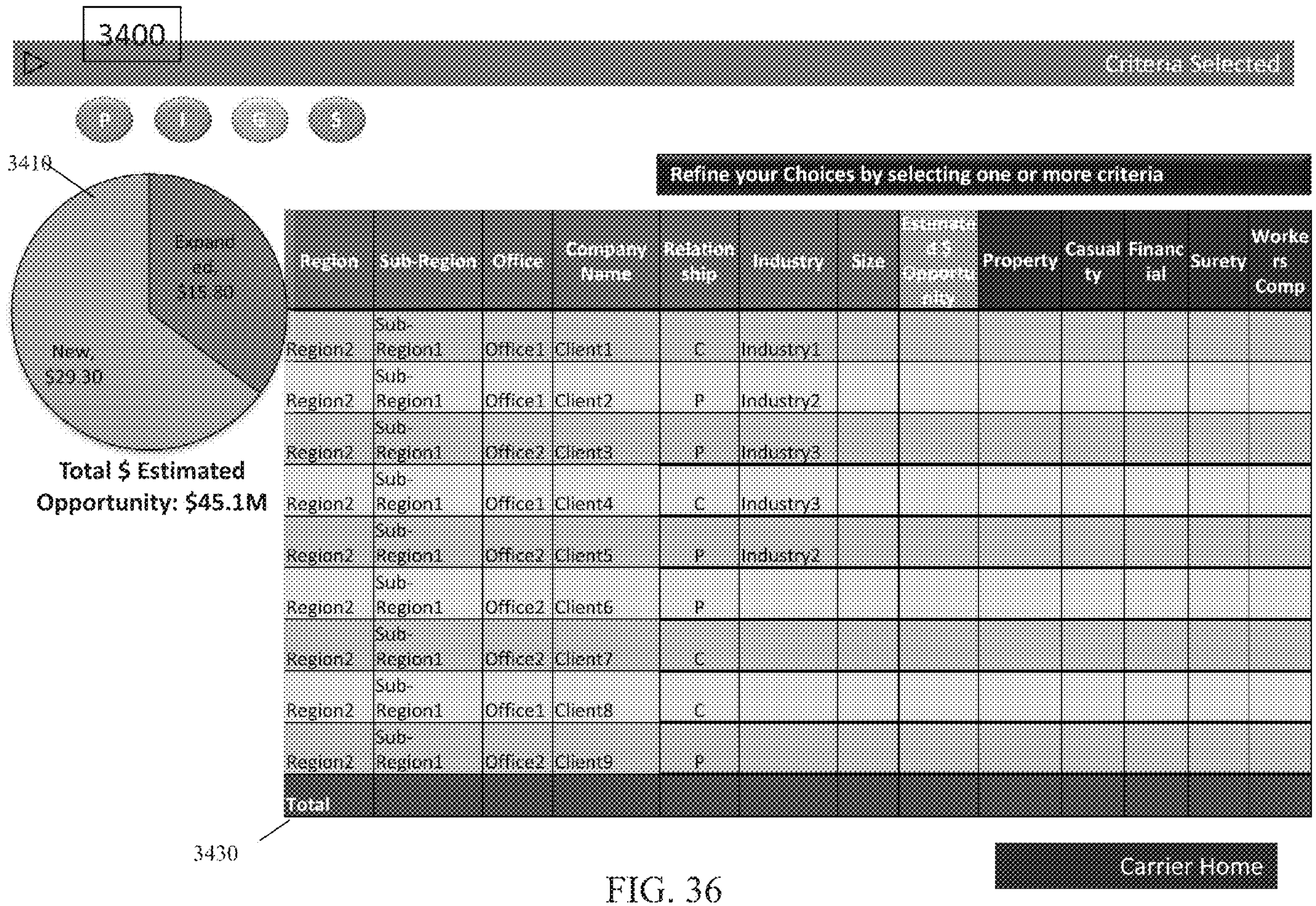

Similarly, a particular sub-Region may also be selected and a new table can be generated. According to an exemplary embodiment, FIG. 36 shows table 3430 updated based on a selection of Sub-Region 1 of Region 2. Further, as the selection of the geographical region becomes more specifically refined, the table 3430 may provide additional or different related information. For example, as seen in FIG. 36, for each listed client of a sub-region, the type of industry is indicated, the size of the office/client, the estimated opportunity, and indication (and premium size) of what type of insurance there is an opportunity to provide to the client.

Figure 37:
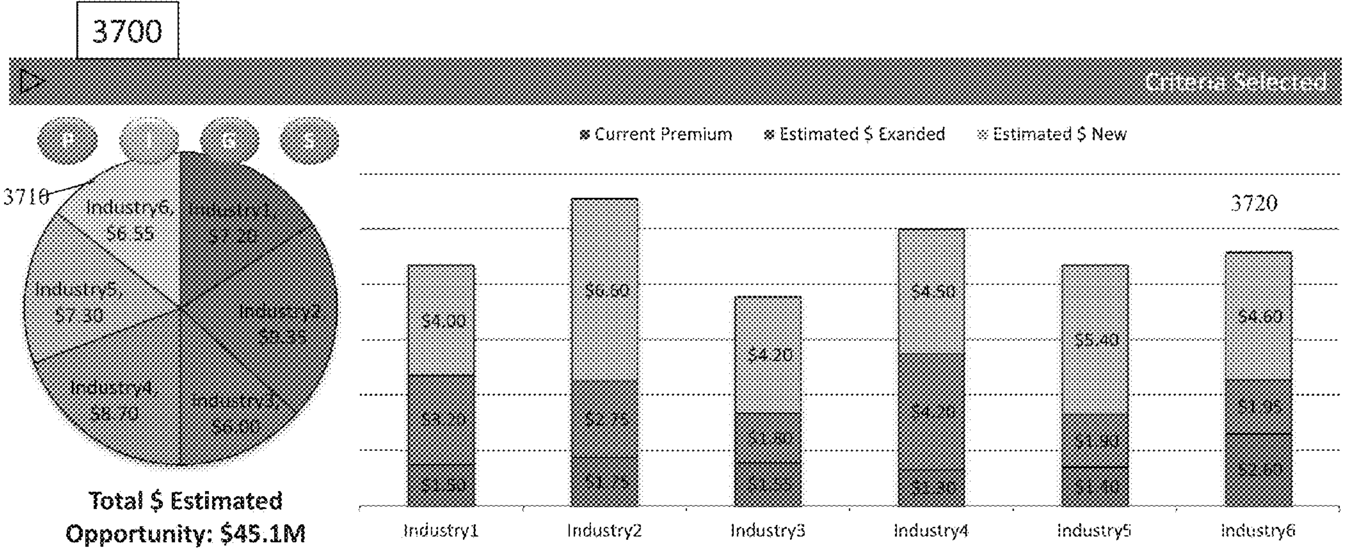

According to exemplary embodiments, FIG. 37 shows an exemplary interface 3700, which provides information, metrics, and data from the market opportunity estimator based on industry. Interface 3700 provides chart 3710, graph 3720, and table 3730, which are akin to the chart 3410, graph 3420, and table 3430 of interface 3400, except that the market opportunity information is provided by industry. Therefore, for example, interface 3700 shows how the market opportunities for the six listed industries, (Industry 1, Industry 2, . . . ). Industry 1, Industry 2, can be any suitable distinct industries for which insurance is provided. Each Industry is expandable to an Industry Sub-Sector 1, Sub-Sector 2, . . . where market opportunities will be provided for each.

In embodiments, the table 3730, is also selectable and expandable like table, table 3430. A particular industry can be selected, so that the table 3730 provides market opportunity information for that selected industry.

Figure 38:
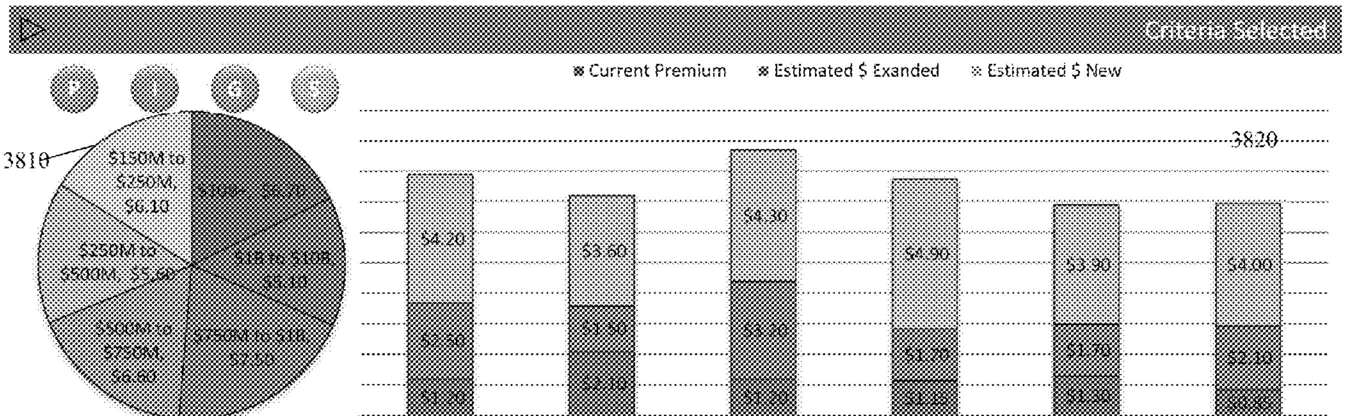

According to exemplary embodiments, FIG. 38 shows an exemplary interface 3800, which provides information from the market opportunity estimator based on client size. Interface 3800 provides chart 3810, graph 3820, and table 3830, which are also akin to the chart 3410, graph 3420, and table 3430 of interface 3400, except that the market opportunity information provided by size. Therefore, interface 3800 shows the market opportunities by the listed size ranges, ($10 Billion+, $1 Billion to $10 Billion, etc.)

In embodiments, the table 3830, is also selectable and expandable. A particular size range can be selected and the table 3730 can then provide market opportunity information for that selected size band.

Figure 39:
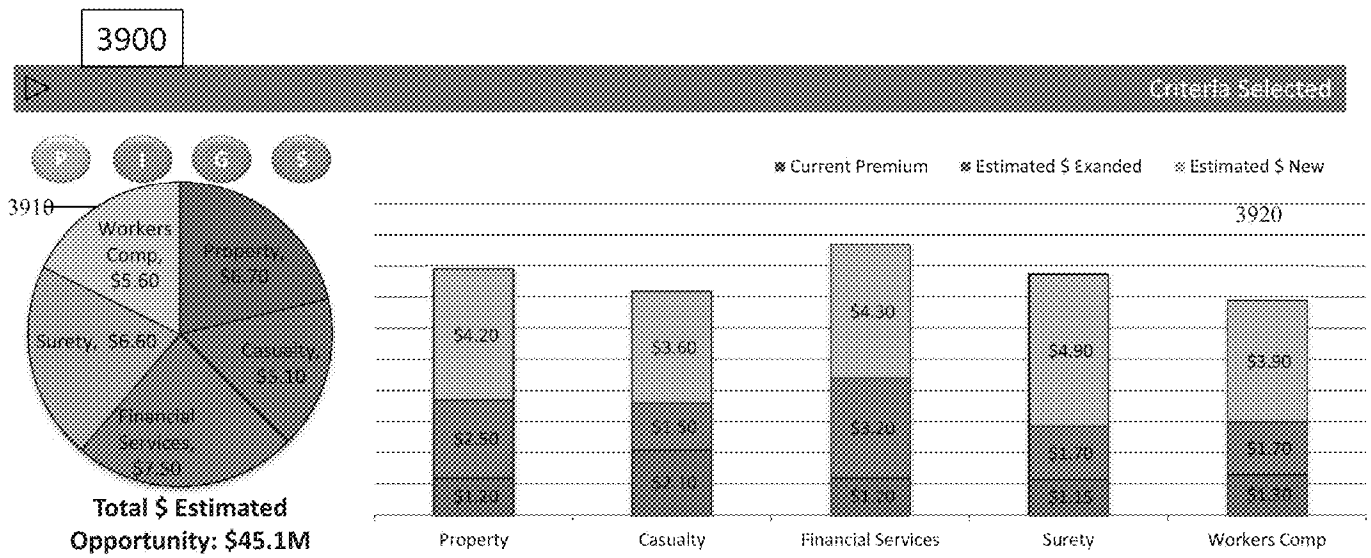

According to exemplary embodiments, FIG. 39 shows an exemplary interface 3900, which provides information from the market opportunity estimator based on product type. Interface 3900 provides chart 3910, graph 3920, and table 3930, which are also akin to the chart 3410, graph 3420, and table 3430 of interface 3400, except that the market opportunity information provided by product. Therefore, for example, interface 3900 shows how the market opportunities for the listed product types, (e.g., Property, Casualty, Workers Comp. etc.)

In embodiments, table 3930, is also selectable and expandable. A particular product type can be selected so that the table 3730 provides market opportunity information for that selected product type.

Figure 40:
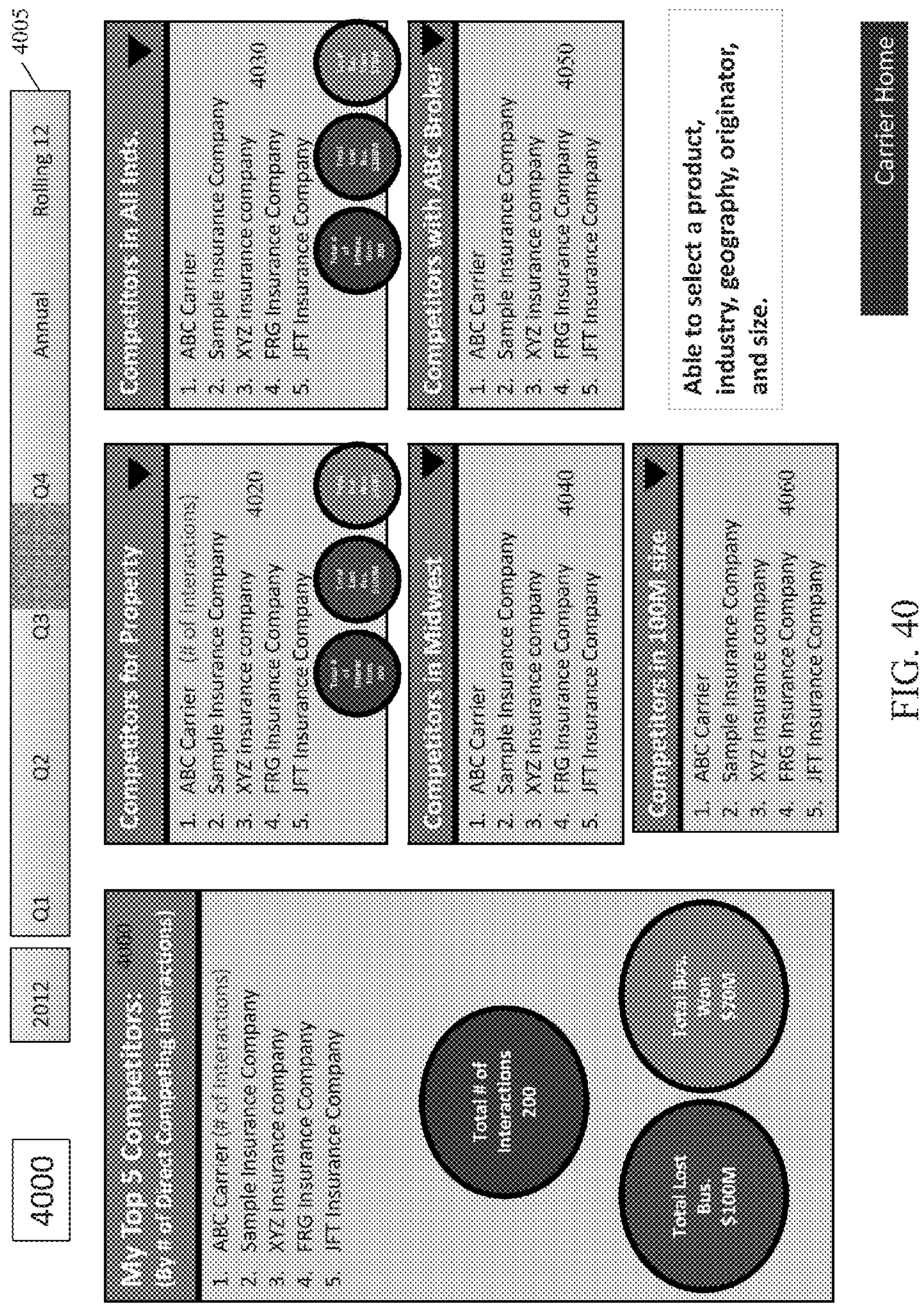
FIG. 40 is an exemplary interface providing competitor information to a carrier according to an exemplary embodiment of the present disclosure.

The system 1 provides a carrier with information regarding the carrier's competitors. In this regard FIG. 40 shows according an exemplary embodiment, an interface 4000 providing information regarding the carrier's competitors. For example, table 4010 lists the top 5 competitors to the carrier based on the carrier's appetite. The table 4010 further indicates the total number of interactions regarding the competitors, the amount of business the carrier lost to the top 5 competitors, and the amount of business won from the top 5 competitors. While the information is based on the top 5 competitors to the carrier, other variations may be used, such as top 3 competitors, top 4 competitors, or any other suitable selection of carriers.

Similarly interface 4000 can provide other tables showing the top competitors by one or more product types, by one or more industries, by one or more geographical locations, by one or more size ranges, or by one or more competitors. For example, the table 4020 lists the carrier's top competitors in property insurance, table 4030 lists the carrier's top competitors in all industries, table 4040 lists the carrier's top competitors in the Midwest, table 4050 lists the carrier's top competitors to a particular broker, ABC Broker, and table 4060 lists the carrier's top competitors based on size. These tables are exemplary and other variations may be provided, for example, different geographical areas, different products, different industries, etc. Further, the competitor tables may further provide additional information including, for example, the number of interactions, the amount of business the carrier won from one or more competitors, the amount of business the carrier lost to one or more competitors, etc.

The interface 4000 may provide a settings interface (not shown) that allows a carrier user to request additional tables showing the top competitors to the carrier based upon the carrier criteria.

Figure 41:
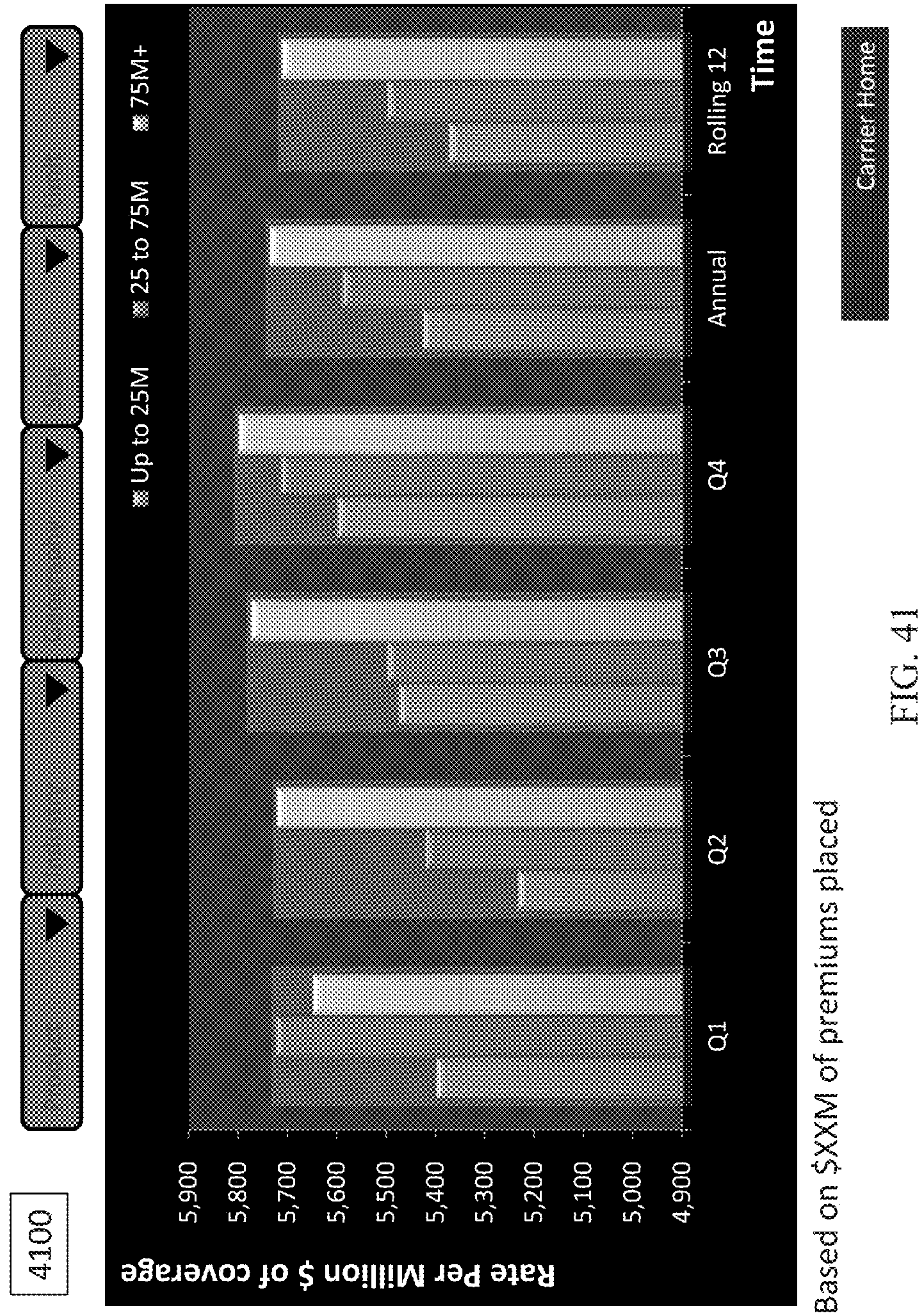
FIG. 41 is an exemplary interface providing market rate information to a carrier according to an exemplary embodiment of the present disclosure.

The system 1 provides a carrier with information regarding the insurance market rates based on the carrier's appetite. In this regard, FIG. 41 shows, according an exemplary embodiment, an interface 4100 providing market rate information. As shown in FIG. 41, the graph 4110 shows the rate based per million of coverage. The interface 4100, the information provided in table 4110 is shown by size ranges and time periods. However, the information may be displayed differently, based on product, industry, limit, etc.

The system 1 provides a carrier with reports based on carriers selected criteria. The reports can show the carrier's past and/or current status with regard to providing insurance to clients or potential clients. For example, FIG. 42 shows an interface 4200 with a submission report table 4010 showing the results of interactions between the carrier and clients and/or potential client. For example, each row identifies a targeted client and indicates the client's industry, the type of insurance sought, the corresponding renewal date, the layer type for the desired insurance, the program limit for the client, the originator/broker contact associated with the client, the originator/broker, and the status. For example, Barclay's seeks All Risk insurance for its Electronic industry with a renewal date of Nov. 11, 2012. The All Risk insurance desired is a layered type, with a program limit of $100 million. The Barclay's contact person is "Bob Peretti" of "Broker 1". The Barclay's row further indicates that the carrier has "won" providing this insurance to Barclay's. In embodiments, the table 4210 can be filtered by any category such as client name, industry, product, etc.

Figure 43:
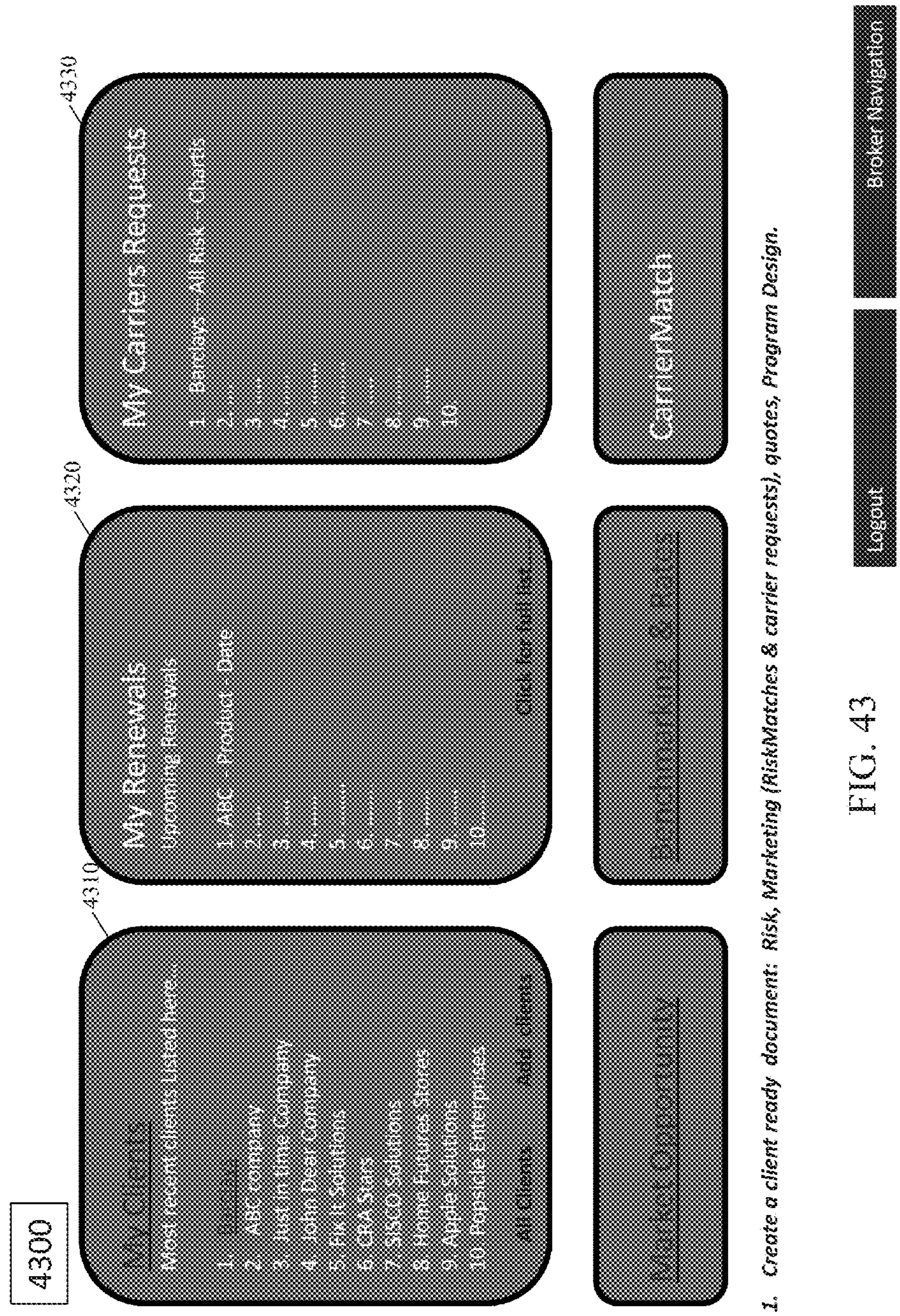
FIG. 43 is an exemplary interface provided to a broker according to an exemplary embodiment of the present disclosure.

As explained previously herein, the system 1 receive inputs from a registered broker regarding the profiles of the broker's clients. A broker using the system 1 may provide various information in order to receive carrier matches for the broker's clients. For example, FIG. 43 shows exemplary interface 4300, which may be provided to a broker using the system 1. The interface 4300 provides a table 4310 listing the broker's clients, table 4320 listing client's insurance products needing renewal, and table 4340 listing requests from carriers. Through the interface, the broker may access market opportunity information, benchmarking and rate information, and carrier match information.

Figure 44:
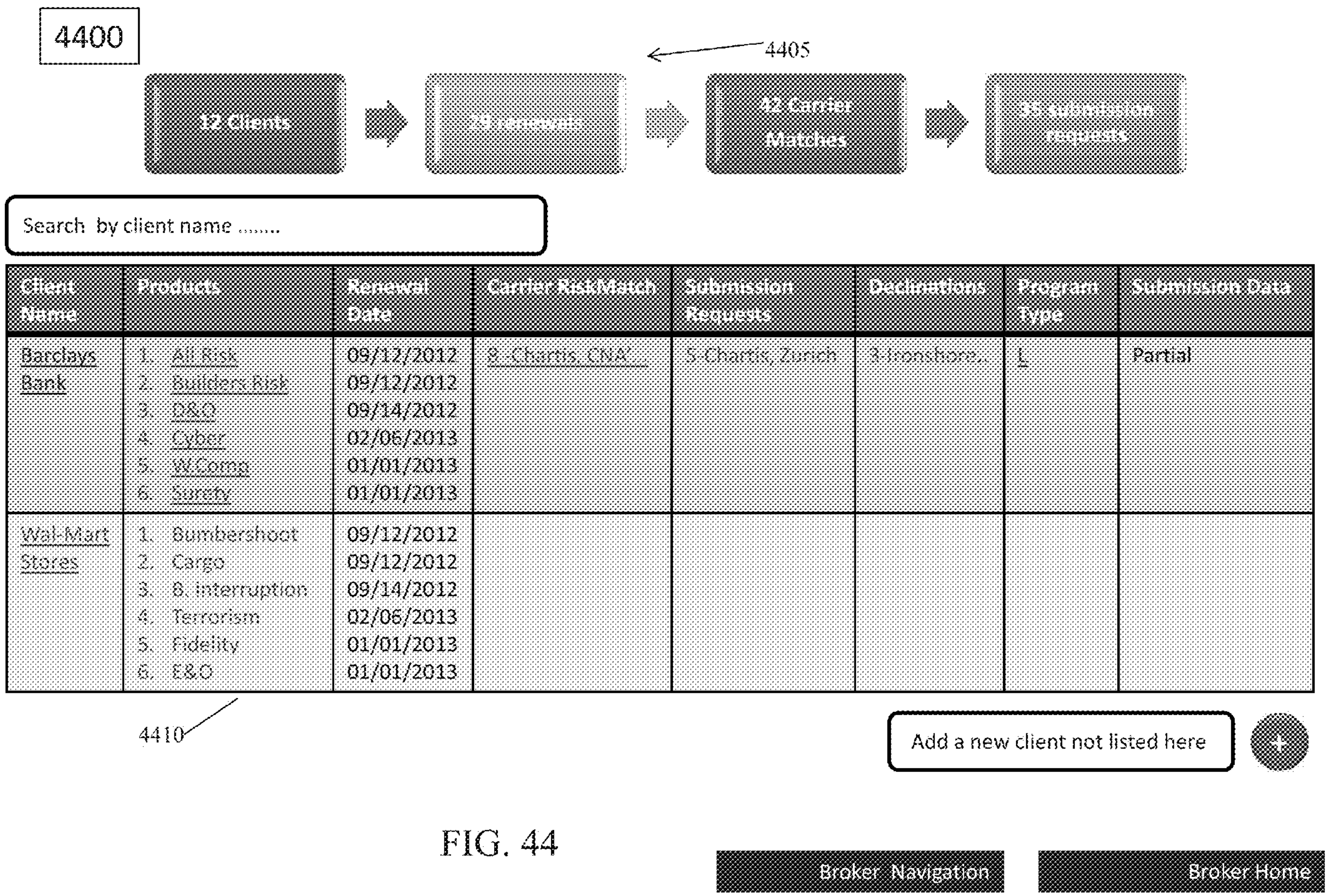
FIGS. 44-46 are exemplary interfaces providing client information to a broker according to an exemplary embodiment of the present disclosure.

In embodiments, a broker may select "My Clients" from interface 4300. In accordance with exemplary embodiments, the system 1 provides the broker with client interface 4400 as shown in FIG. 44.

The interface 4400 include a simple diagram 4405 illustrating the number of broker clients and the corresponding number of renewals, number of carrier matches, and number of submission requests.

The interface 4400 also includes table 4410, which lists one or more of the broker's clients. For each client listed, the client's product, the corresponding insurance renewal dates, and insurance program type can be provided. Further, the interface 4440 can indicate the carrier matches to each listed and indicate the number of submission requests for the client. The table 4410 may indicate carriers for which a proposed quote/submission has been declined and how much information has been submitted.

Figure 45:
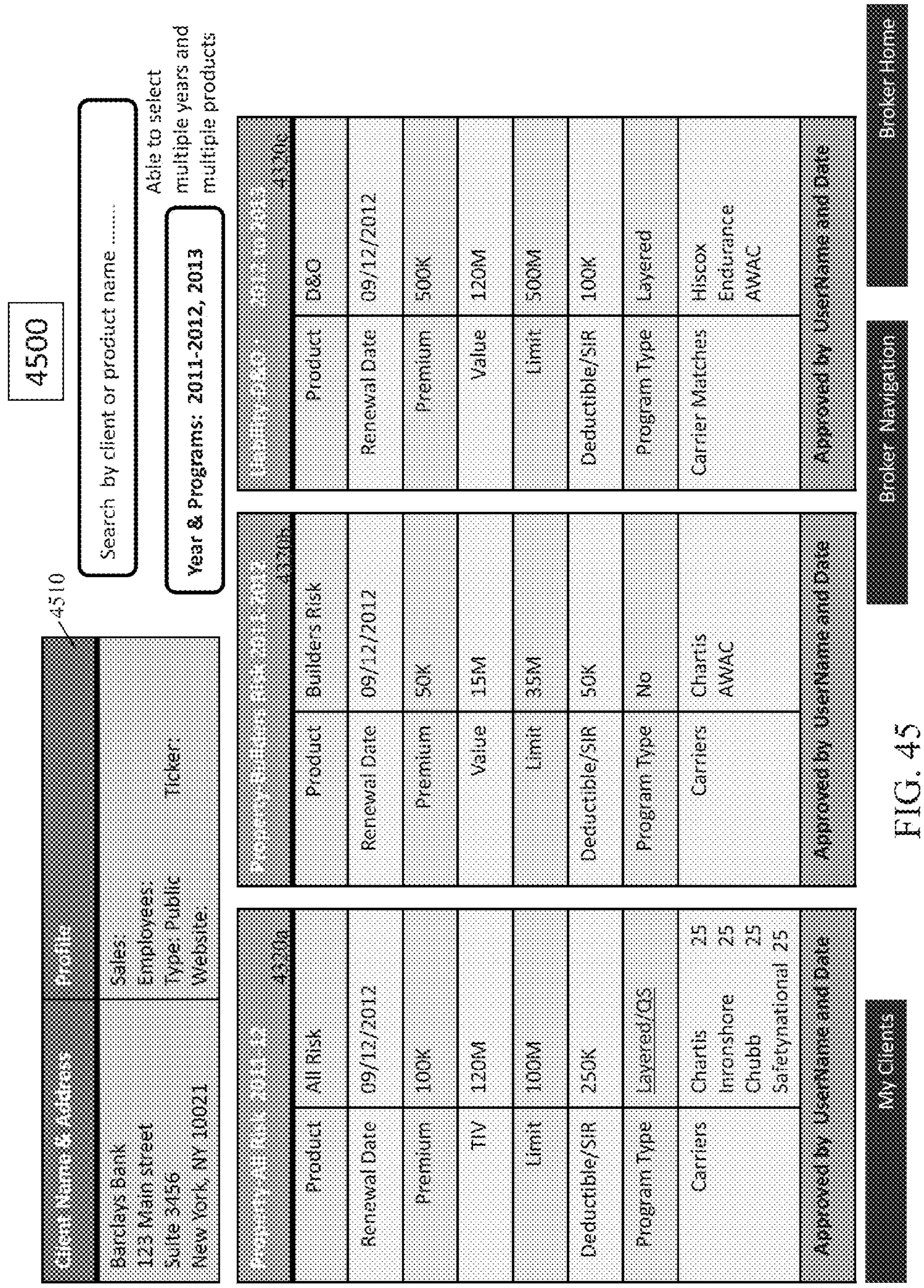

In exemplary embodiments, the information in table 4410 can be selectable by a broker. For example, a broker interested in information regarding Barclay's may select the "Barclay" entry from table 4410 and in response, be provided an additional interface. FIG. 45, shows according to an exemplary embodiment, interface 4500 which provides details regarding a particular broker client. For example, interface 4500 provides greater details regarding the client Barclay's. The client information provided in interface 4500 may be filtered by a selected year and/or products.

Figure 46:
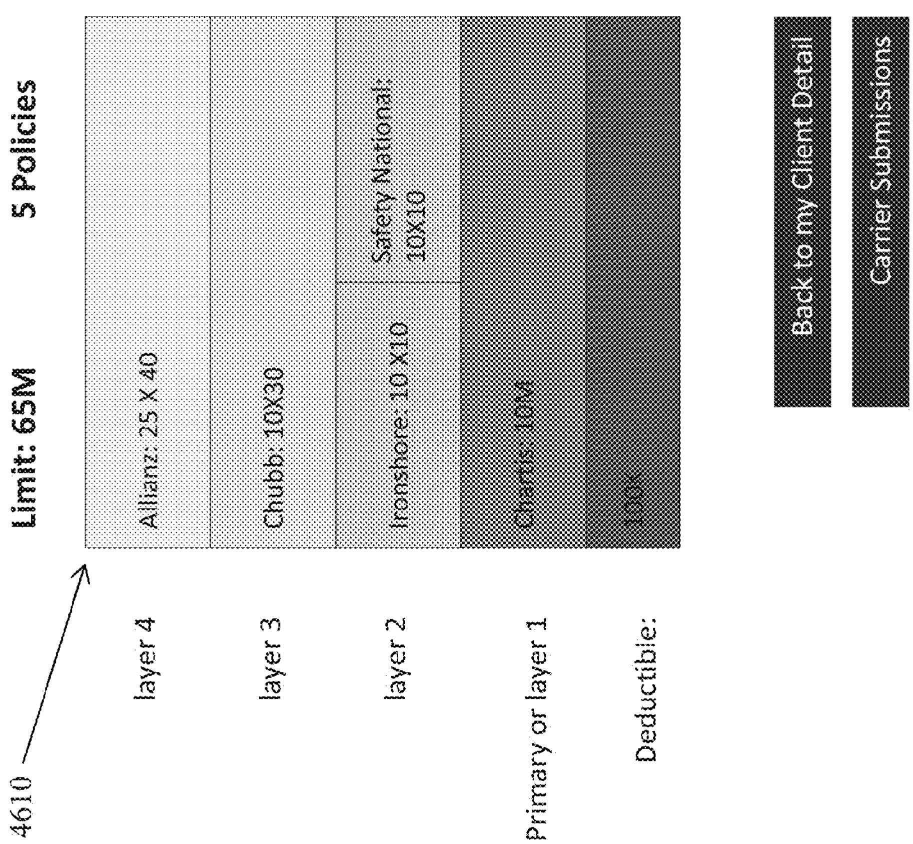

The table 4510 can provide basic identification and profile information, including the client's address, sales figures, number of employees, type of company (e.g., public or private), their website ticket symbol, website address, etc. The interface 4500 may provide details regarding one or more insurance products for the client. In this regard, interface 4500 includes tables 4520*a-c*, which respectively provide information regarding the client's Property All-Risk insurance between 2011-2012, the client's Property-Builders Risk insurance between 2011-2012, and the client's Liability-Directions & Officers insurance between 2012 to 2013. The tables 4520 may describe and/or indicate the product type, the renewal date, the premium amount, the TIV amount, the deductible amount, the program type, the matching carriers, etc. in a convenient format. In some exemplary embodiments, one or more entries may be also be selectable. For example, referring to table 4520*a*, the broker user may select the entry corresponding to program type. FIG. 46 shows, according to an exemplary embodiment, a visual representation of a client's insurance program. As shown in FIG. 46, the program visualizer 4610 visually presents the client's insurance program, including the various layers of insurance as well as the deductible. For each layer, the corresponding insurance carrier(s) providing the layer are indicated as well as the limit for each layer.

Figure 47:
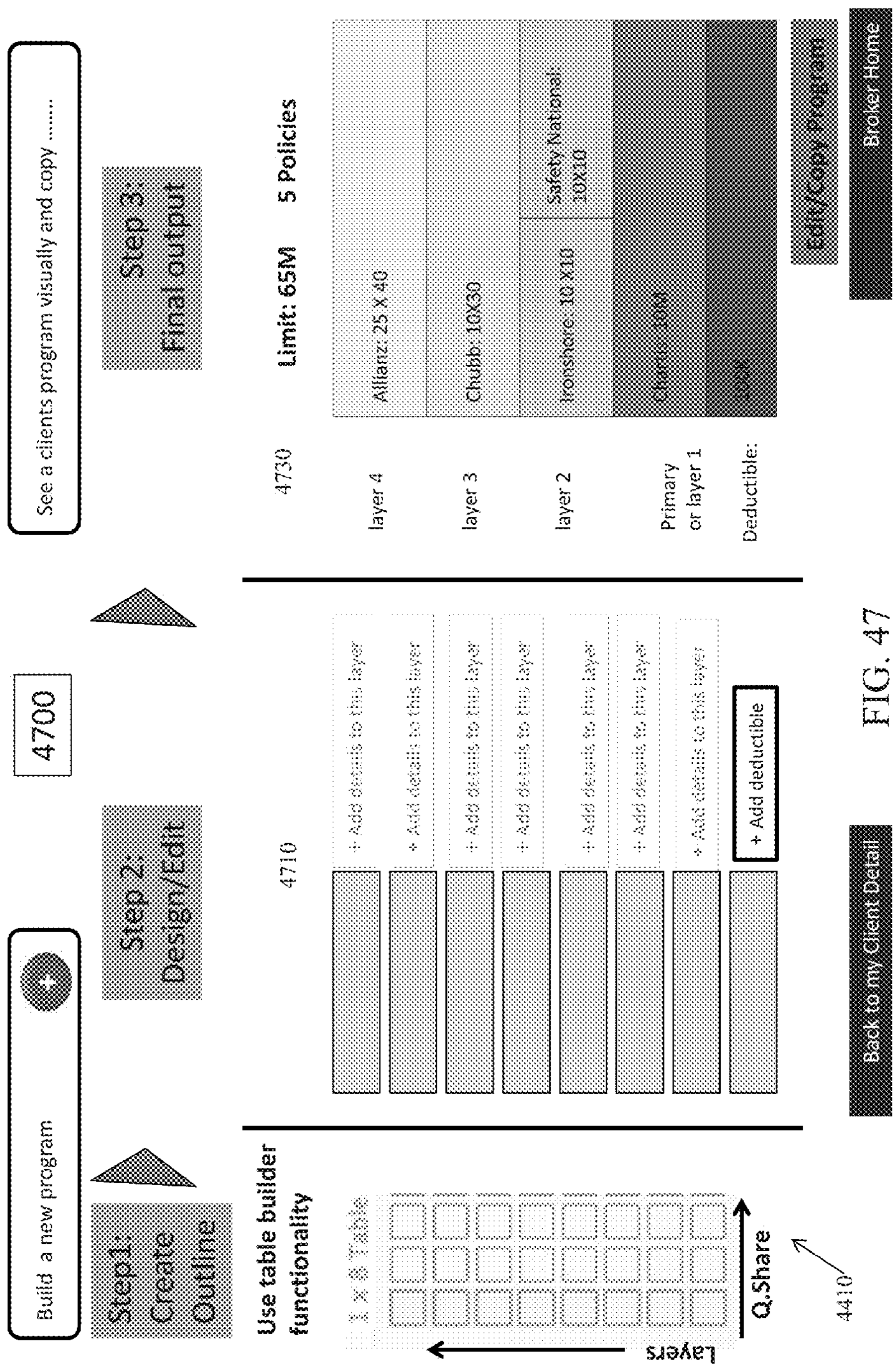
FIG. 47 is an exemplary interface provided to a broker for specifying a client's insurance program according to an exemplary embodiment of the present disclosure.
Figure 53:
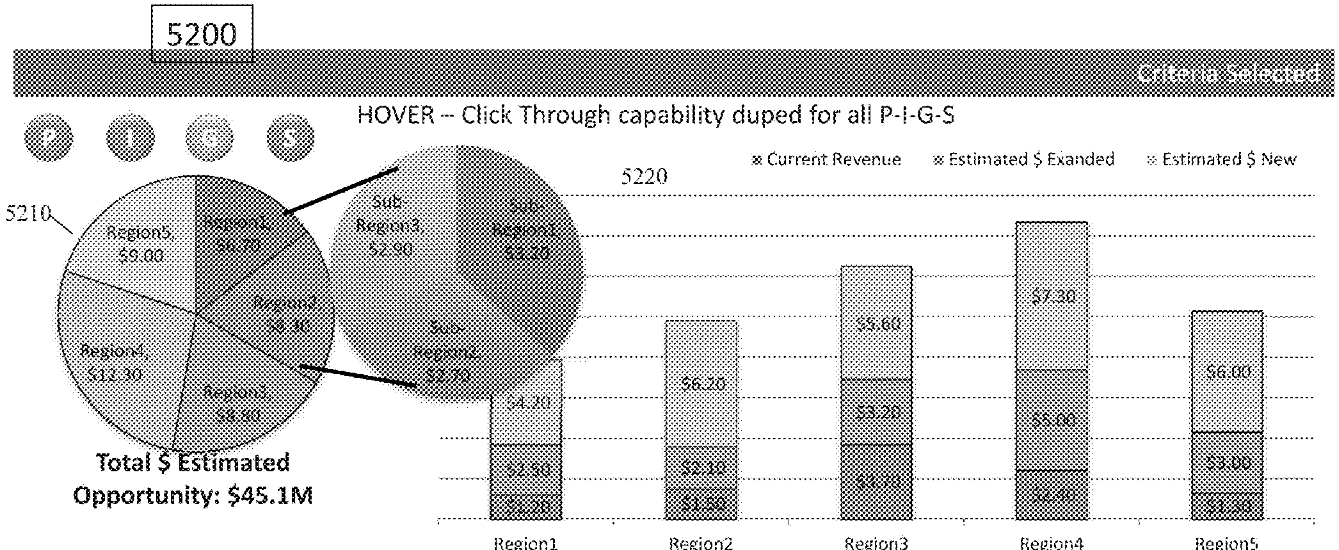

In exemplary embodiments, a broker using the system 1 can build/design an insurance program. FIG. 47, shows an exemplary program builder 4700 provided by the system 1. The program builder may include various selections to be input by the broker. For example, in FIG. 47, step 1 providing a table builder 4720 graphical interface to allow the broker to select the number of layers, and indicate how a layer is shared (if at all) between a plurality of carriers. For step 2, the program builder 4700 includes a layer describer 4720 allowing the details or requirements (limits, etc.) for each layer, as well as specify the amount of a deductible. If there are existing carriers, they may be specified according to the specific layer to which they are providing insurance. Finally, the program layer is output 4730 and saved in step 3.

In exemplary embodiments, the system 1 provides the broker with submission requests for the clients of the broker. In this regard interface 4800 includes table 4810 which lists the submission requests by carrier. For each carrier submission, the associated client, product, renewal date, insurance program type, program limit, the submitting carrier, carrier type, carrier user name, carrier rank, hit ratio, date submitted acceptance status, etc., can be included. Some of the information has been previously described herein (insurance program type, program limit, etc.) Referring to the table 4810, the carrier type describes the previous relation of the carrier to client. For example an "IN" entry indicates the carrier is the incumbent carrier for the insurance product needing renewal, whereas a "NEW" entry the carrier is new or has not previously supplied this insurance product to the client. The carrier rank may indicate the significance of a carrier based at least in part on the amount of premiums the carrier underwrites, the number of clients the carrier has, and/or the number of different products the carrier underwrites.

As with other tables described herein, the entries of the table 4810 may be selectable by the broker. A broker may select one or the carrier's entries so as to be provided additional information, such as, for example, a snapshot of the carrier's appetite.

FIG. 49, shows according to an exemplary embodiment, a carrier's appetite 4900 provided to the broker. The provided appetite may not include all of the details of the selected carrier's appetite, but may provide a summary or details regarding the carrier's appetite with respect to products offered, industries, TIV ranges, sale size ranges, limits, locations offering insurance, CAT preferences, deductible preferences, layer preferences, etc.

According to FIG. 50, shows interface 5000 which includes table 5010. The table 5010 lists one or more carriers that have relationship (either currently or previous) with the broker. For each carrier listed, additional information regarding the carrier is provided, such as the number of clients the carrier has, the number of submissions requests by the carrier, the hit ratio of the carrier, the density rank of the carrier, the total number of premiums with the carrier. Furthermore, some of the information may be further provided or broken down by specific product (e.g., Property, Casualty, Liability, Marine, etc.).

As with other interfaces described herein, interface 5000 can include a timeline selector 5005 which determines over what time period the information in the interface corresponds to. Additionally, interface 5000 can also have a search box 5015 for accessing information regarding a particular carrier or set of carriers based on broker input.

The system 1 can also provide the broker with carrier matches. An interface, similar to the market opportunity estimator interface of FIG. 33 can be used for the broker. Except, instead of entering a client name (Barclay's) the broker can input a carrier name, such as Zurich, or Chubb, or etc. After submitting the information, the broker can be provided with a carrier match interface.

FIG. 51 shows, according embodiments, an interface 5100 which provides the broker with carrier matches based on broker specified criteria or in other words, the client appetite. Interface 5100, includes a table 5110, which lists the one or more of the carrier matches. For each carrier listed, table can include the carrier's rating, industry segments covered by the carrier, the carrier's layer preferences, carrier's limit preferences, carrier's CAT preferences, carrier's specified deductible, etc. For each carrier match, marketing material or a portion thereof may be provided, as well as a contact for the carrier. In addition, the table 5110 may include other information or columns related to client-carrier relationship (if any), the carrier's industry share, etc.

The entries in the table can be selected by the broker in order to be provided with further information, such as the marketing material entry. A broker may select a particular carrier or contact person for the carrier in order to request a submission for the carrier on behalf of a client.

The system 1 also provides a broker with market research information. A market opportunity estimator of the system 1, can provide or show opportunities for the broker beyond a particular client(s) appetite. As explained previously with respect to FIG. 33, an interface can allow a user to input criteria for the market opportunity estimator.

According to exemplary embodiments, FIGS. 52-58 show interfaces generated by the market opportunity estimator. The interfaces correspond to the previous describe interfaces shown in FIGS. 34-40, except the market information may be shown from the viewpoint of the broker. The interface 5200 of FIG. 52, shows an exemplary interface 5200 which provides information, metrics, and data from the market opportunity estimator based on geography. For example, based on the criteria previously input, interface 5200 provides various graphs, charts, and/or tables. For example chart 5210 indicates the market opportunity for a plurality of geographical regions, e.g., Region 1, Region 2, . . . , etc. As described previously, these regions can represent any regions, including for example, as states (New Jersey, New York, etc.), areas (Northeast, Southwest, etc.), countries (US, Canada, Japan, etc.), etc. Chart 5210 provides in pie chart format the market opportunity for each region. The chart may not have all regions where there are opportunities, but may only provide market opportunity information for an appropriate subset of regions where non-trivial market opportunities are available for the broker/client. As shown in FIG. 52, the chart shows, that Region 1 has a market opportunity of $6.7 million, Region 2 has a market opportunity of $8.30, etc.

In exemplary embodiments, the interface 5200 provides graph 5220, which shows the market opportunity information of chart 5210 in a bar graph format. Furthermore, graph 5220 provides the market opportunity information by bands for each region. These bands not only include the market opportunity values of chart 5210, they also additionally provide the broker's current share of business e.g., provides the amount of insurance the client/broker has in the various listed region. According to graph 5220, the broker/client currently has $1.2 million of revenue generated for Region 1.

The table indicates that out of the $6.7 million of market opportunity based on revenue in Region 1, there is potentially $2.5 million of insurance that could be provided to current clients of the broker (estimated expanded opportunities), and $4.2 million of business opportunity for new clients of the broker (estimated new opportunities).

Interface 5200 also includes table 5230, which shows the market opportunity information. For each region, the table 5230 provides the broker's value of business based on revenue for various listed regions, the broker's revenue share, and provides the estimated expanded and new opportunities. Additionally, the table 5230 provides for each region the number of broker's clients and number of prospective clients for the broker. The table 5230 can also be expandable. As shown in FIG. 5230, Region 2 has been expanded and shows the market information for additional sub regions located within Region 2. For example, if Region 2 is the northeast, Sub-Region 1 could New York, Sub-Region 2 could be New Jersey, and Sub-Region 3 could be Connecticut.

The regions listed in the table 5230, can also be selected, so that interface 5200 provides information specific to that selected region. For example, if region 2 has been selected, as is the case in FIG. 53 interface 5200 updates chart 5210, graph 5220, and table 5230 so as to provide market opportunity related information for Region 2. In this regard, the market opportunity information based geography for Region 2 is provided by the sub-regions of Region 2, e.g., Sub-Region 1, Sub-Region 2, etc.

Figure 54:
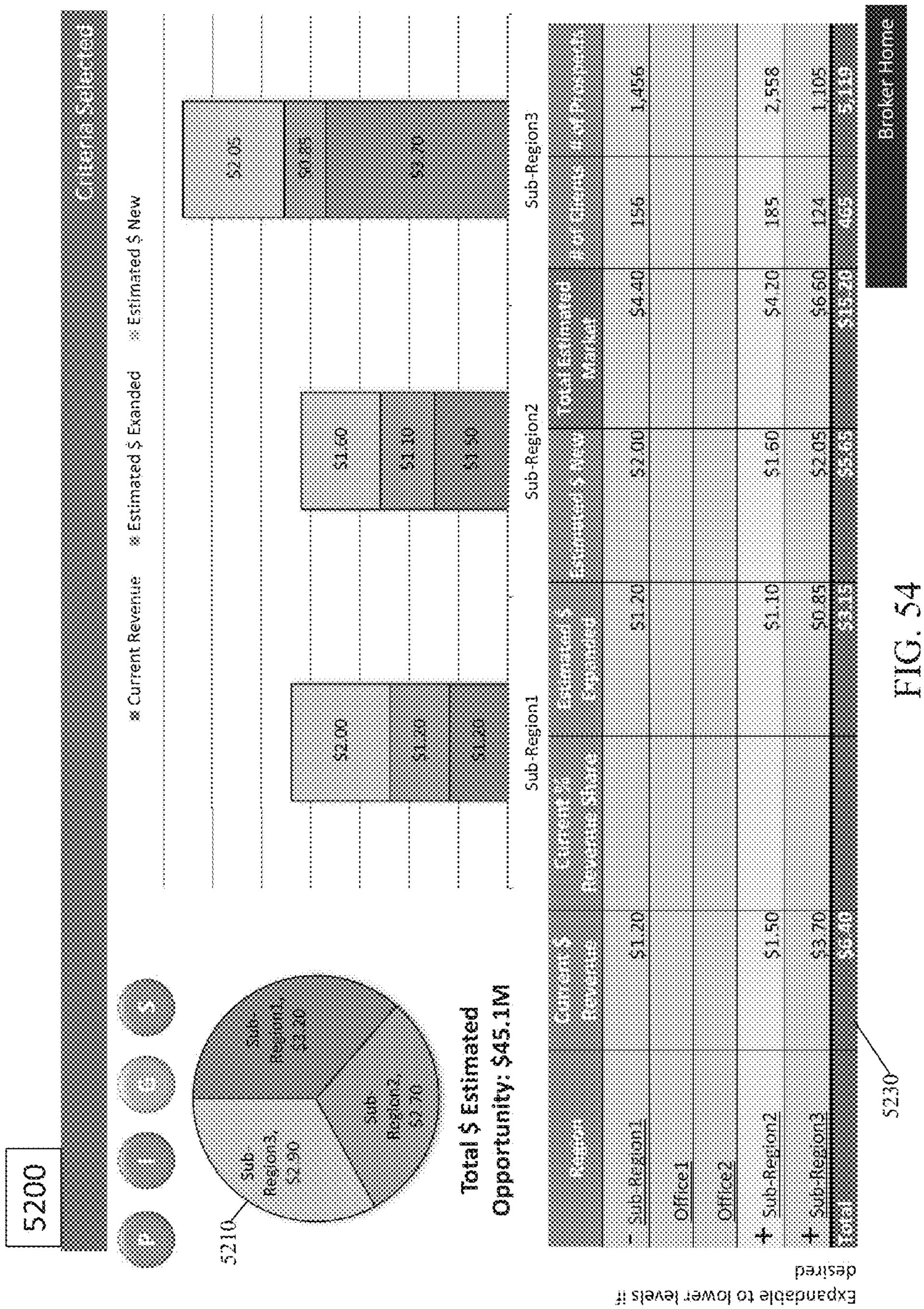
Figure 55:
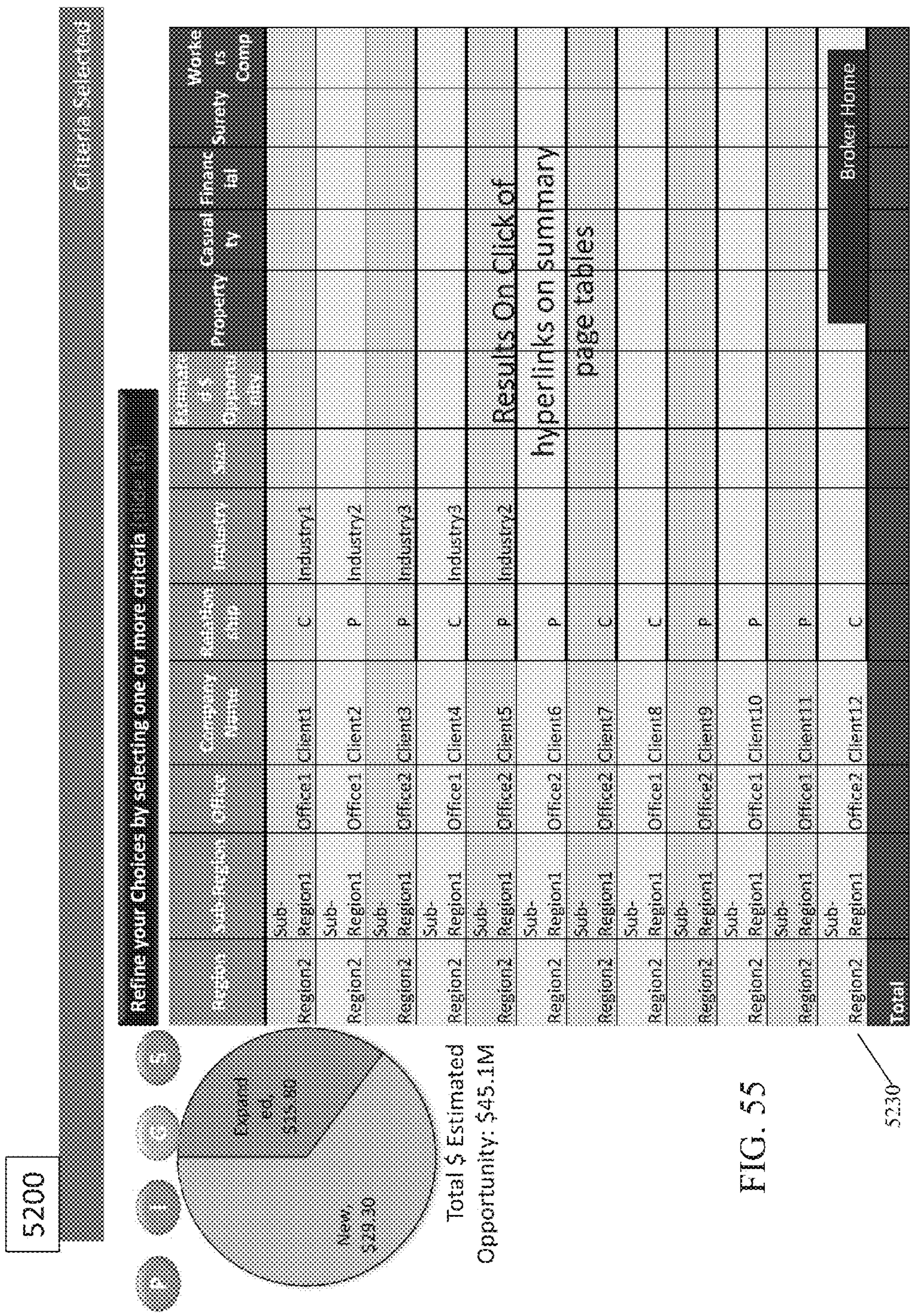

Similarly, a particular sub-Region can further be selected and a new table can be generated. According to an exemplary embodiment, FIG. 54 shows table 5230 updated based on a selection of Sub-Region 1 of Region 2. Further, as the selection of the geographical region becomes more specifically refined, the table 5230 may provide additional or different information. For example, as seen in FIG. 55, for each listed client of a sub-region, the type of industry is indicated, the size of the office/client, the estimated opportunity, and indication (and revenue size) of what type of insurance there is an opportunity to provide to the client.

Figure 56:
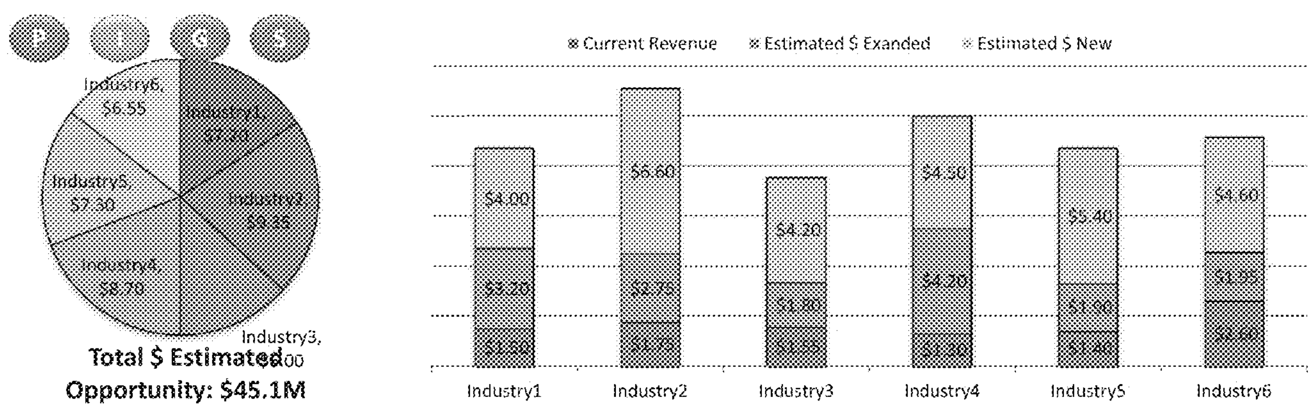
Figure 57:
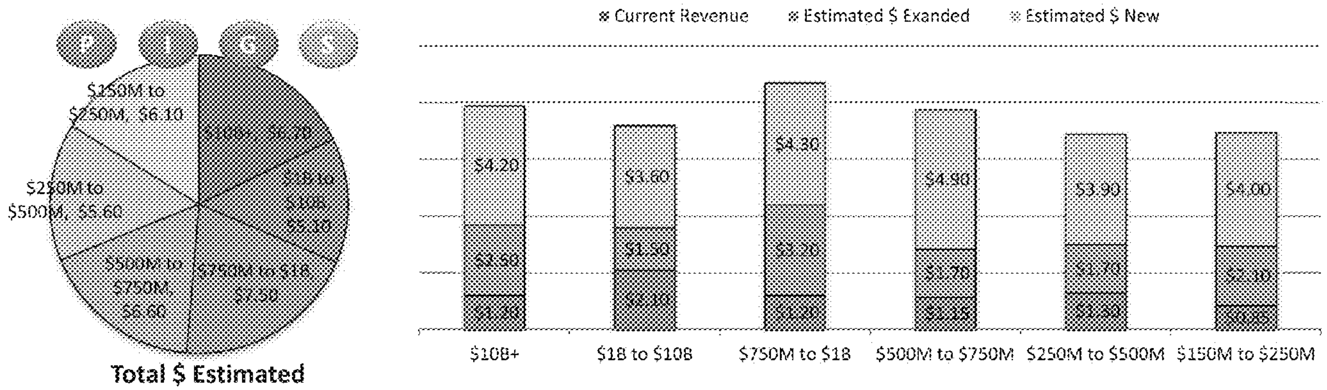

According to exemplary embodiments, FIG. 56 shows an exemplary interface 5600 which provides information, metrics, and data from the market opportunity estimator based on industry. FIG. 57 shows an exemplary interface 5700 which provides information, metrics, and data from the market opportunity estimator based on sale size. According to exemplary embodiments; and FIG. 58 shows an exemplary interface 5800 which provides information, metrics, and data from the market opportunity estimator based on industry. These interfaces are all similar to interface 5200, in that various aspects of the graphs, tables, charts, are expandable, and can have selectable entries. Each Industry is expandable to an Industry Sub-Sector 1, Sub-Sector 2, . . . where market opportunities will be provided for each.

Figure 59:
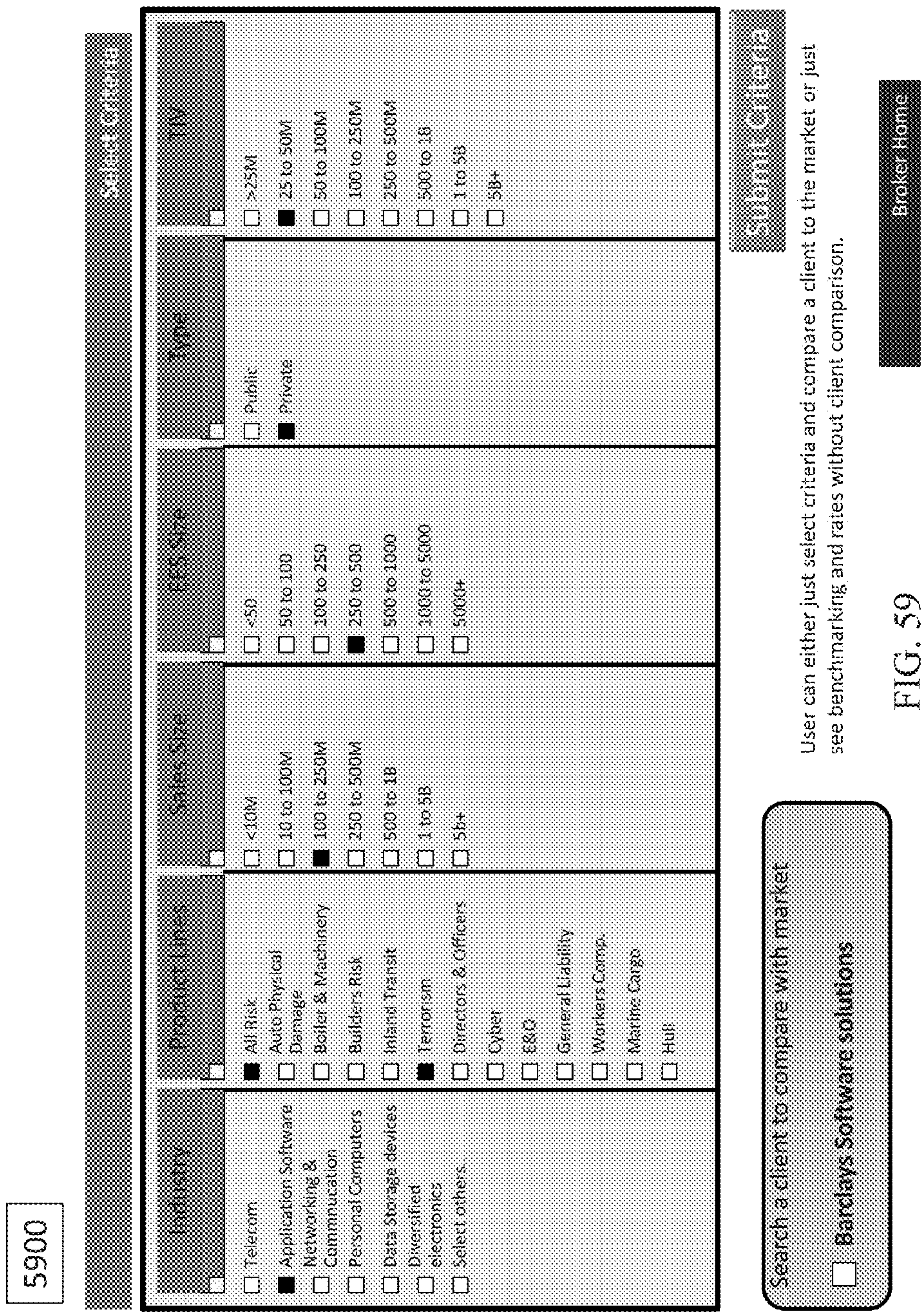
FIGS. 59-60 are exemplary interfaces providing rate and benchmarking information to a broker according to an exemplary embodiment of the present disclosure.

The system 1 provides a broker with rate and benchmarking information. In exemplary embodiments, a broker may input criteria for receiving rate and benchmarking information through an interface. For example FIG. 59 includes interface 5900 which allows a broker to select and/or input criteria. The system 1 can provide the rate/benchmarking information according to the criteria.

Figure 60:
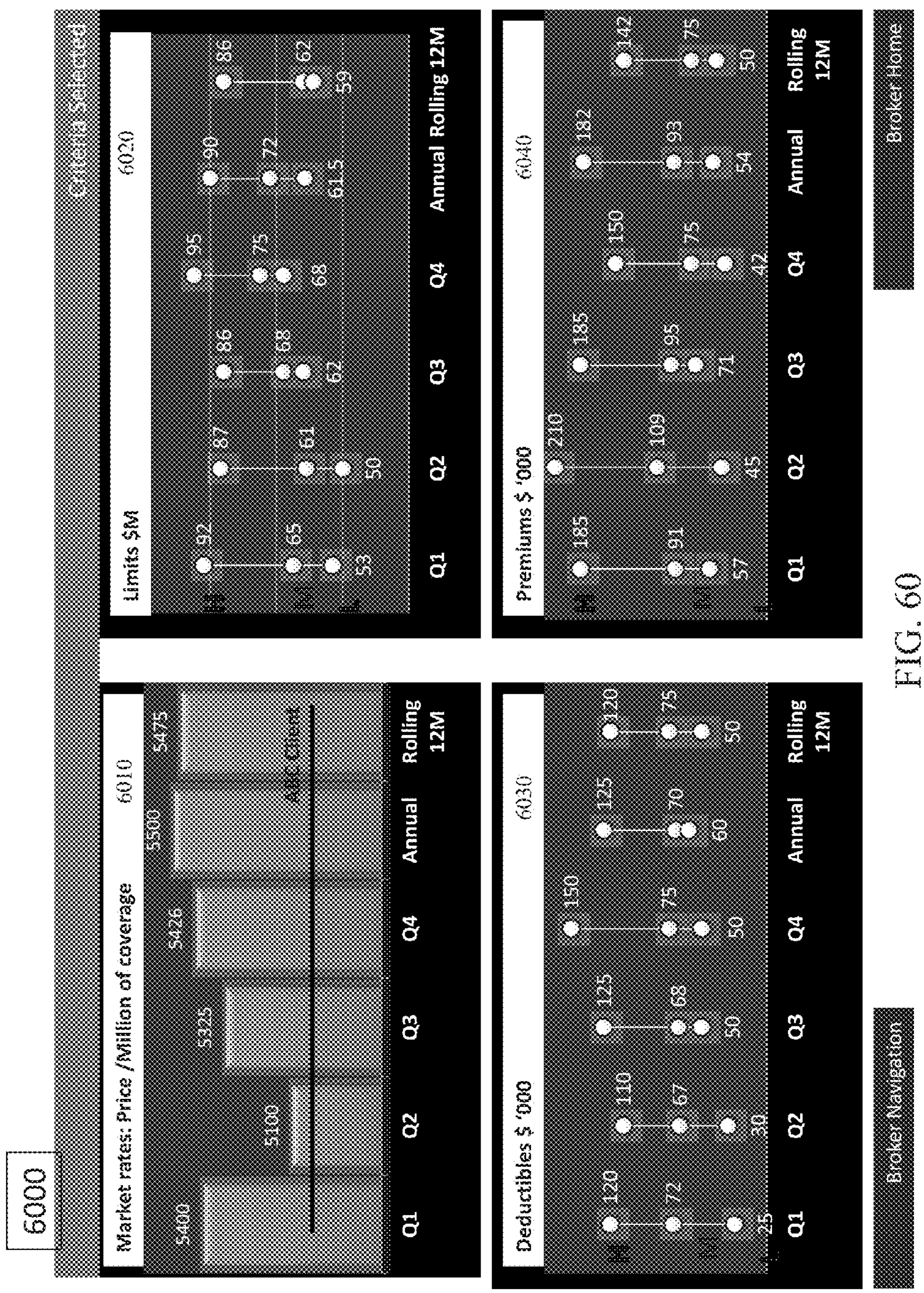

According to an exemplary embodiment, FIG. 60, includes interface 6000 which provides various rate/benchmarking information based on broker submitted criteria. Interface 6000 includes graph 6010 for illustrating the market rates based on price per million dollar of coverage. The graph 6010 uses bar graphs to illustrate the market rates, but other forms, including tables, charts, etc. may also be used alternatively.

Interface 6000 includes graph 6020 which illustrates the market regarding the insurance limits showing the typically or average high, medium, and low limits for insurance according to the broker's criteria. Graph 6020 which illustrates the market regarding the insurance limits and identifying the average high, medium, and low limits for insurance specified according to the broker's criteria. Similarly, graphs 6030 and 6040 show the market regarding deductibles and premiums. The graphs 6010-6040 are each broken down by quarter (e.g., Q1, Q2, etc.) and show an annual market and a rolling 12 month market. As we other graphs described herein, other variations may be implemented by the system 1.

As to be appreciated, in the various interfaces and displays described herein the provided information, including carrier, client, broker, competitor, client, etc. may be provided. In exemplary embodiments, some specific identifying information and/or information that could be used to identify an entity (broker, client, carrier, etc.), could be suppressed. For example, the number of entities identified for an interface may be limited to a certain amount to prevent a user using the information in order to fully identify other entity or all of the characteristic of one or more entities. The safeguard, could, for example prevent a carrier user identify a competitor carrier, and the carrier competitor's client base, performance etc.

Inputs from brokers and/or carriers may be obtained in any suitable manner, such as electronically (e.g., email, web interface, text, etc.) or input electronically after obtaining the information through traditional means (e.g., paper, telephone, fax, etc.). The obtained information can be stored in the database 2 in any suitable format for accessing and/or processing.

The remaining figures show various interfaces disclosing aspects of the disclosure in accordance with exemplary embodiments described herein.

Figure 61:
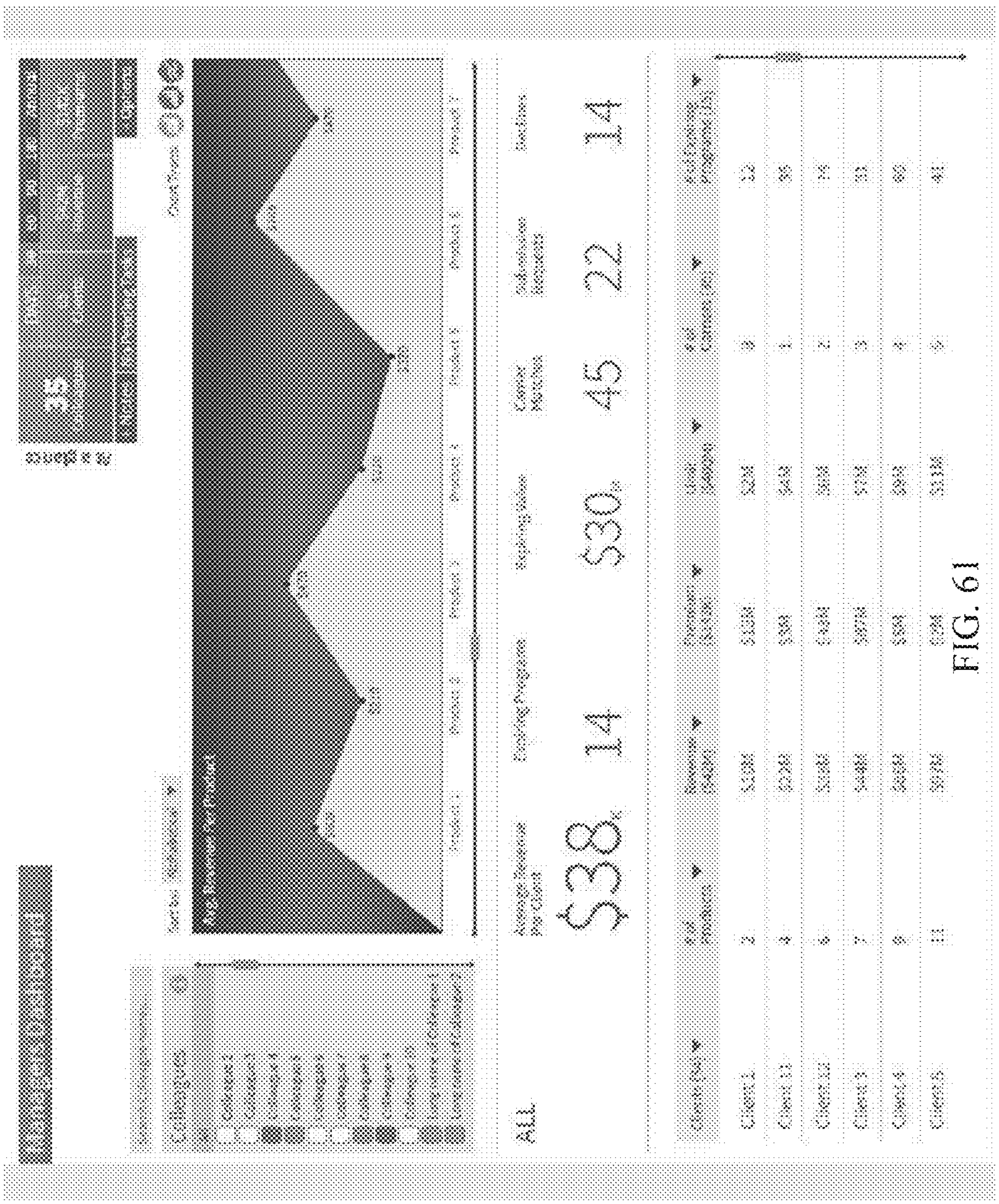
FIGS. 61-72 are exemplary interfaces illustrating screenshots for a broker manager dashboard according to an exemplary embodiment of the present disclosure.

According to exemplary embodiments, FIG. 61, illustrates an exemplary screenshot of a dashboard for a broker manager. The dashboard may be interactive and provide various information, including information as previous described herein with respect to the other broker interfaces. In general, the broker manager dashboard be able to show the one, a plurality, or all clients of the broker. Additionally the broker manager dashboard can show the all or some of the persons/agents/employees of the broker, the clients of the broker, the contact person associated with the broker, the insured carriers associated with the broker.

Figure 62:
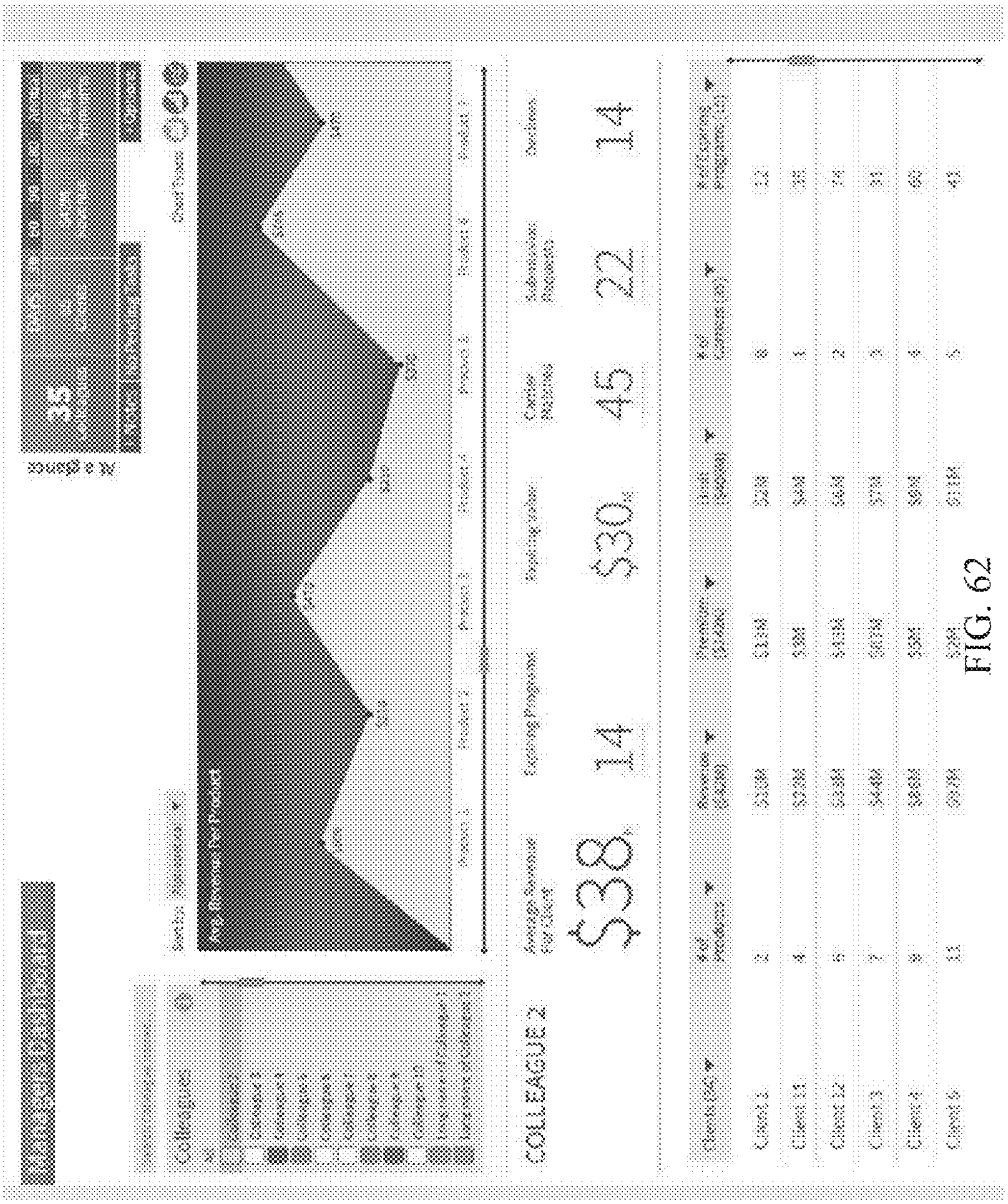
Figure 63:
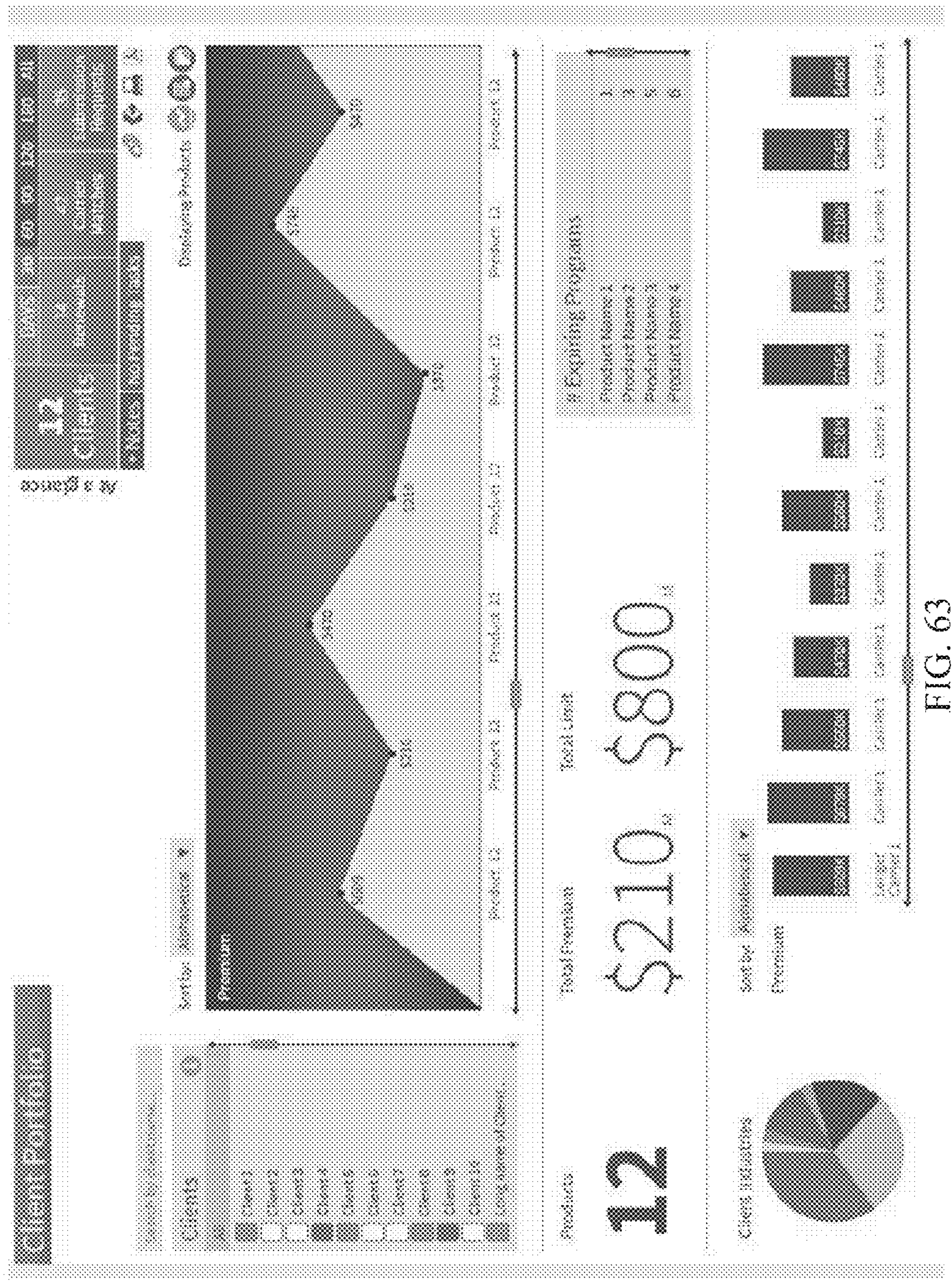
Figure 64:
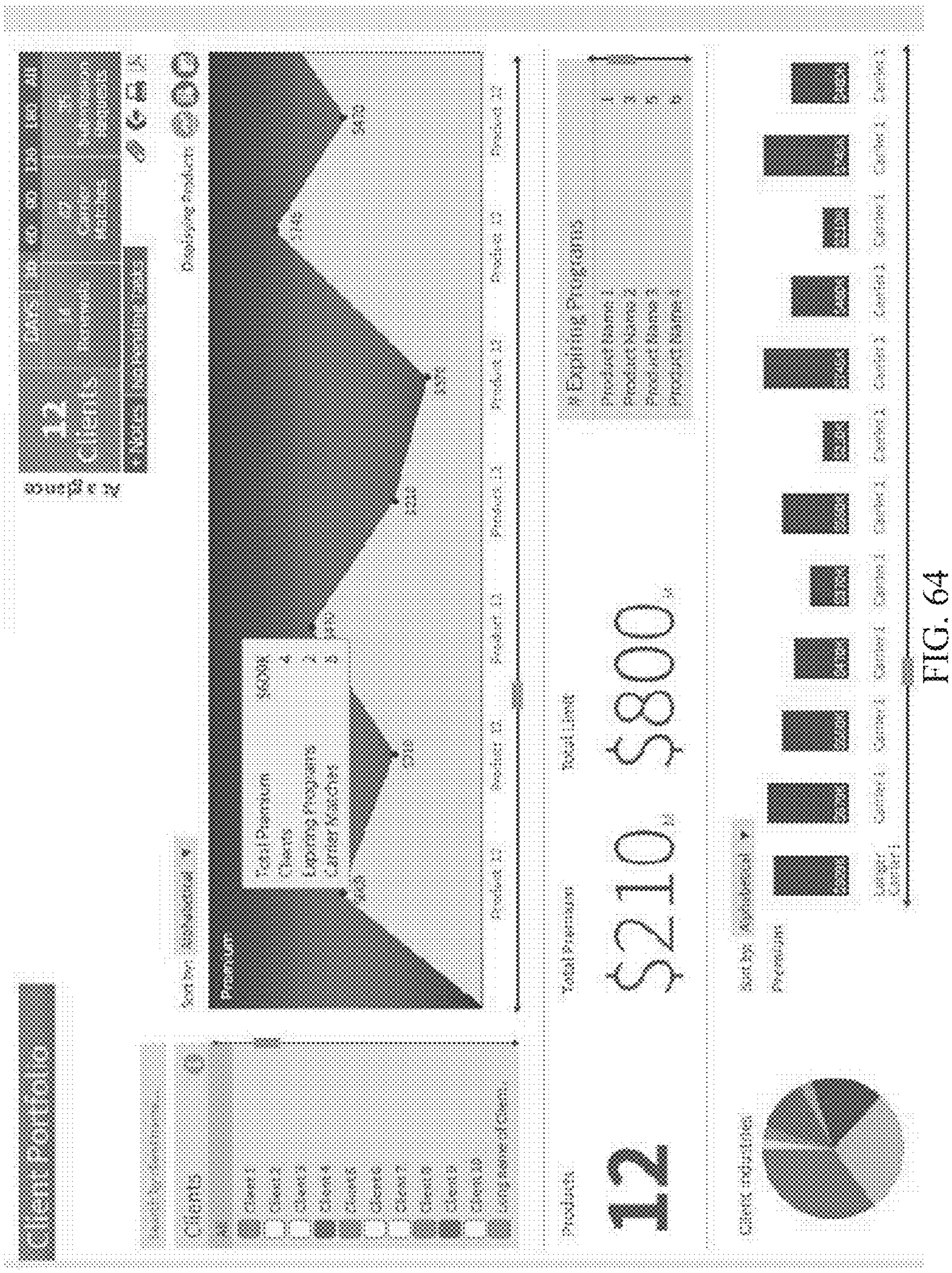
Figure 65:
Figure 66:
Figure 67:
Figure 68:
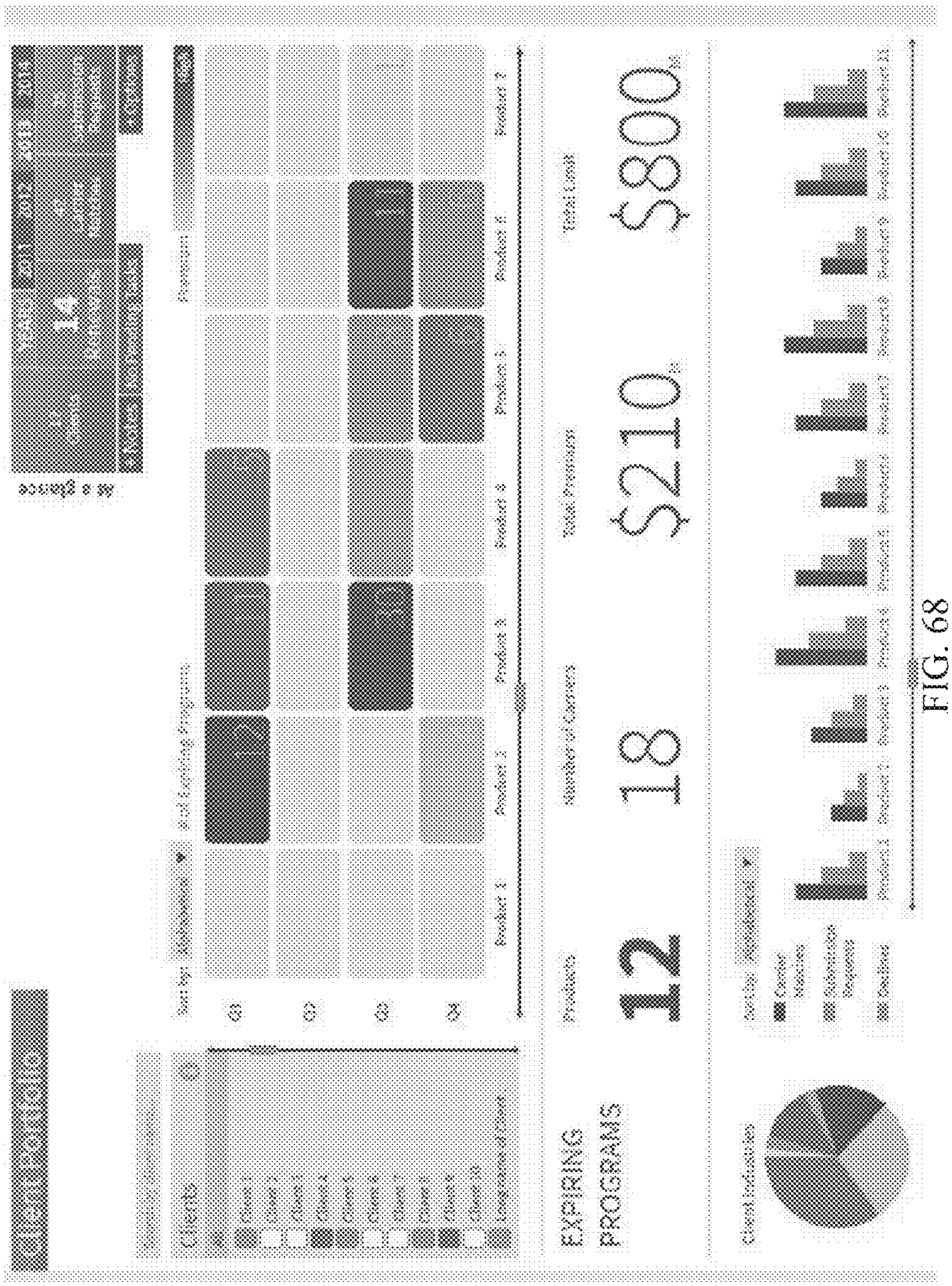
Figure 69:
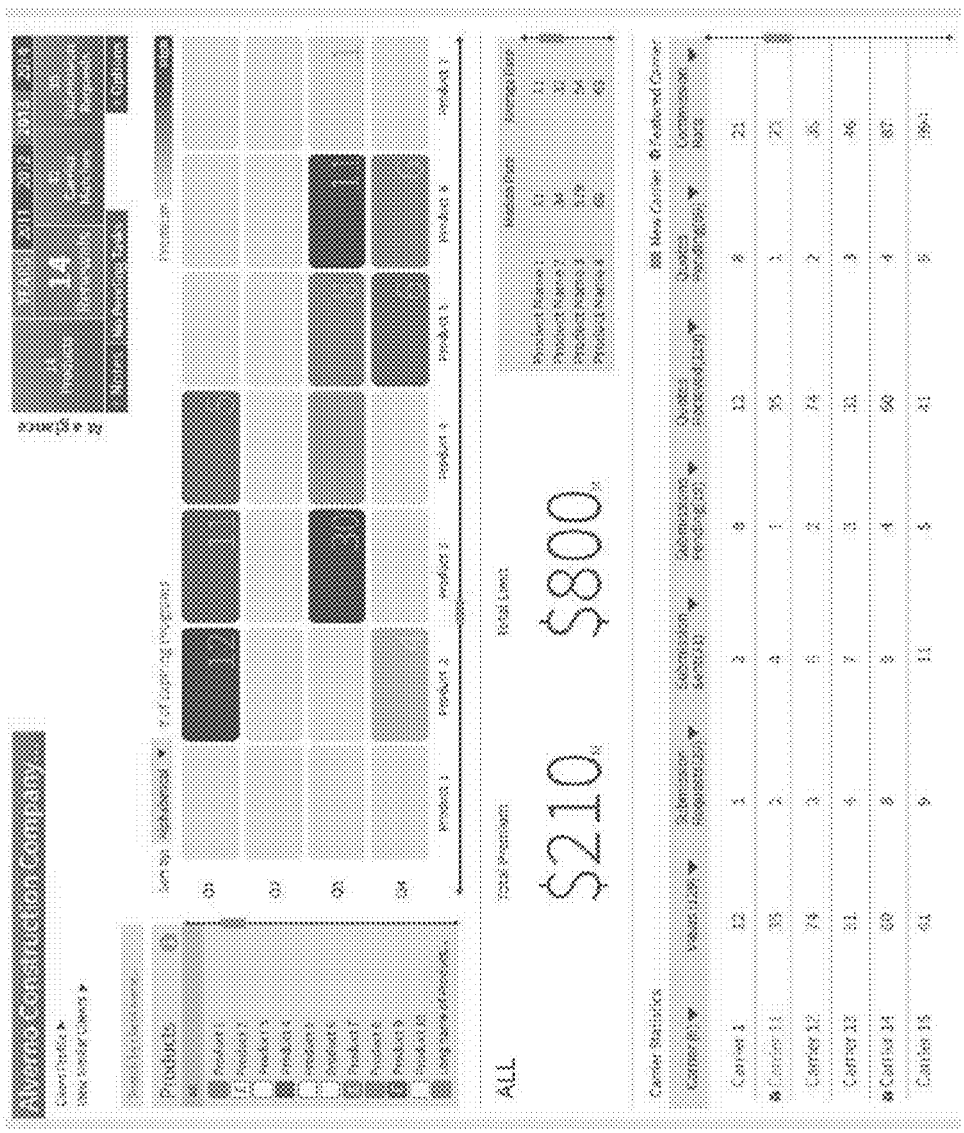
Figure 70:
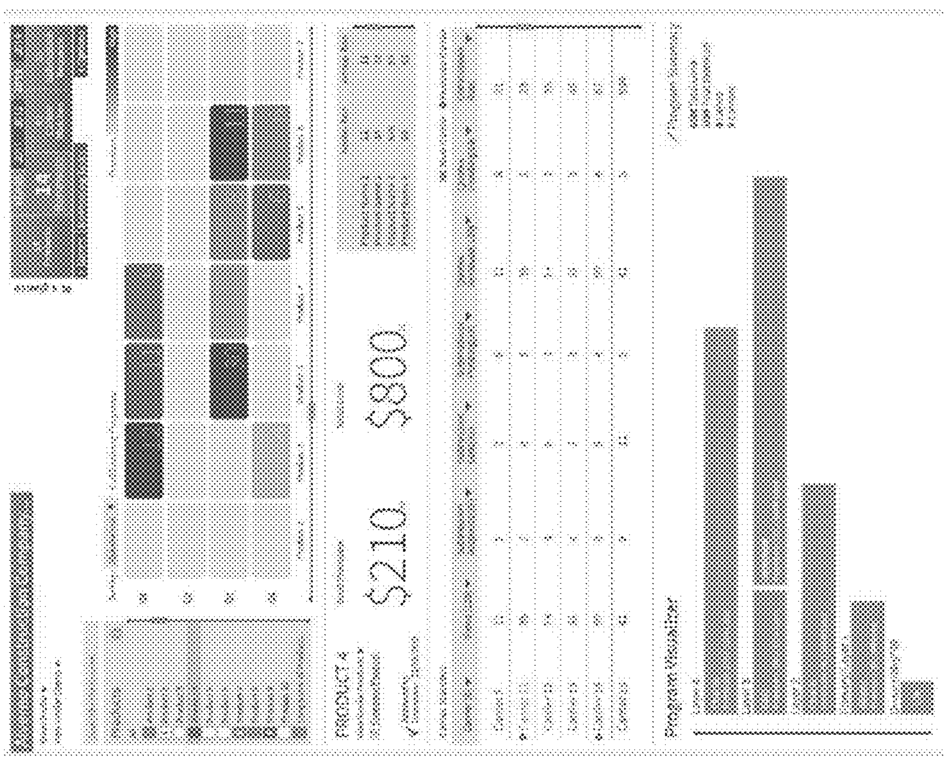

FIG. 62 shows according to an exemplary embodiment, an updated screenshot of the broker manager dashboard after a particular colleague (e.g., employee, agent, etc.) has been selected. For example, the broker manager dashboard may allow the oversight and/or management of with respect to each colleague by providing at least information regarding one or more of the clients of the selected colleague, such as, for example, products, revenue, premium amount, limit amount, number of carriers, expiring programs, etc.

According to exemplary embodiments, FIGS. 63-71, illustrates exemplary screenshots indicating types of information that may be accessible through the dashboard, including information about the client portfolio e.g., FIGS. 63-64, 68, 71) and/or information regarding a selected or particular client (e.g., Alverno Construction Company LLC) e.g., FIGS. 65-67, 69-70, 72.

Figure 71:
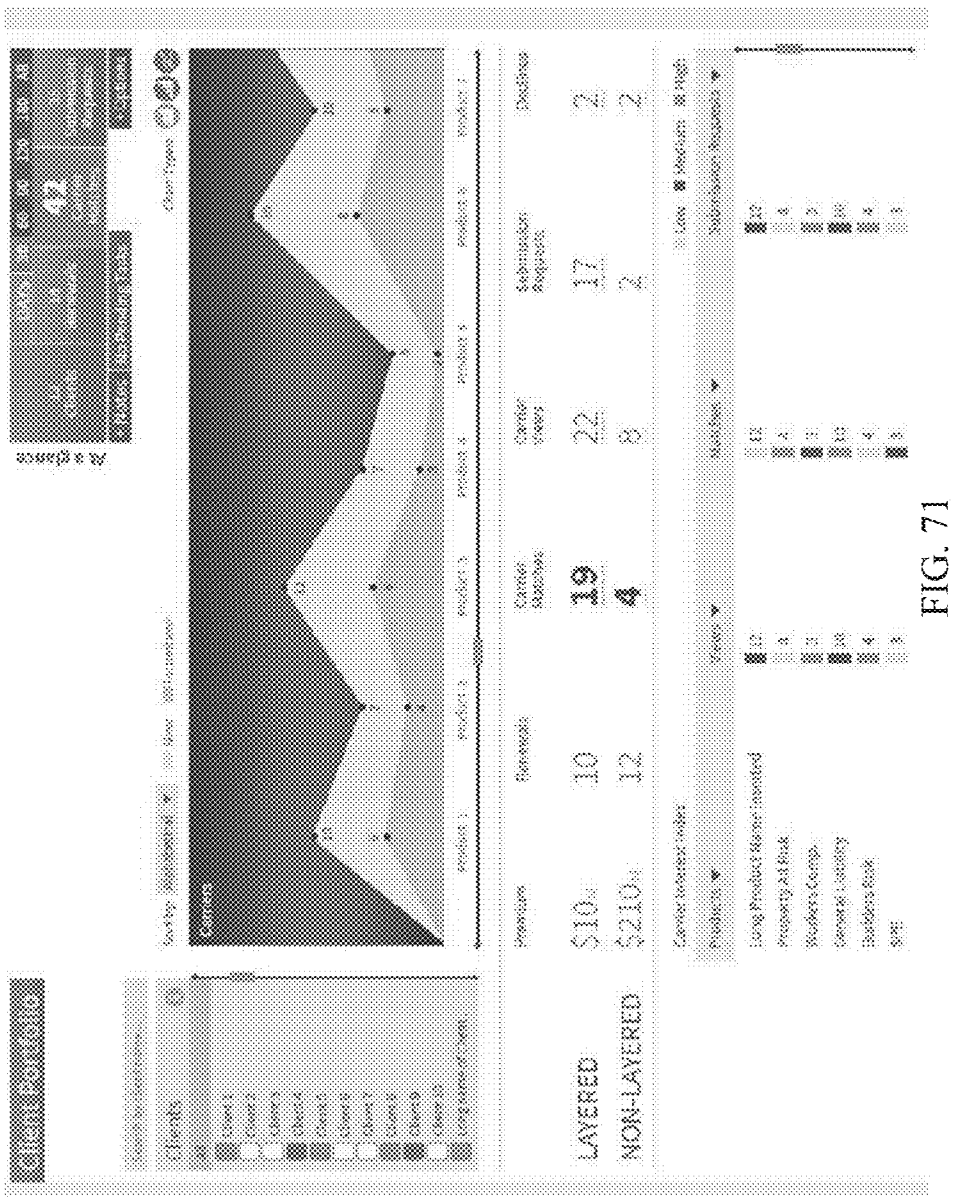
Figure 72:
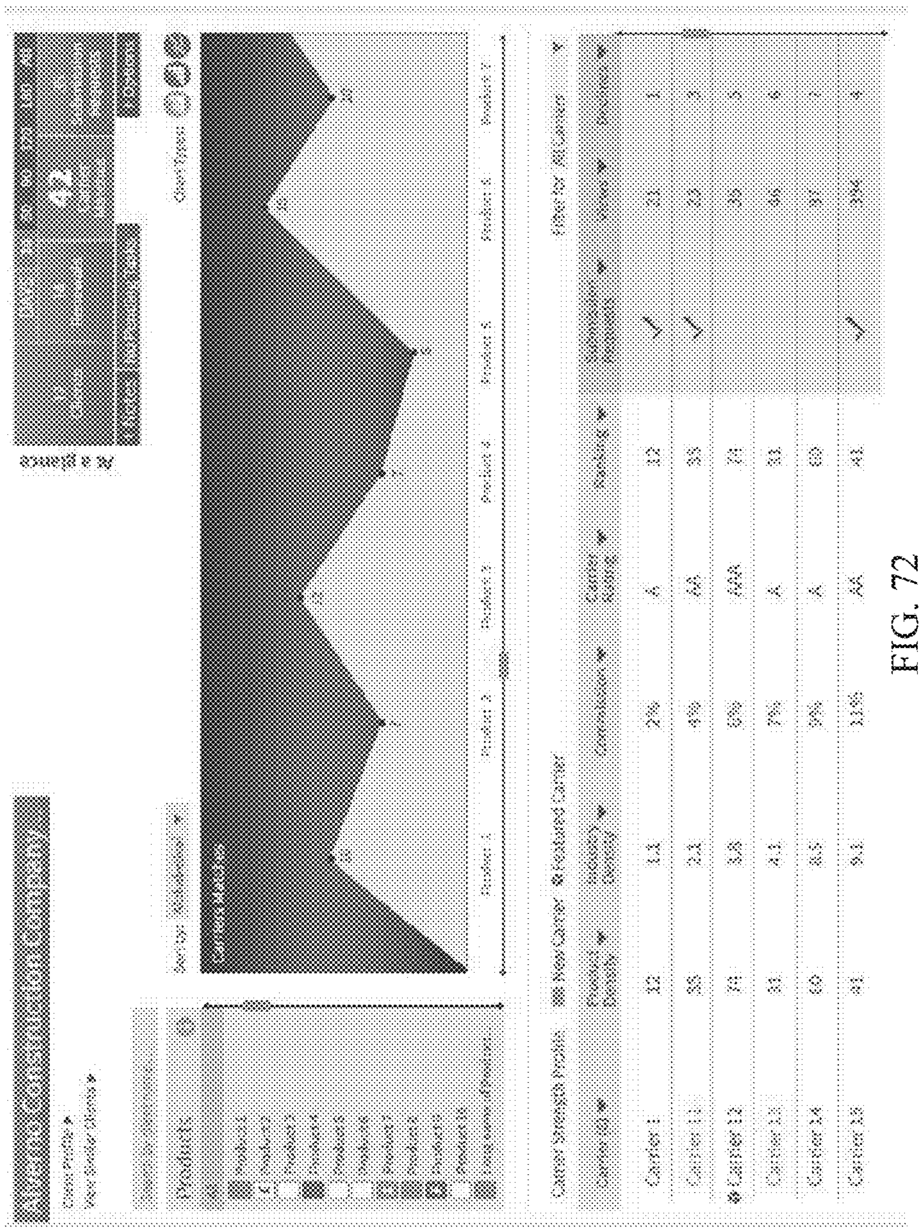
Figure 73:
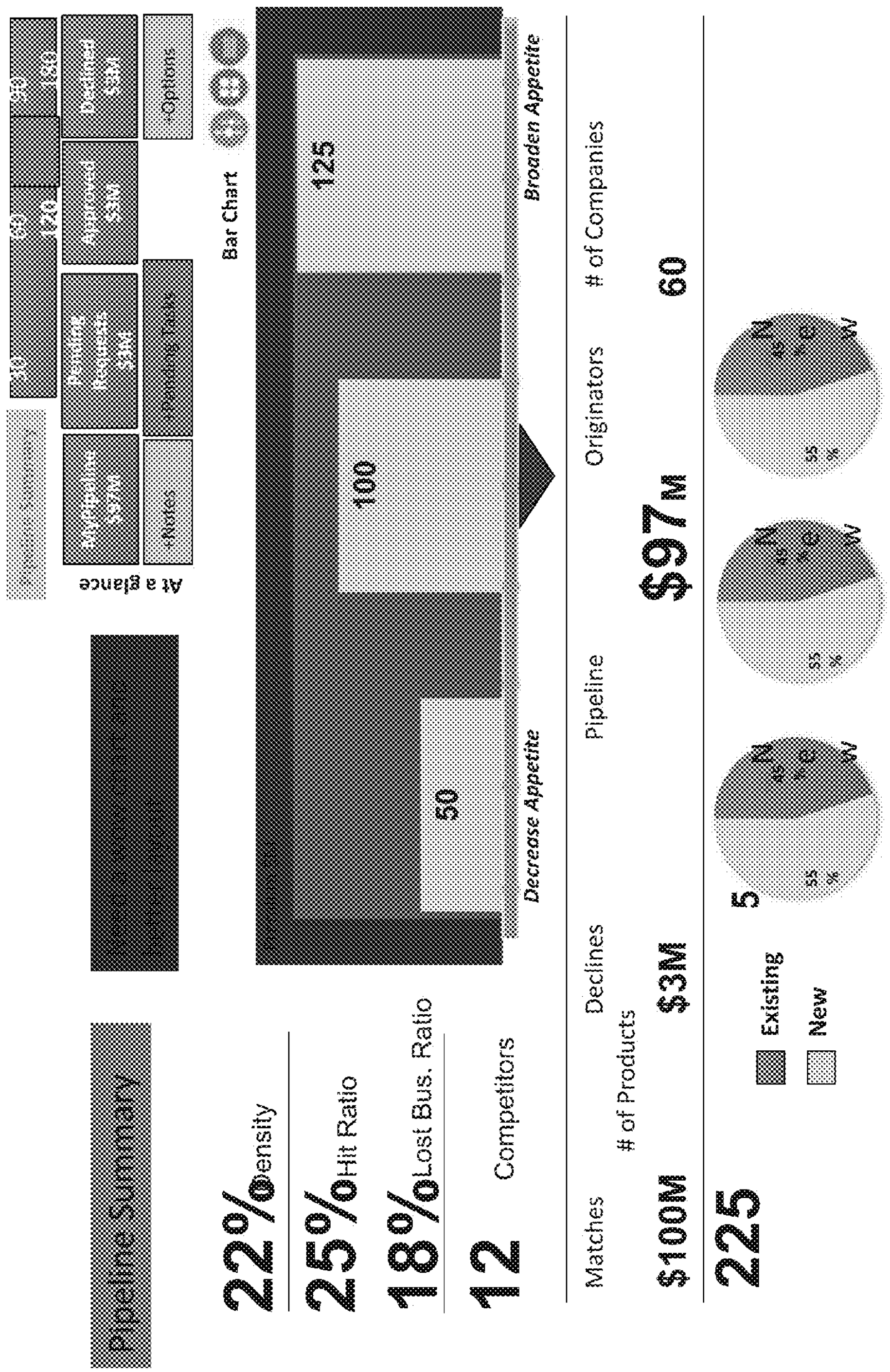
Figure 74:
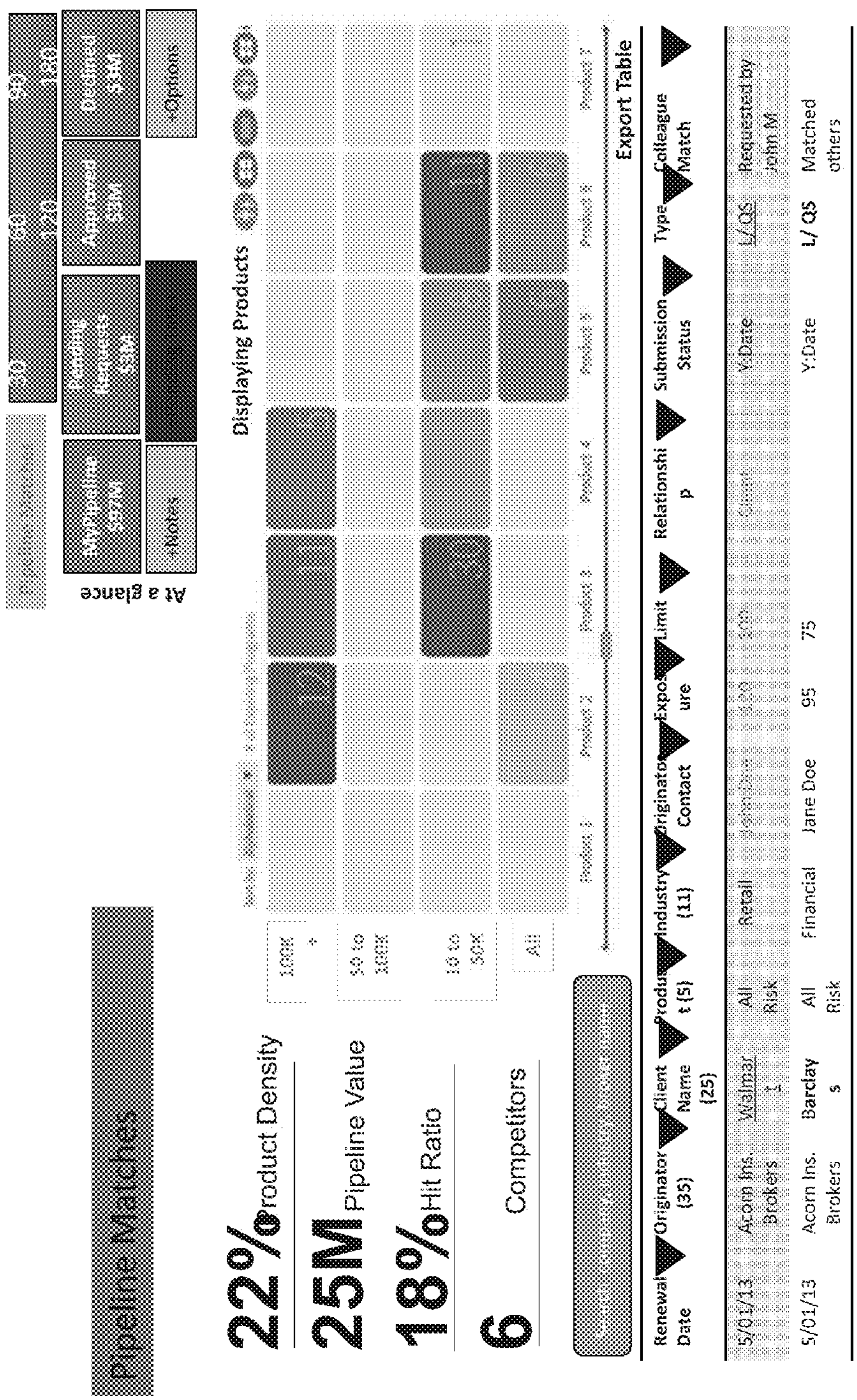
Figure 75:
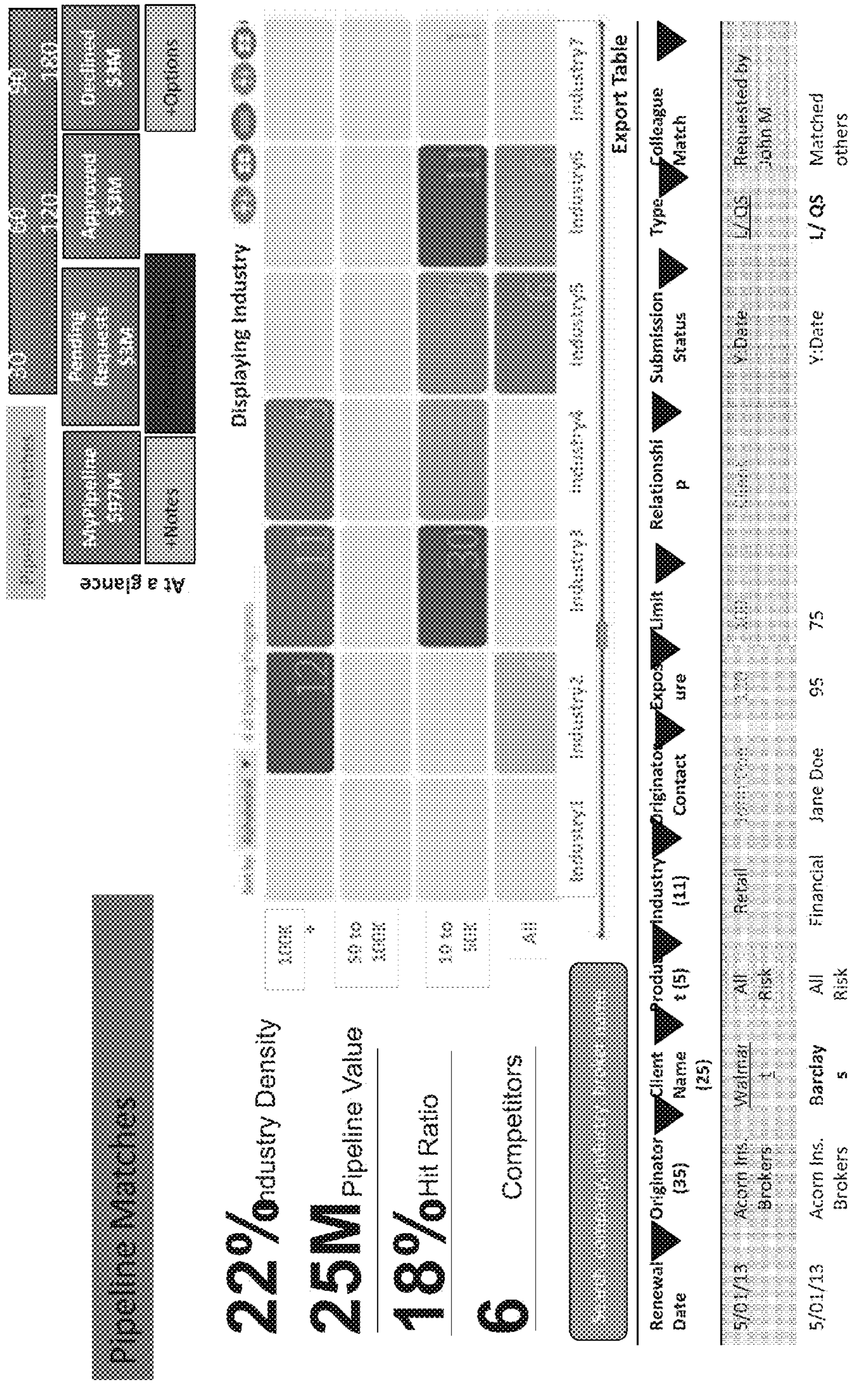
Figure 76:
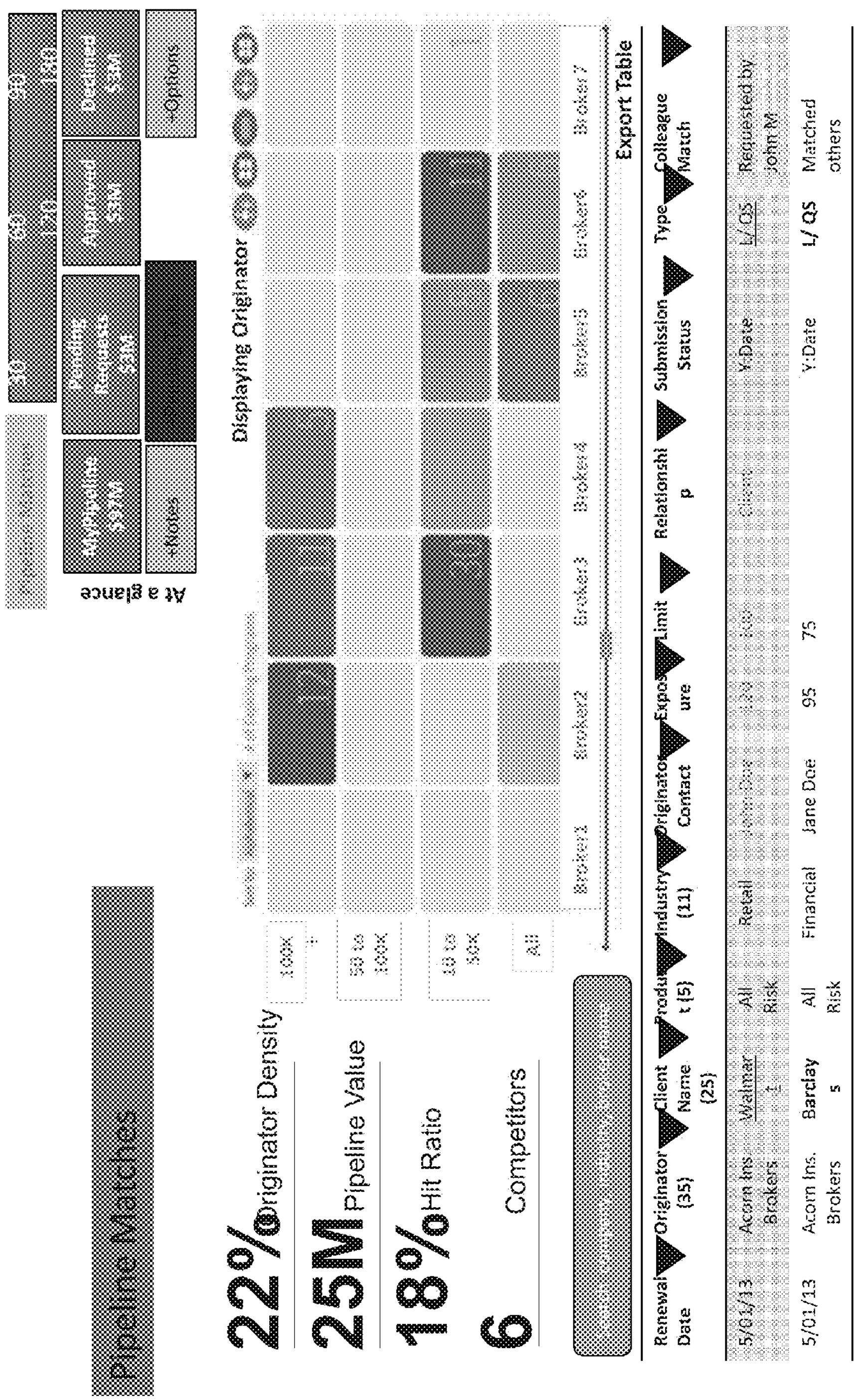
Figure 77:
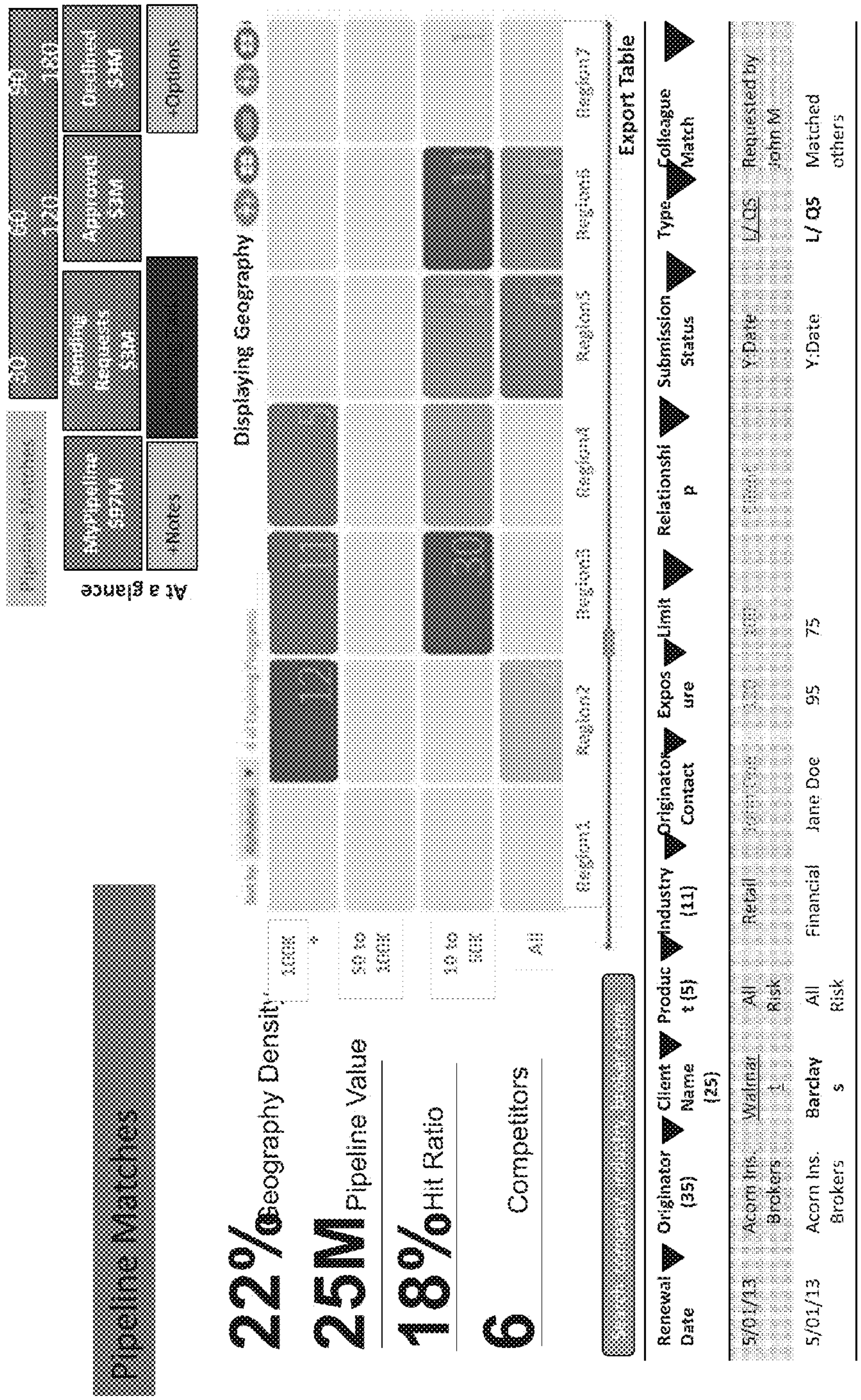
Figure 78:
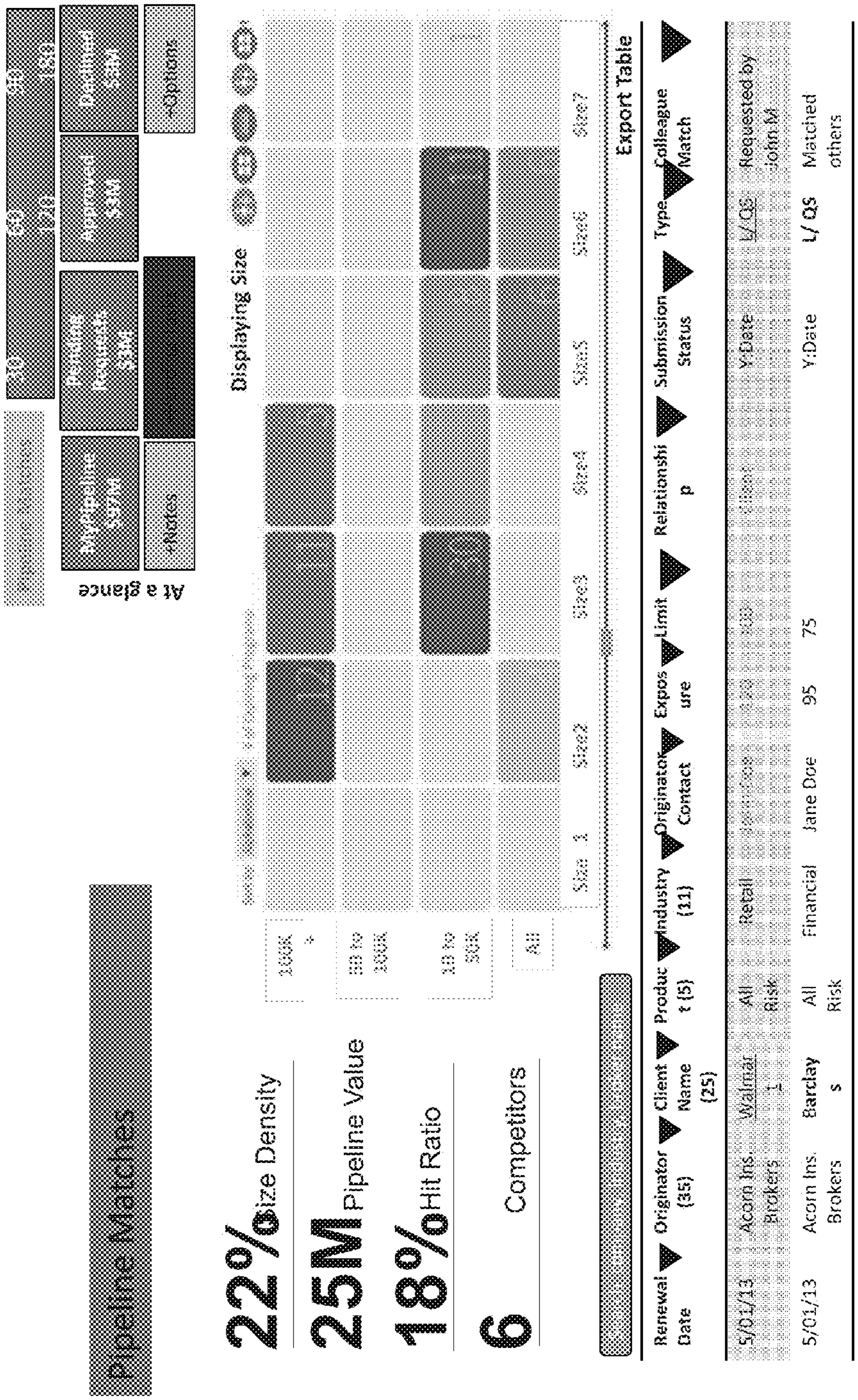
Figure 79:
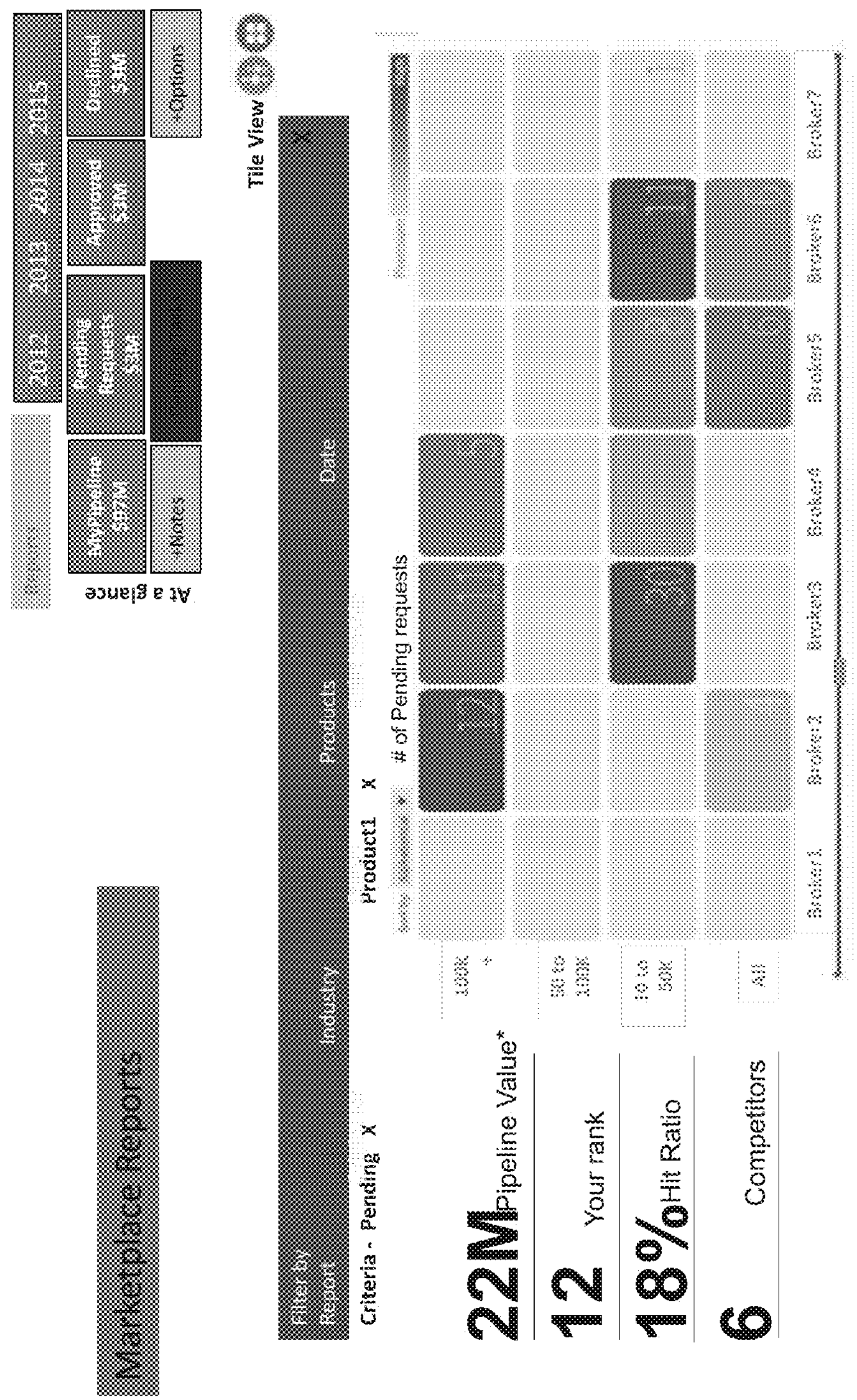
Figure 80:
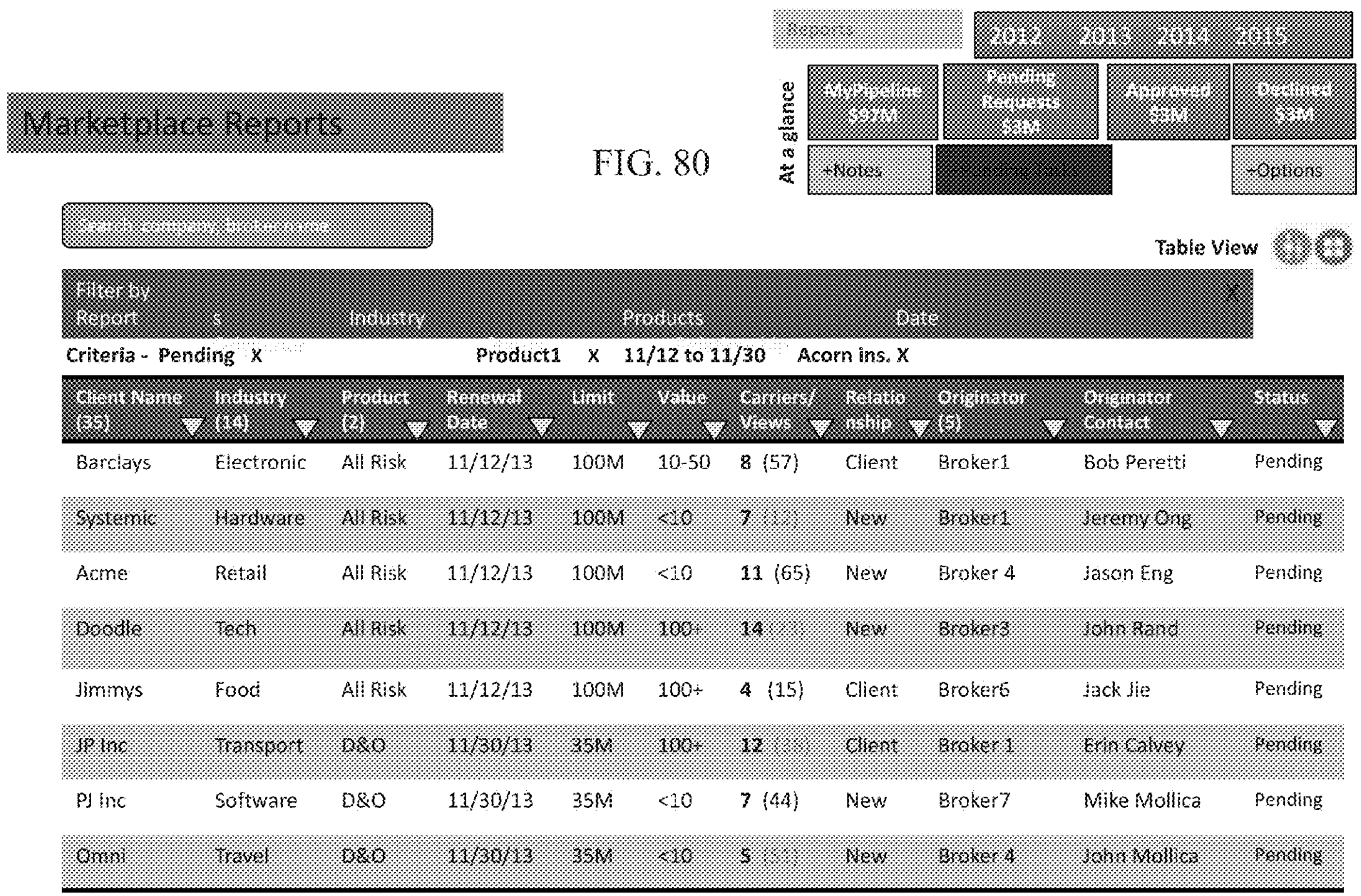
Figure 81:
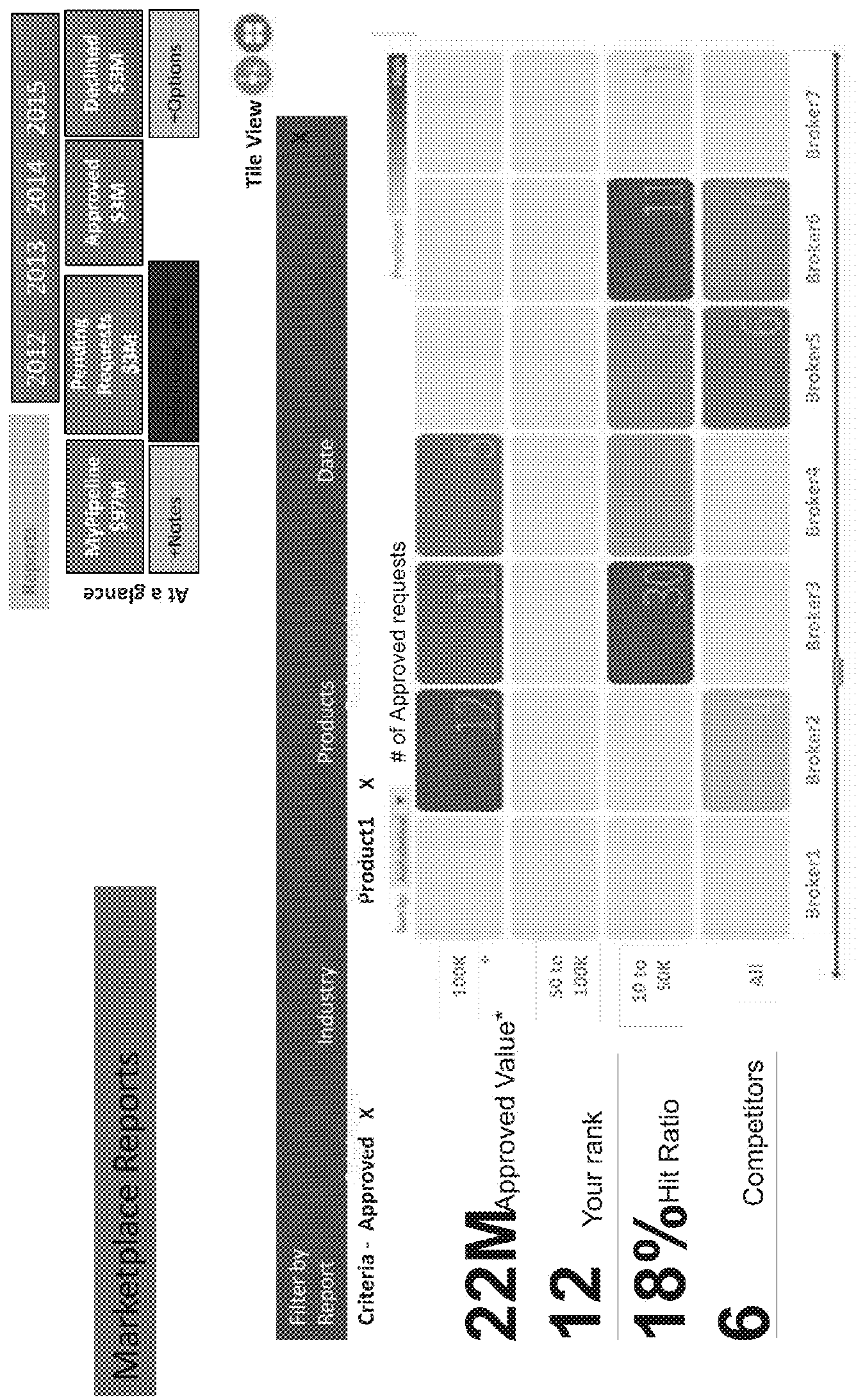
Figure 83:
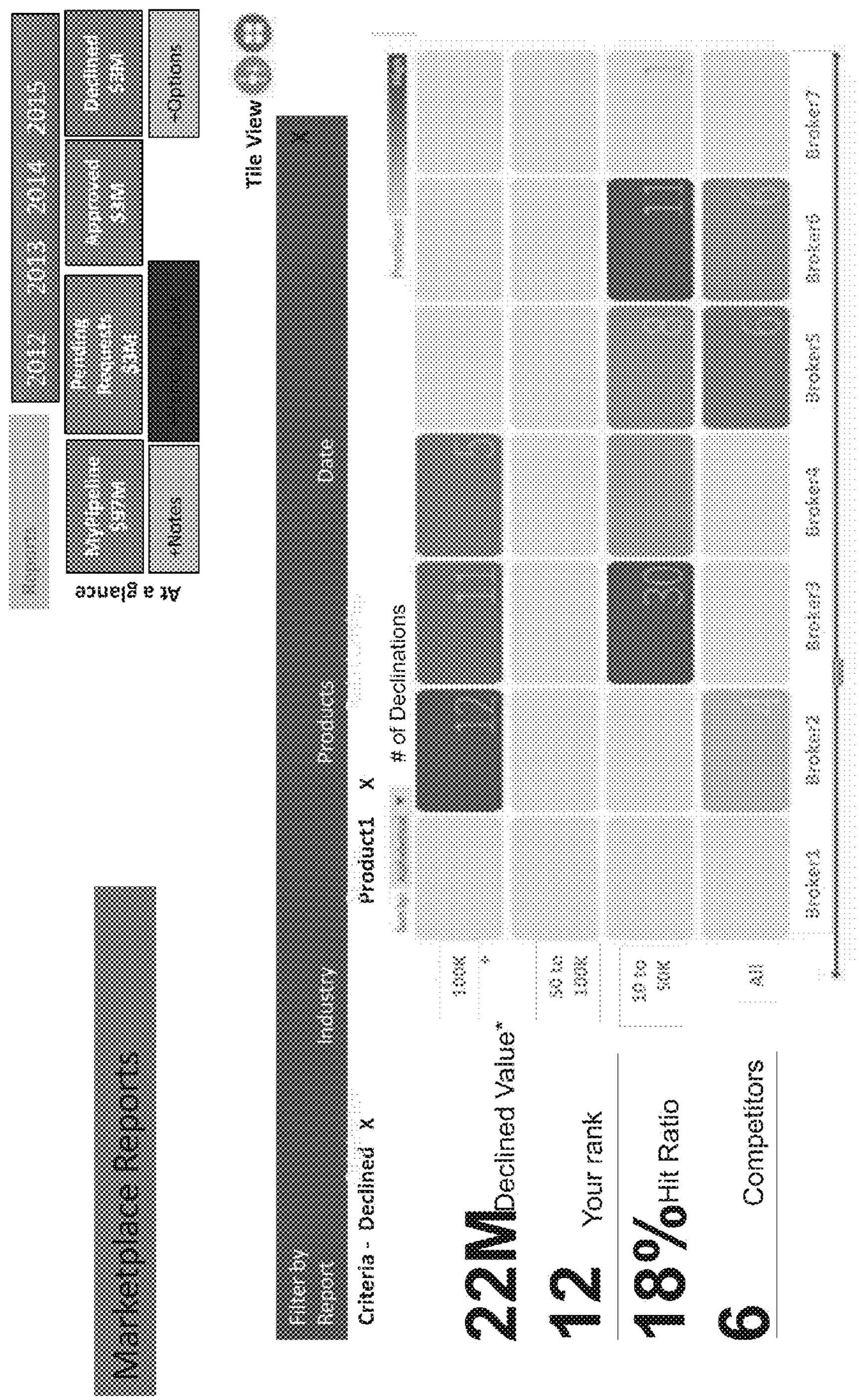
Figure 84:
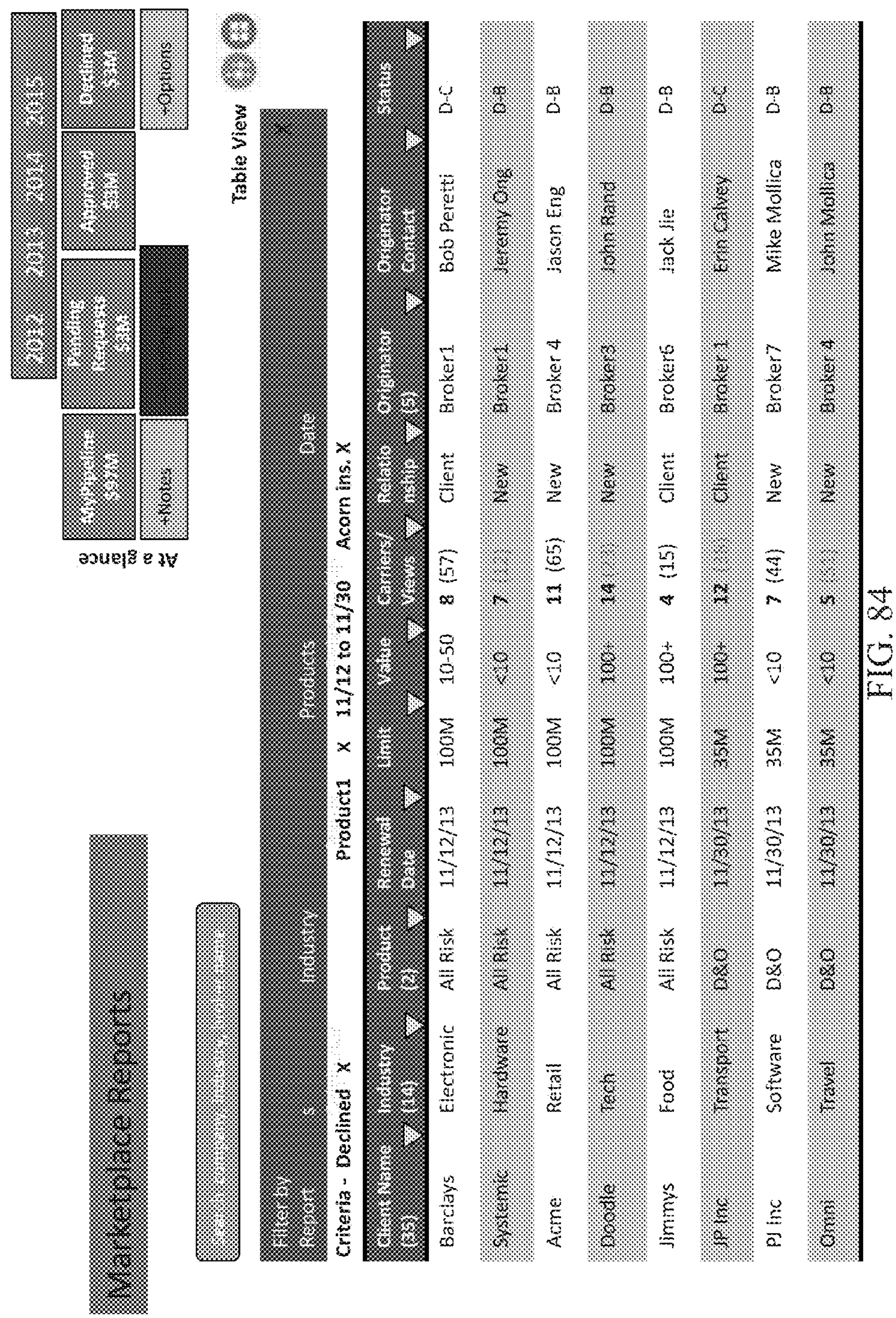
Figure 85:
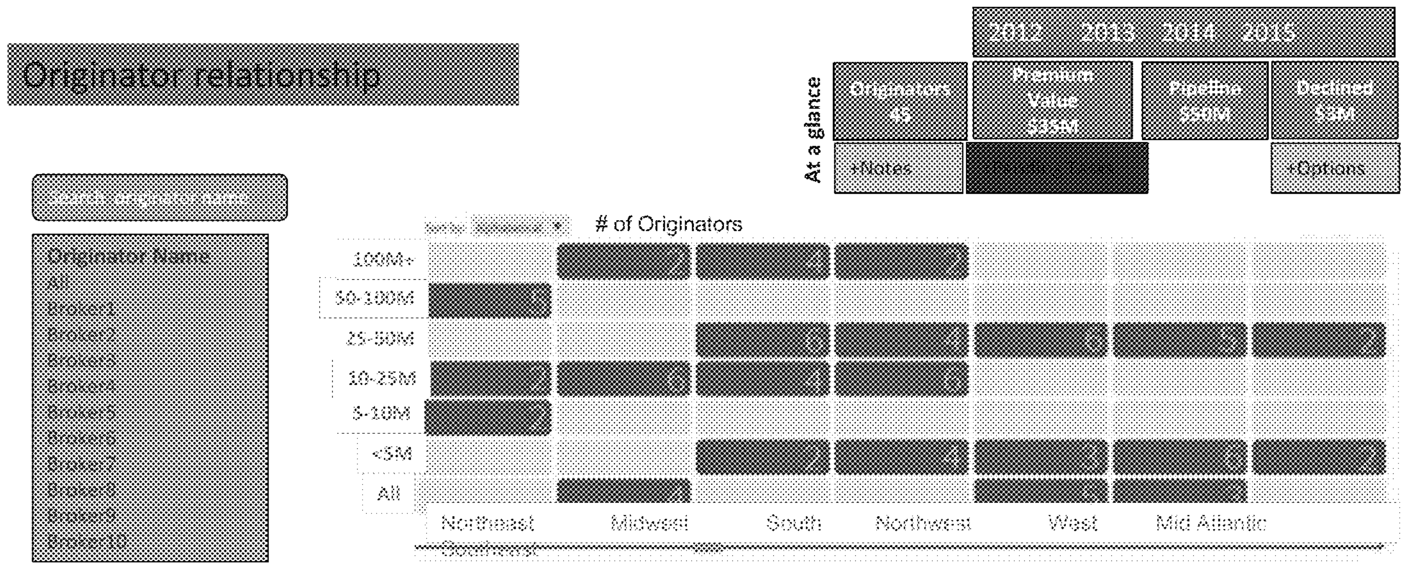
Figure 86:
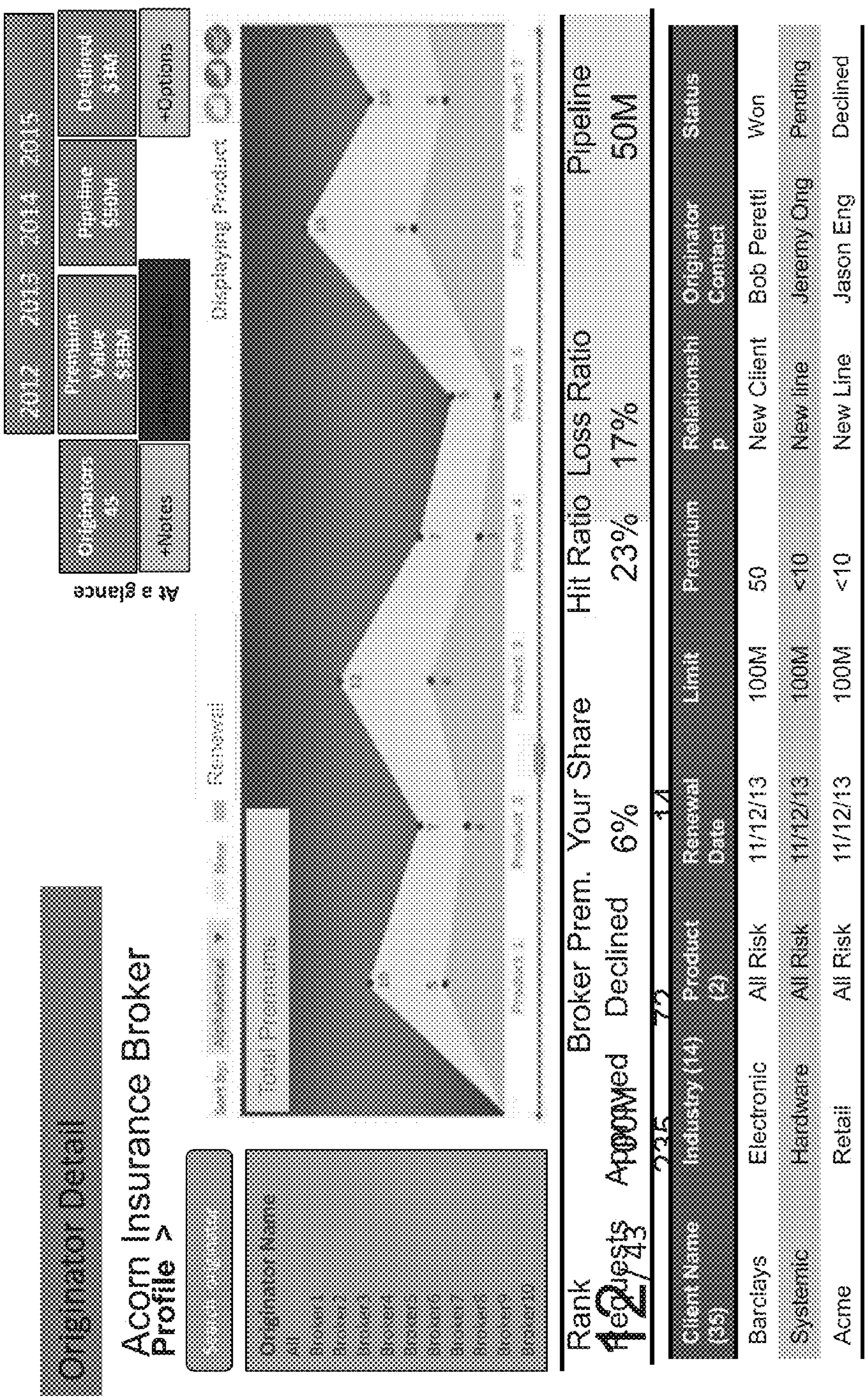
Figure 87:
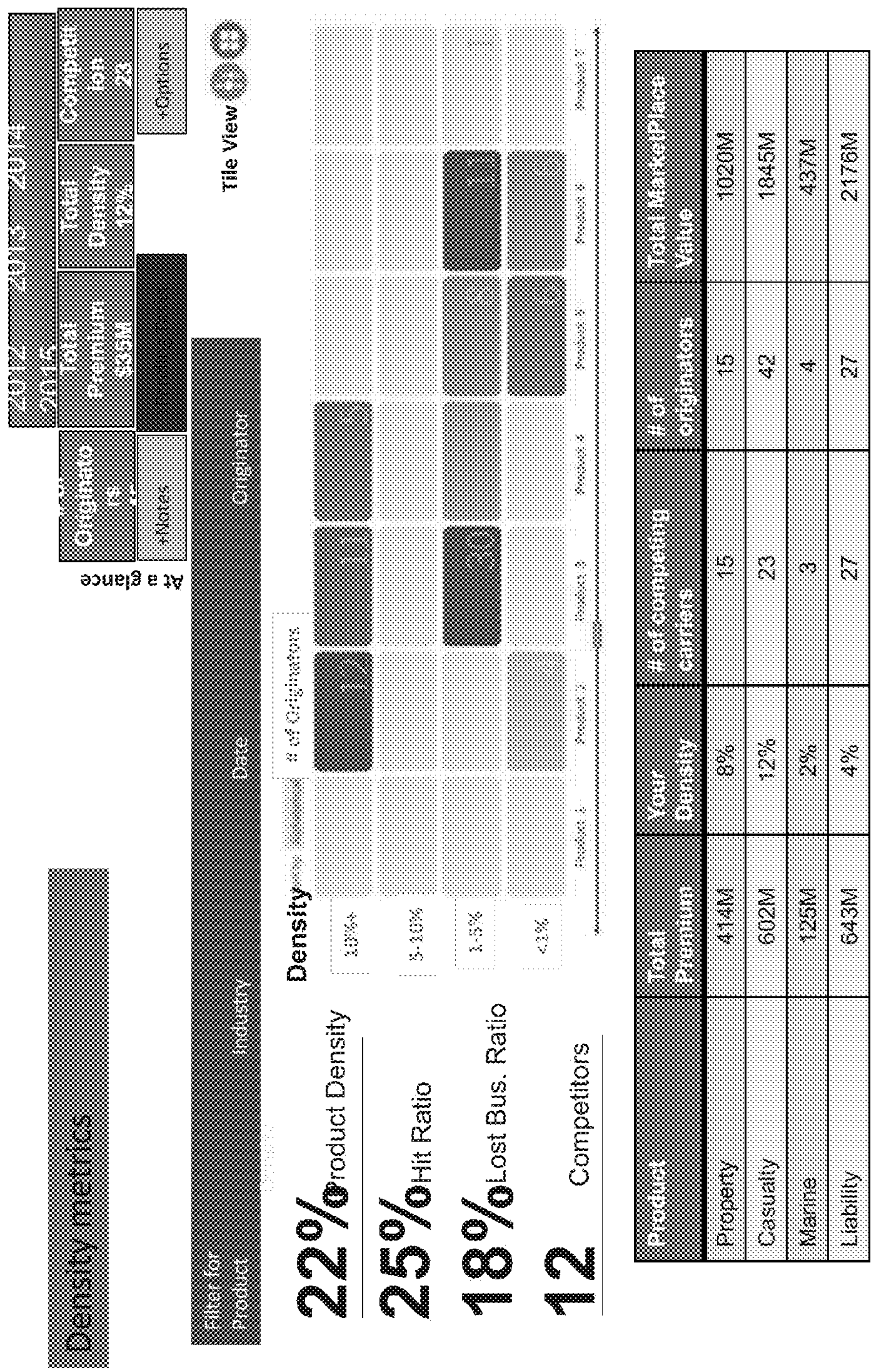
Figure 88:
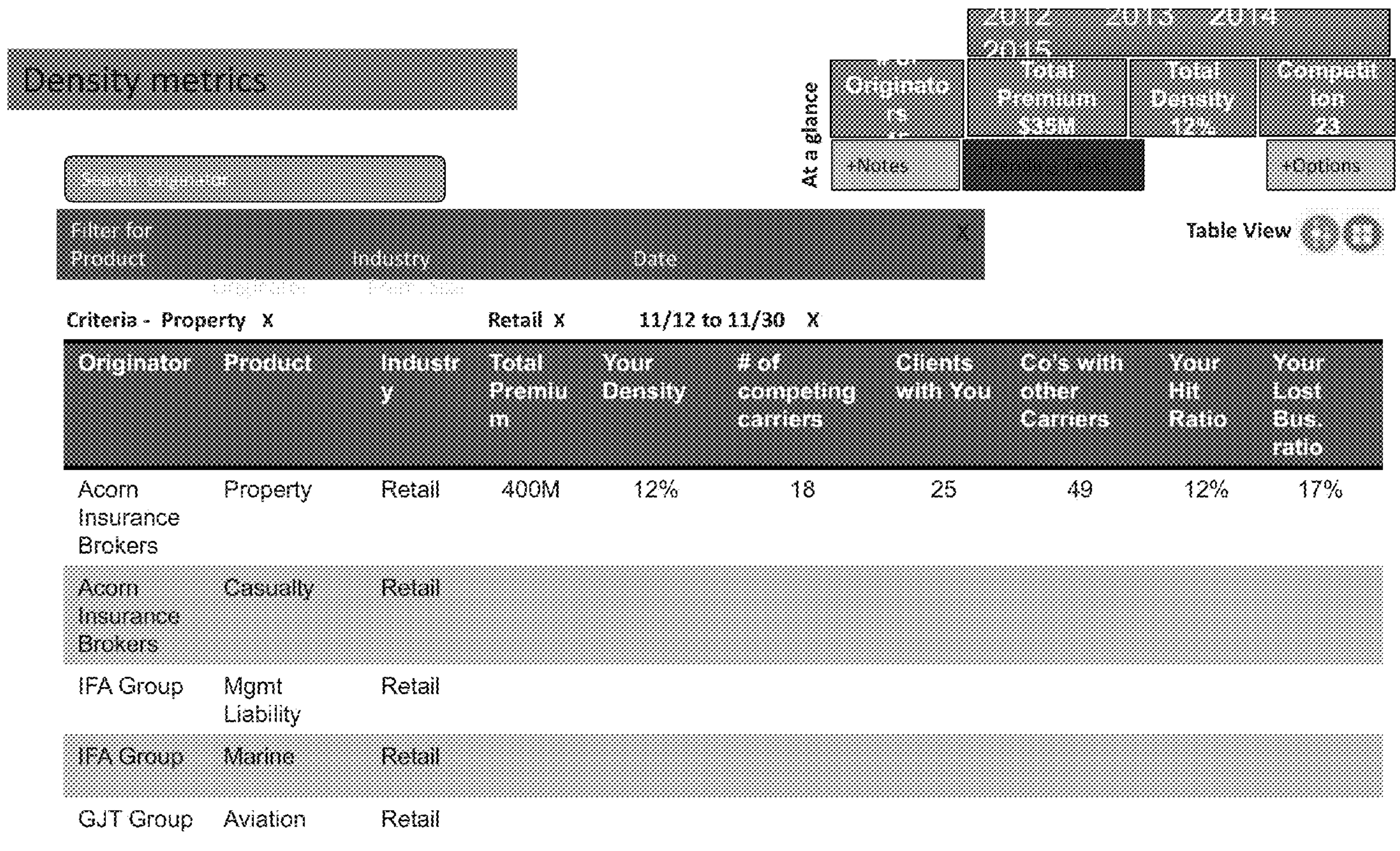

Referring to FIG. 71, the system 1 may provide a carrier interest index may. The carrier interest index may indicate the carriers' interest in the one or more clients of the broker by indicating by client, product, industry, geography, etc. the number of carrier views, matches between broker's clients and carriers, and/or submission requests from carriers. The carrier interest index may help a broker determine the level or amount of interest from carriers in underwriting for one or more clients of the broker. For example, referring in FIG. 71, the dashboard indicates that carriers have viewed clients seeking Workers Compensation insurance three (3) times, whereas carriers have viewed clients seeking General Liability insurance ten (10) times.

According to exemplary embodiments, FIGS. 73-88, illustrate exemplary screenshots of a dashboard for carriers. In embodiments, the interfaces may provide carriers with information regarding pipeline summaries, pipeline matches, marketplace reports, originator relationship, originator details, density metrics, and the like, to name a few.

It will be understood that that any of the above steps, embodiments, and/or elements can be combined, separated, any combination and/or separation thereof, and/or taken in any order. For ease, the steps are described as being sequential and/or in order. This is merely for ease and is not in any way meant to be a limitation.

Now that exemplary embodiments of the present disclosure have been shown and described in detail, various modifications and improvements thereon will become readily apparent to those skilled in the art.

What is claimed is:

1. A method comprising:

(a) receiving, at one or more computers from a first broker device, a first criteria to identify one or more insurance carriers capable of providing insurance to a party seeking insurance coverage;

(b) determining, at the one or more computers, one or more search parameters based at least in part on the first criteria;

(c) accessing, using the one or more computers, one or more electronic databases stored on one or more non-transitory computer-readable storage media and operatively connected to the one or more computers, the databases comprising information provided by at least a plurality of brokers for a plurality of insurance carriers, including for one or more of the respective carriers:

(i) profile information identifying the respective carriers;

(ii) product information identifying one or more insurance products offered or underwritten currently or historically by the respective carriers;

(iii) coverage information indicating coverage limits, layer, deductible, geography, and industry associated with the respective carriers;

(iv) experience information indicating the current or historical experience of the respective carriers by industry, geography, insured size, and total underwritten premiums;

(v) relationship information indicating current or historical relationships with at least one of:

1) one or more entities related to the party seeking insurance; or 2) one or more intermediaries associated with the party seeking insurance;

(d) determining, by the one or more computers accessing data in the databases, one or more carriers matching the determined search parameters;

(e) providing, to the first broker device by the one or more computers, first information identifying at least the determined carrier matches and second information corresponding to a market share for a product line associated with the first criteria with respect to all carriers in the database offering such product line.

2. The method of claim 1, further comprising providing third information identifying for each carrier at least one of:

1) said carrier has sent a request for submission for the party seeking insurance;

2) said carrier has declined the party seeking insurance; and 3) said carrier has not sent a request for submission and has not declined the party seeking insurance.

3. The method of claim 2, further comprising:

(f) receiving, at the one or more computers from the first broker device, a selection of one or more of the provided carrier matches.

4. The method of claim 3, further comprising:

(g) receiving, from the first broker device at the one or more computers, an indication to send a submission to the one or more selected carriers; and (h) sending, by the one or more computers, a submission on behalf of a user of the first broker device to one or more devices associated with the one or more selected carriers.

5. The method of claim 4, further comprising:

(i) providing, by the one or more computers to the first broker device, a first broker negotiation interface; and (j) providing, by the one or more computers to carrier devices associated with each of the one or more selected carriers, a second carrier negotiation interface for each of the one or more selected carriers, wherein the first broker negotiation interface can communicate, directly or indirectly, with each of the second carrier negotiation interfaces so as to facilitate negotiations to purchase insurance.

6. The method of claim 3, further comprising:

(g) receiving, at the one or more computers, an indication to decline at least one previously sent request for submission from one of the one or more selected carriers.

7. The method of claim 1, wherein the party seeking insurance coverage is any one of a corporation, limited liability corporation, joint venture, bank, hedge fund, industry association, lending institution, non-profit organization, or government entity.

8. The method of claim 1, wherein the one or more search parameters comprise at least one or more of the following types of information: insurance products, total risk exposure, coverage limits, deductibles, or insurance layers.

9. The method of claim 8, wherein the one or more search parameters further comprise at least one or more of the following types of information: geography, industry, or insured size.

10. The method of claim 1, wherein the experience information further comprises information indicating loss ratios, engineering and loss control services, insurance claims, length of time in the marketplace of one or more products offered by the respective carriers, number of clients underwritten by the respective carriers, and/or market share of premiums underwritten by the respective carriers for one or more products by geography, size, or industry.

11. The method of claim 1, wherein the first broker device is associated with at least one of an insurance broker, insurance agent, wholesaler, managing general agent, or insurance pool.

12. The method of claim 1, wherein the search parameters are based at least in part on the first criteria, a proximity metric that relates categories of insured's industry, size, and exposure, based at least in part on historical negotiation data associated with one or more insurance carrier.

13. The method of claim 1, wherein the second information further comprises at least one of a percentage of successful requests for submission, a percentage of successful submissions, a number of successful requests for submission, or a number of successful submissions.

14. The method of claim 1, wherein the information for the plurality of insurance carriers is provided by at least the plurality of brokers and the plurality of insurance carriers.

15. A method comprising:

(a) receiving, at one or more computers from a first broker device, a first criteria to identify one or more insurance carriers capable of providing insurance to a party seeking insurance coverage;

(b) determining, at the one or more computers, one or more search parameters based at least in part on the first criteria;

(c) accessing, using the one or more computers, one or more electronic databases stored on one or more non-transitory computer-readable storage media and operatively connected to the one or more computers, the databases comprising information provided by at least a plurality of brokers for a plurality of insurance carriers, including for one or more of the respective carriers:

(i) profile information identifying the respective carriers;

(ii) product information identifying one or more insurance products offered or underwritten currently or historically by the respective carriers;

(iii) coverage information indicating coverage limits, layer, deductible, geography, and industry associated with the respective carriers;

(iv) experience information indicating the current or historical experience of the respective carriers by industry, geography, insured size, and total underwritten premiums;

(v) relationship information indicating current or historical relationships with at least one of:

1) one or more entities related to the party seeking insurance; or 2) one or more intermediaries associated with the party seeking insurance;

(d) determining, by the one or more computers accessing data in the databases, one or more carriers matching the determined search parameters;

(e) providing, to the first broker device by the one or more computers, first information identifying at least the determined carrier matches and second information corresponding to a market share for an industry associated with the first criteria with respect to all carriers in the database offering products related to such industry.

16. The method of claim 15, further comprising providing third information identifying for each carrier at least one of:

1) said carrier has sent a request for submission for the party seeking insurance;

2) said carrier has declined the party seeking insurance; and 3) said carrier has not sent a request for submission and has not declined the party seeking insurance.

17. The method of claim 16, further comprising:

(f) receiving, at the one or more computers from the first broker device, a selection of one or more of the provided carrier matches.

18. The method of claim 17, further comprising:

(g) receiving, from the first broker device at the one or more computers, an indication to send a submission to the one or more selected carriers; and (h) sending, by the one or more computers, a submission on behalf of a user of the first broker device to one or more devices associated with the one or more selected carriers.

19. The method of claim 18, further comprising:

(i) providing, by the one or more computers to the first broker device, a first broker negotiation interface; and (j) providing, by the one or more computers to carrier devices associated with each of the one or more selected carriers, a second carrier negotiation interface for each of the one or more selected carriers, wherein the first broker negotiation interface can communicate, directly or indirectly, with each of the second carrier negotiation interfaces so as to facilitate negotiations to purchase insurance.

20. The method of claim 17, further comprising:

(g) receiving, at the one or more computers, an indication to decline at least one previously sent request for submission from one of the one or more selected carriers.

21. The method of claim 15, wherein the party seeking insurance coverage is any one of a corporation, limited liability corporation, joint venture, bank, hedge fund, industry association, lending institution, non-profit organization, or government entity.

22. The method of claim 15, wherein the one or more search parameters comprise at least one or more of the following types of information: insurance products, total risk exposure, coverage limits, deductibles, or insurance layers.

23. The method of claim 22, wherein the one or more search parameters further comprise at least one or more of the following types of information: geography, industry, or insured size.

24. The method of claim 15, wherein the experience information further comprises information indicating loss ratios, engineering and loss control services, insurance claims, length of time in the marketplace of one or more products offered by the respective carriers, number of in response to Aug. 20, 2013 Office Action clients underwritten by the respective carriers, and/or market share of premiums underwritten by the respective carriers for one or more products by geography, size, or industry.

25. The method of claim 15, wherein the first broker device is associated with at least one of an insurance broker, insurance agent, wholesaler, managing general agent, or insurance pool.

26. The method of claim 15, wherein the search parameters are based at least in part on the first criteria, a proximity metric that relates categories of insured's industry, size, and exposure, based at least in part on historical negotiation data associated with one or more insurance carrier.

27. The method of claim 15, wherein the second information further comprises at least one of a percentage of successful requests for submission, a percentage of successful submissions, a number of successful requests for submission, or a number of successful submissions.

28. The method of claim 15, wherein the information for the plurality of insurance carriers is provided by at least the plurality of brokers and the plurality of insurance carriers.

* * * * *